United States Patent
Kubota et al.

[11] Patent Number: 5,841,747
[45] Date of Patent: Nov. 24, 1998

[54] OPTICAL DISK DEVICE AND METHOD FOR SETTING RECORDING POWER AND ERASING POWER

[75] Inventors: Shinji Kubota, Daito; Masatsugu Tanji, Mirakata; Wataru Masuda, Kirakata, all of Japan

[73] Assignee: Matsushita Electric Industrial Co., Ltd., Japan

[21] Appl. No.: 697,236

[22] Filed: Aug. 21, 1996

[30] Foreign Application Priority Data

Aug. 22, 1995 [JP] Japan .................................... 7-213206
Apr. 18, 1996 [JP] Japan .................................... 8-096508
May 17, 1996 [JP] Japan .................................... 8-148107

[51] Int. Cl.$^6$ ........................................................ G11B 7/00
[52] U.S. Cl. ................................ 369/54; 369/116; 369/58
[58] Field of Search .............................. 369/54, 116, 53, 369/58, 47, 48, 49, 59

[56] References Cited

U.S. PATENT DOCUMENTS 5,140,580  8/1992  Ohara et al. .
5,504,728  4/1996  Yokota et al. ............................ 369/54
5,629,913  5/1997  Kaku et al. ............................... 369/54
5,642,343  6/1997  Toda et al. ................................ 369/54

FOREIGN PATENT DOCUMENTS 7-57267  3/1995  Japan .

*Primary Examiner*—Muhammad N. Edun
*Attorney, Agent, or Firm*—Parkhurst & Wendel

[57] ABSTRACT

An optical disk device comprises a power ratio setting circuit for setting ratio of recording power to erasing power in a predetermined ratio, a recording start point detection circuit for detecting a recording start point by performing at least two cycle recording over the same area in a predetermined test region to detect a recording power and an erasing power of the recording start point, and a power setting circuit for setting a final recording power and erasing power for recording in a user region of the optical disk by multiplying the recording power and the erasing power of the recording start point by predetermined values respectively.

24 Claims, 52 Drawing Sheets

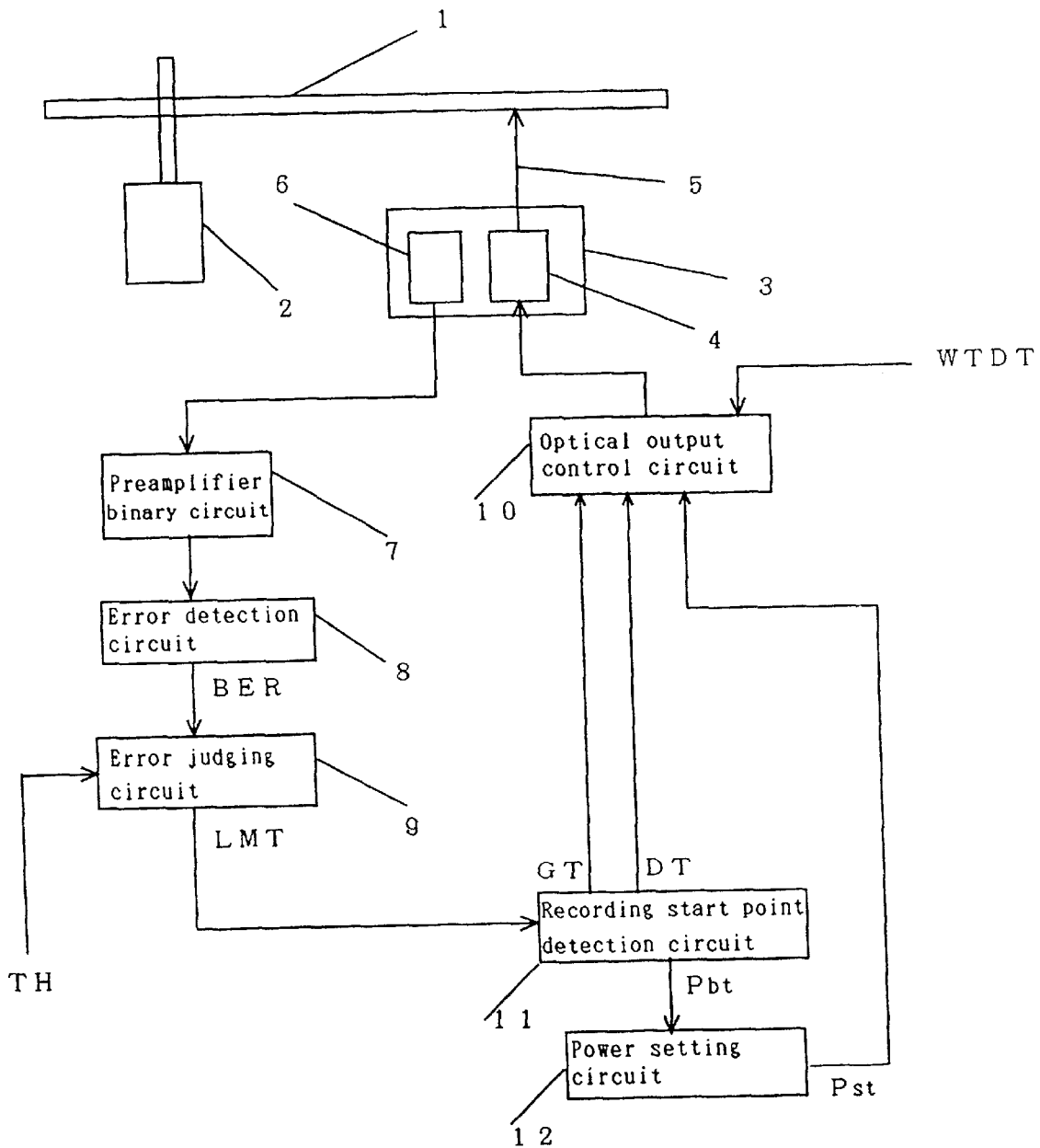

[Fig. 2]
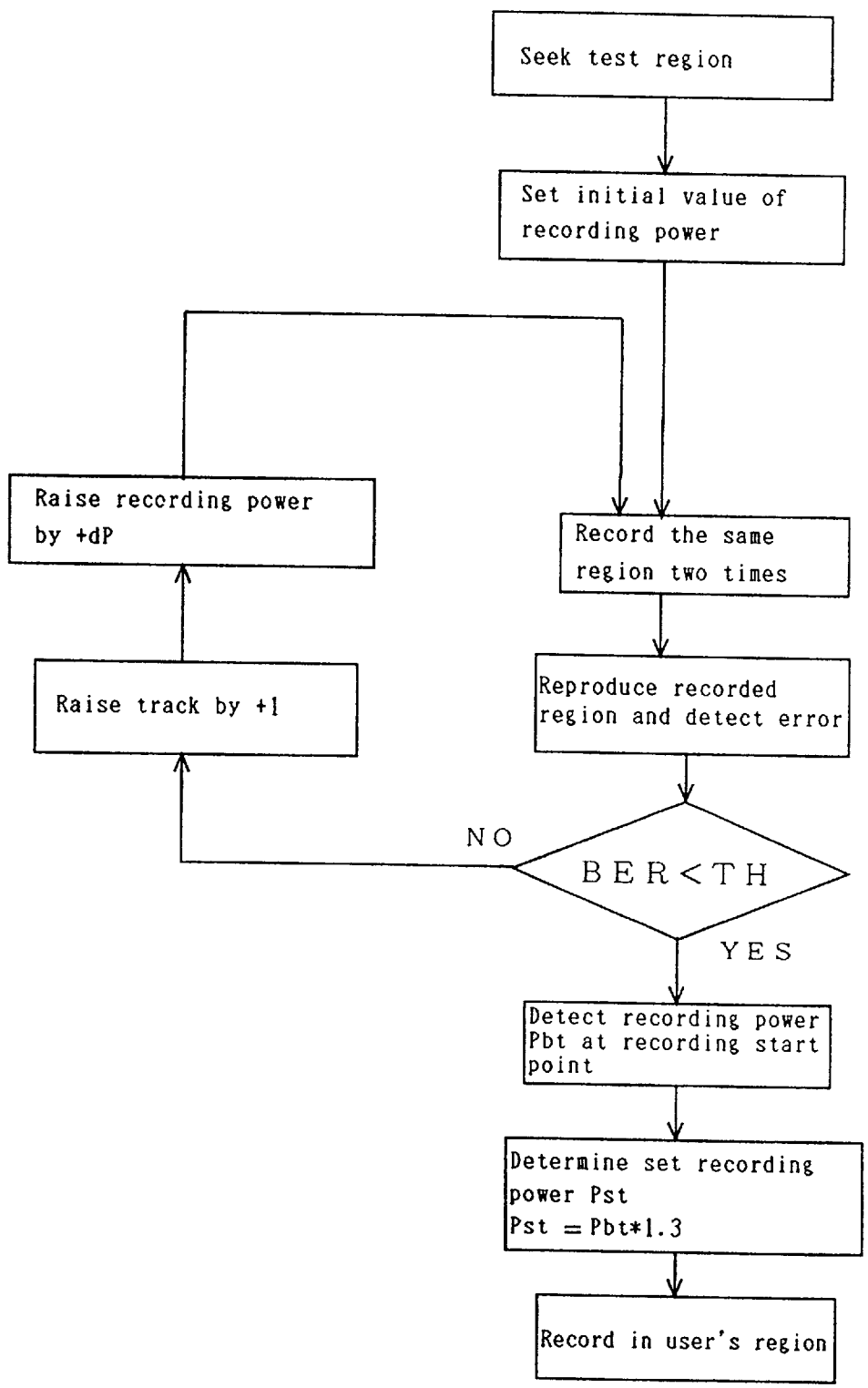

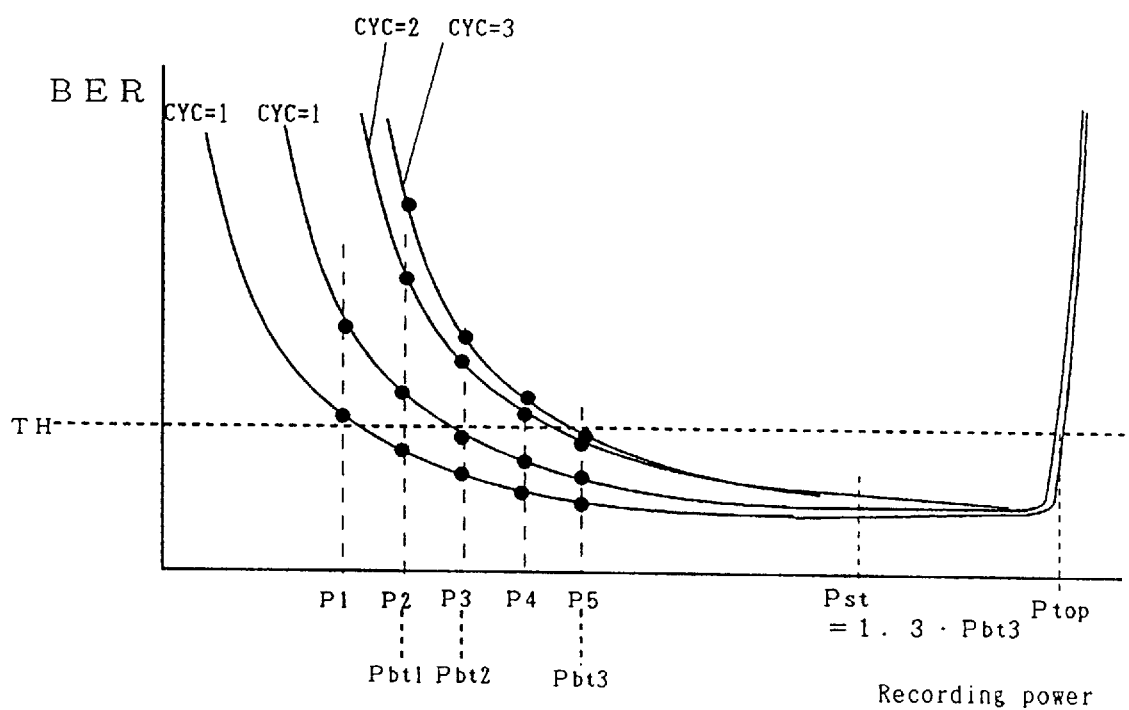
[Fig. 3]

[Fig. 4]
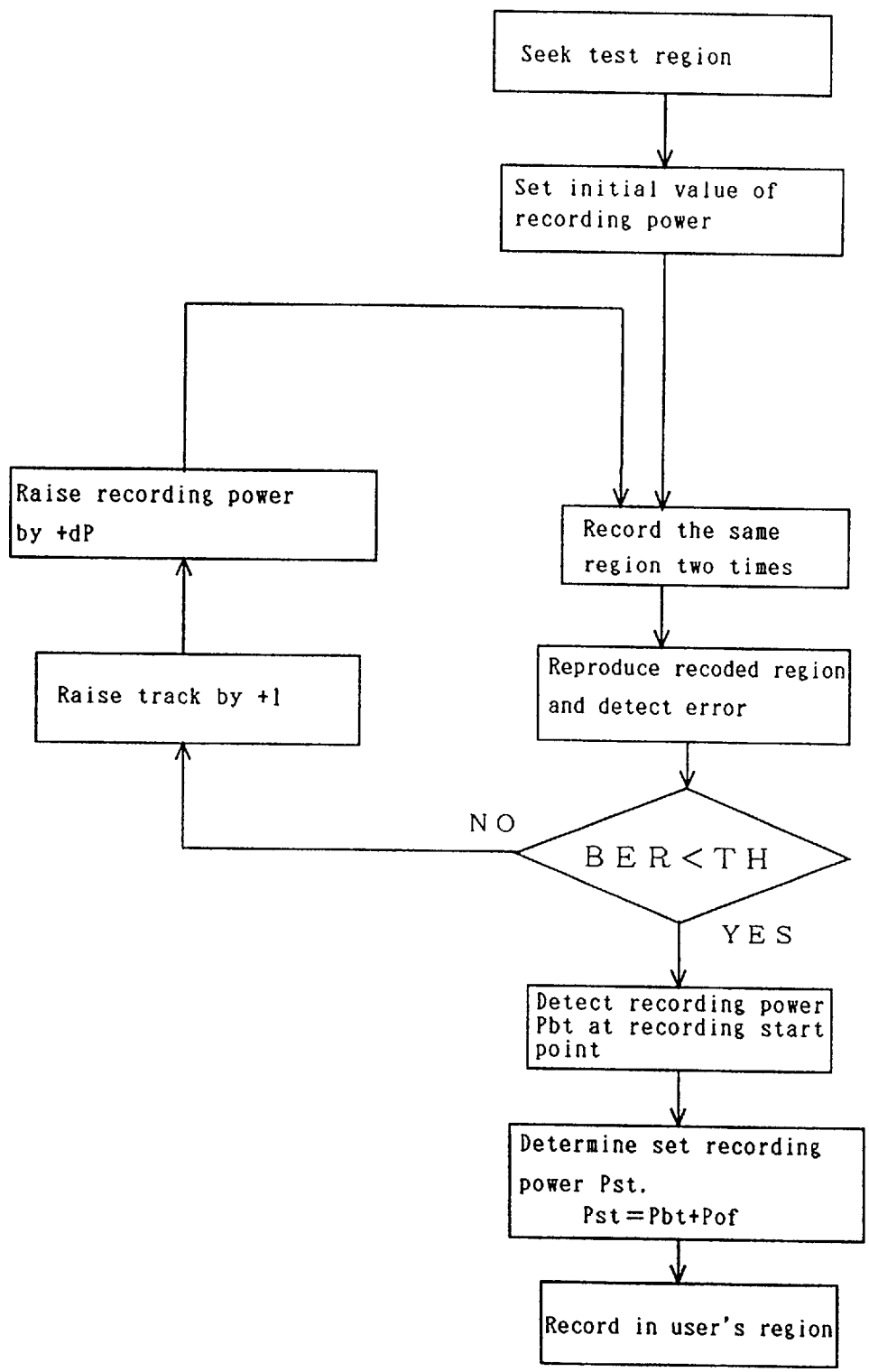

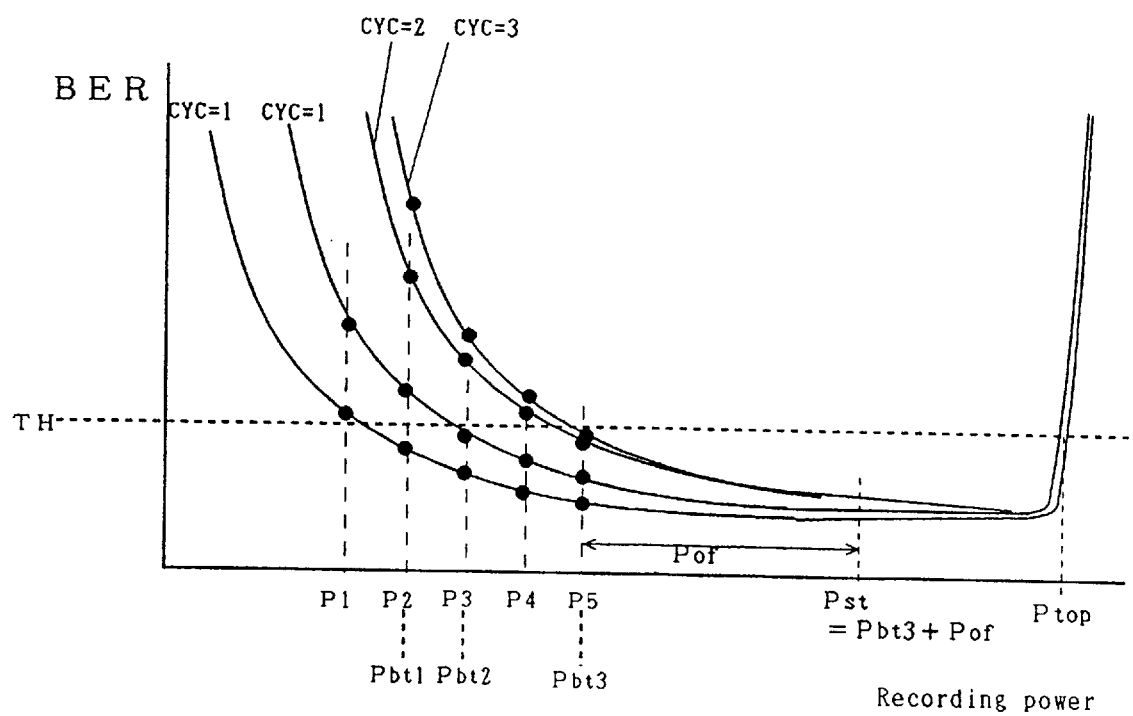
[Fig. 5]

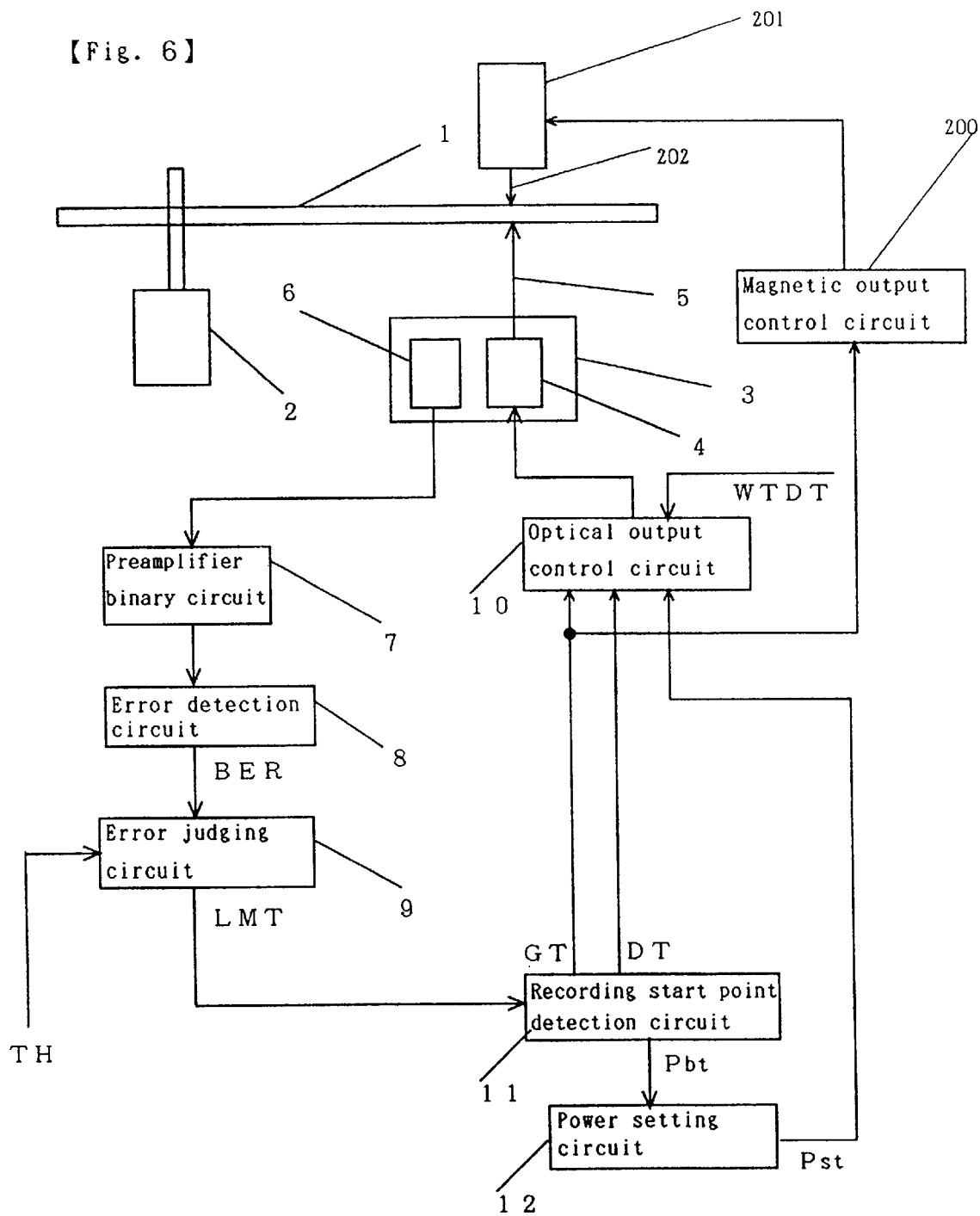
[Fig. 6]

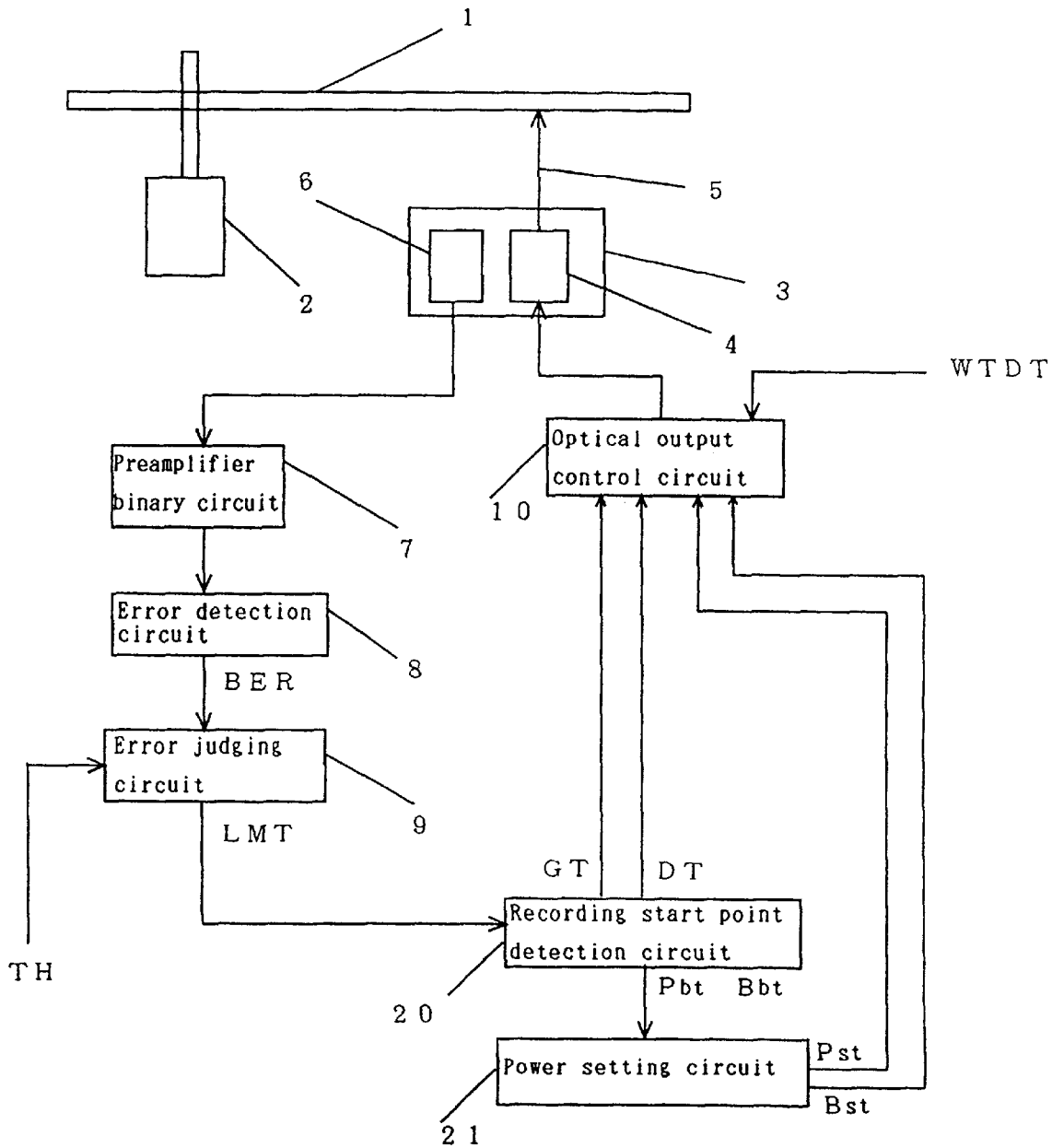

[Fig. 8]
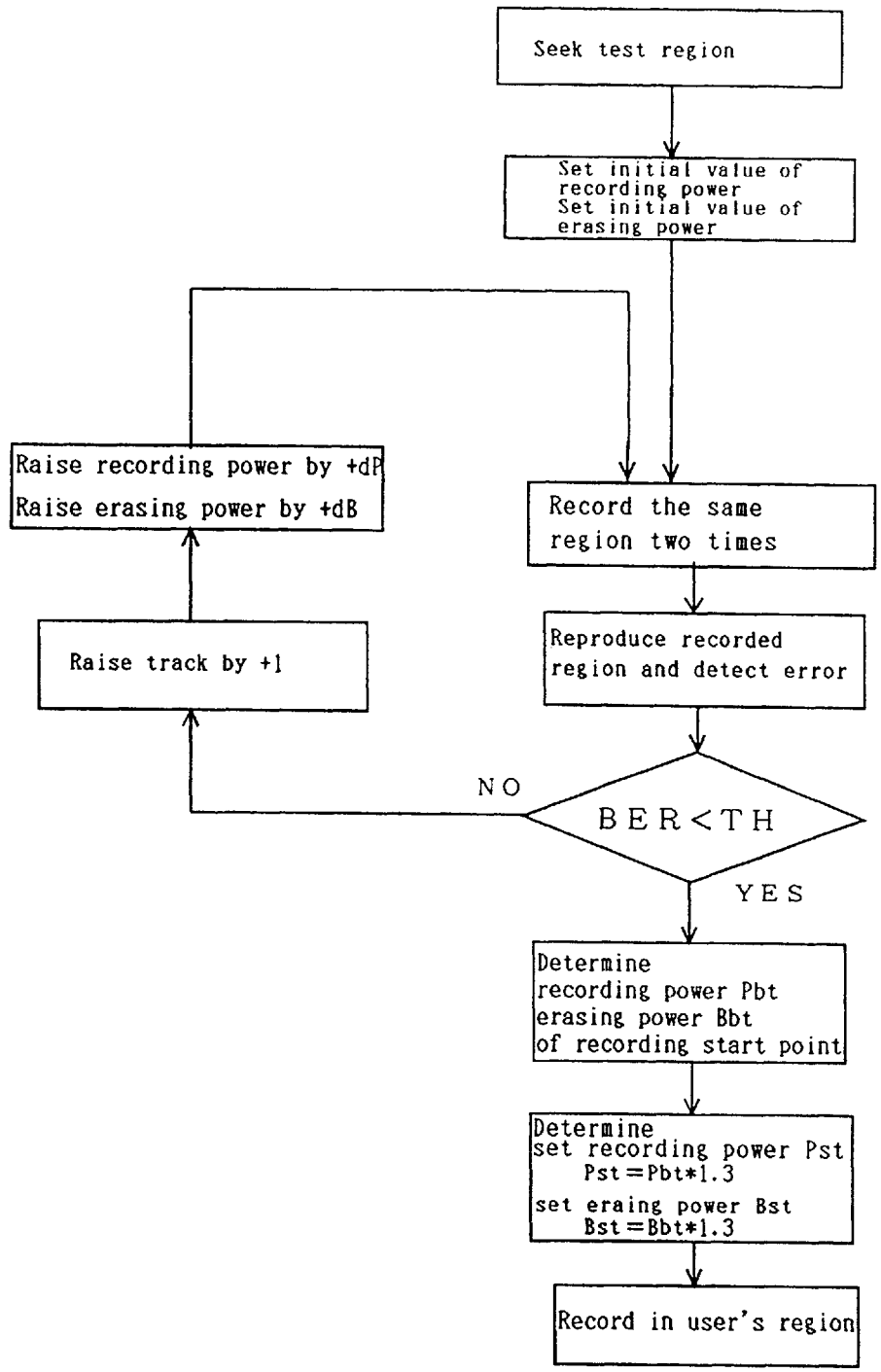

[Fig. 9]
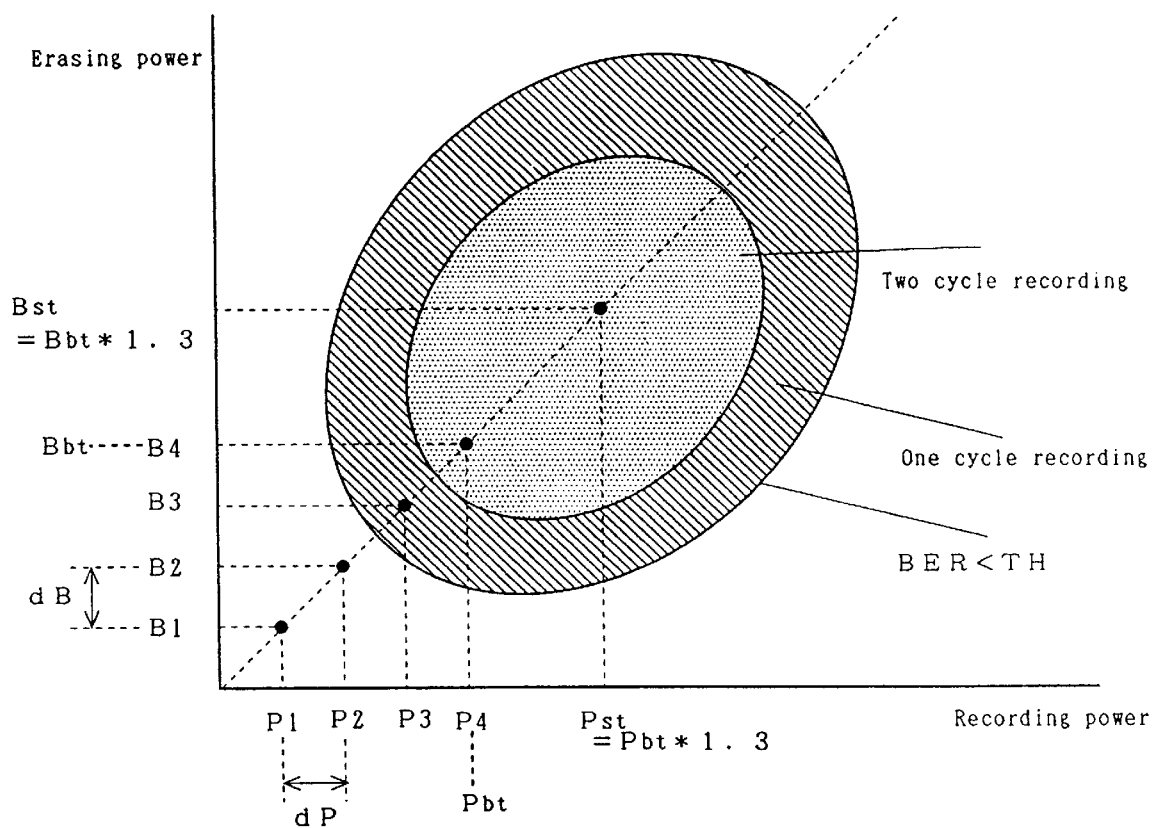

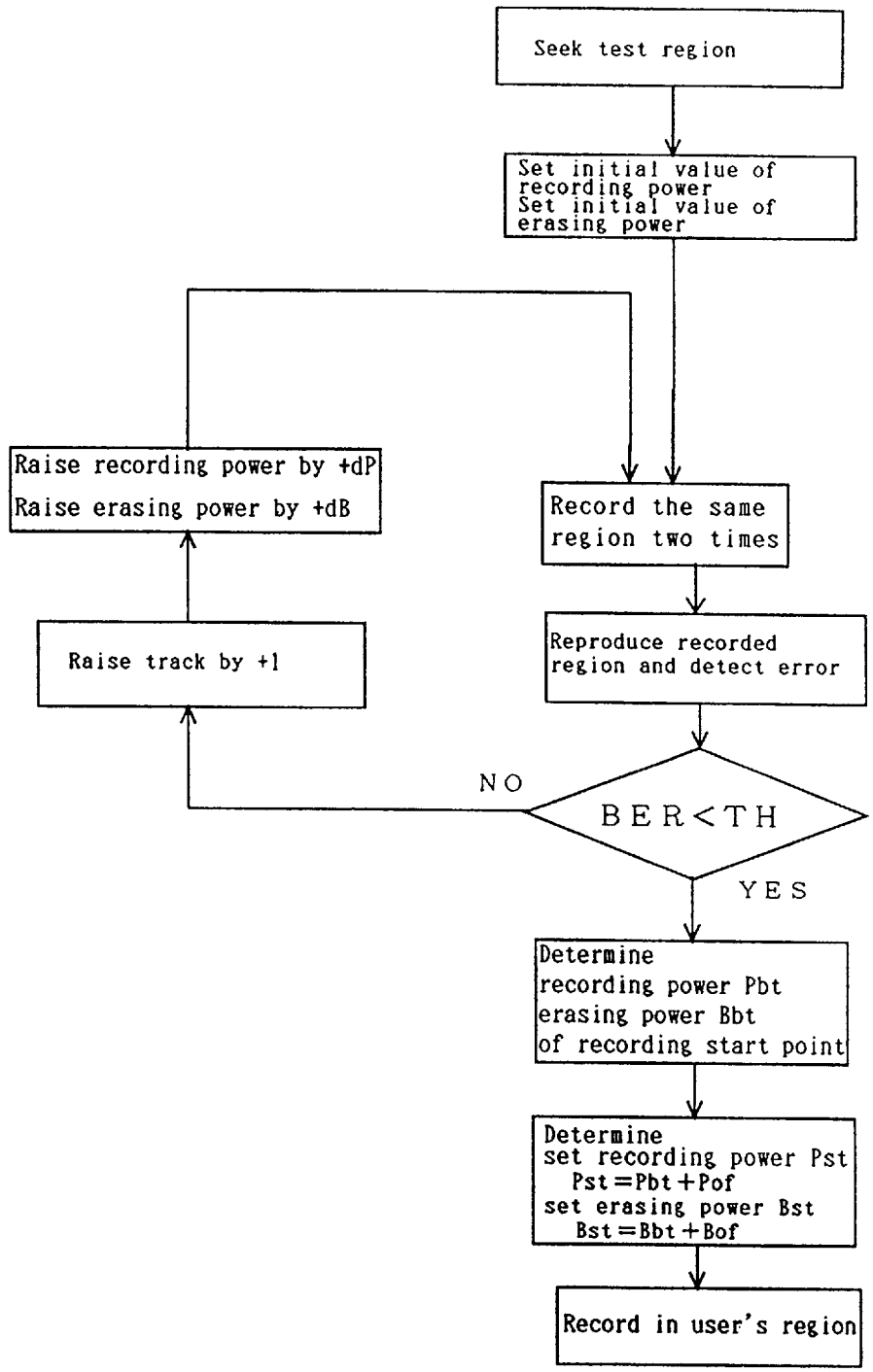
[Fig. 10]

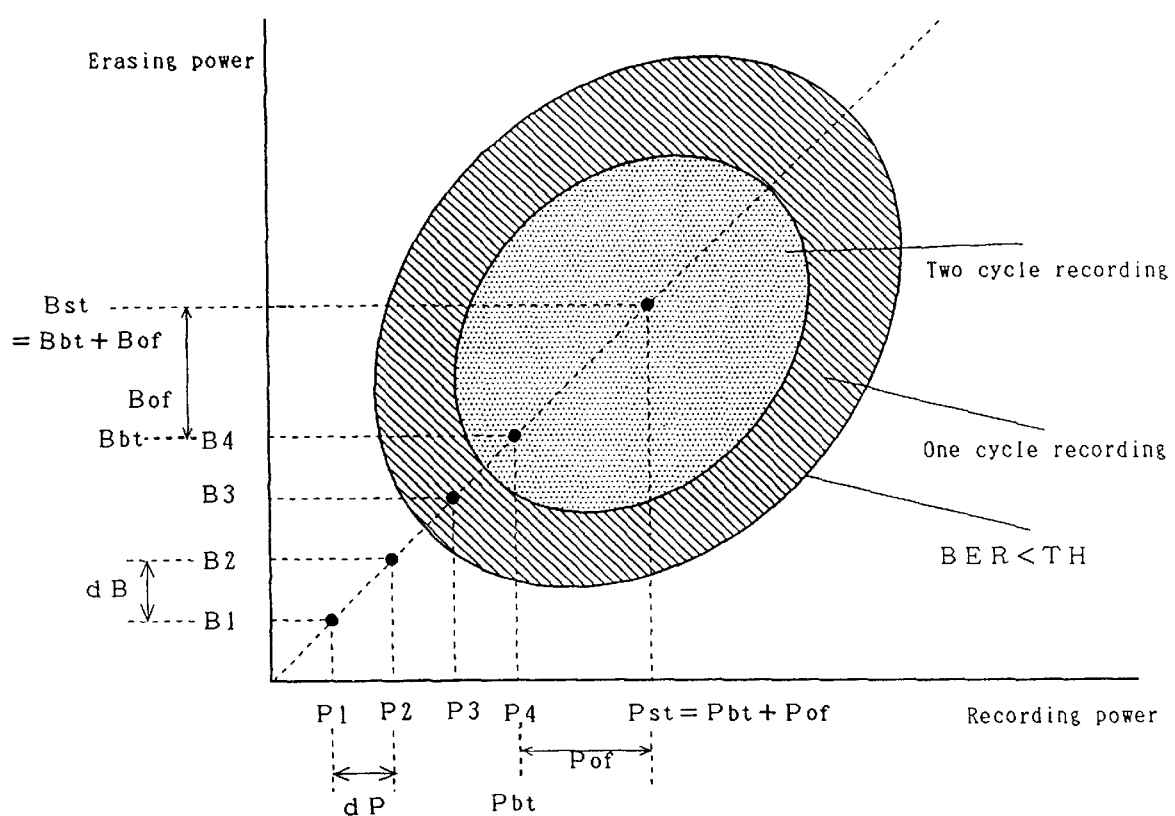
[Fig. 11]

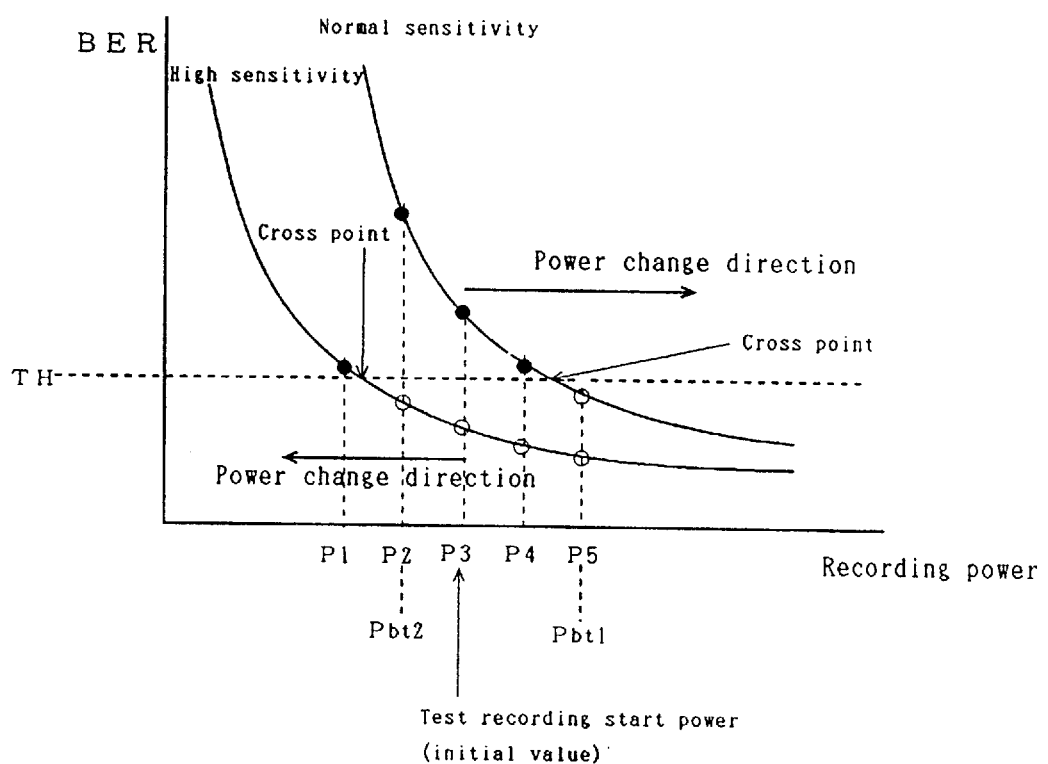
[Fig. 12]

[Fig. 13]
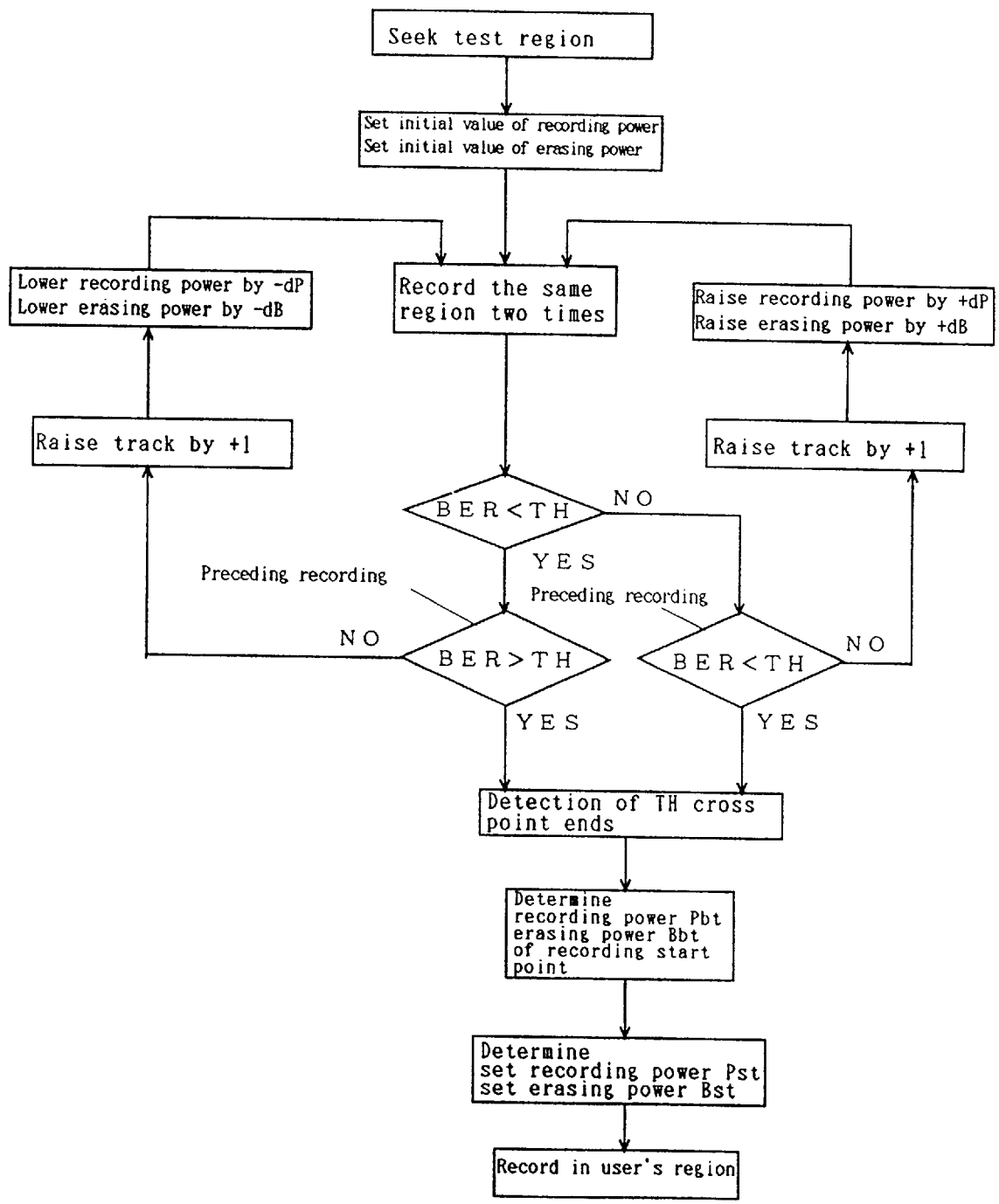

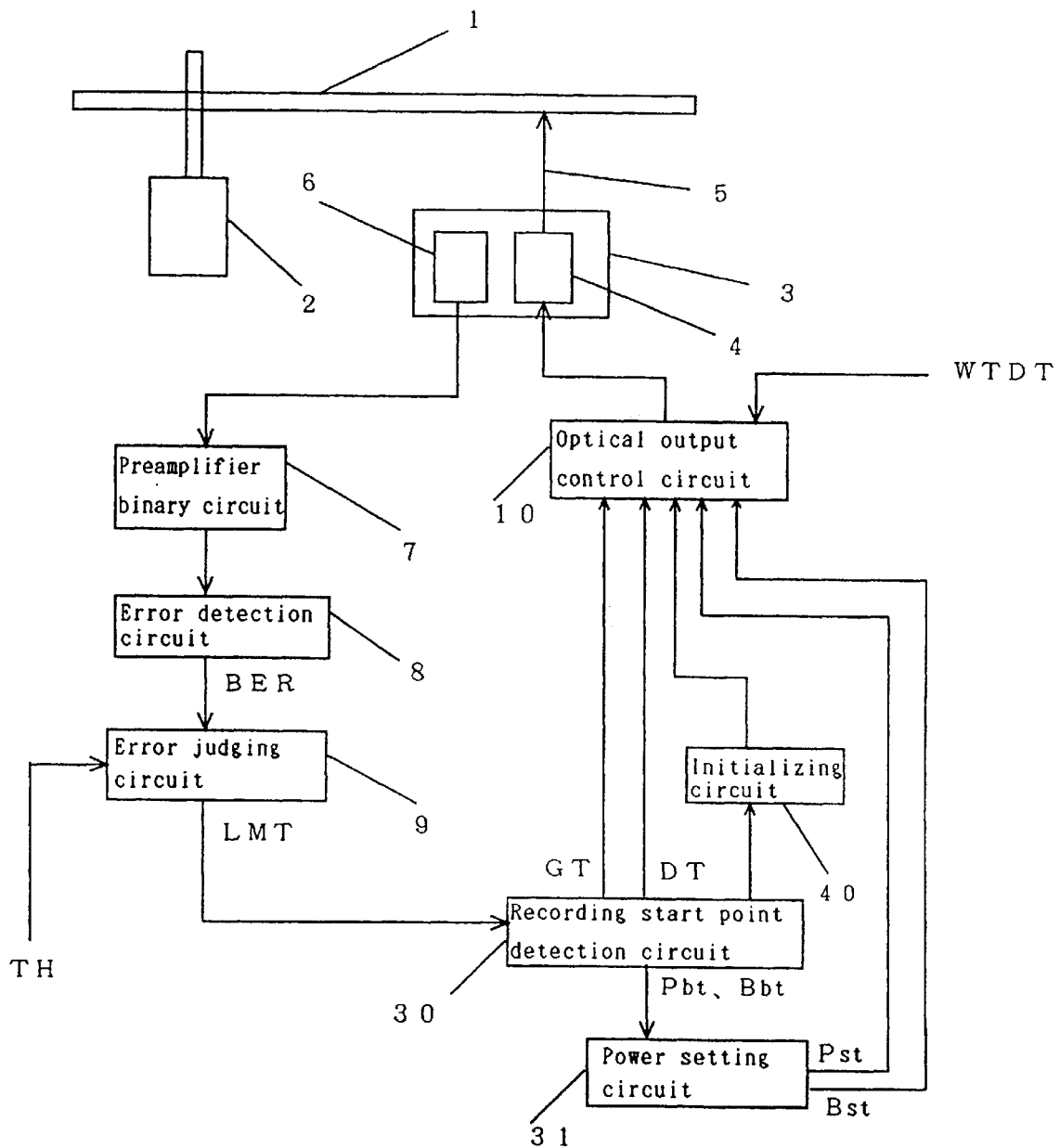
[Fig. 14]

[Fig. 15A]
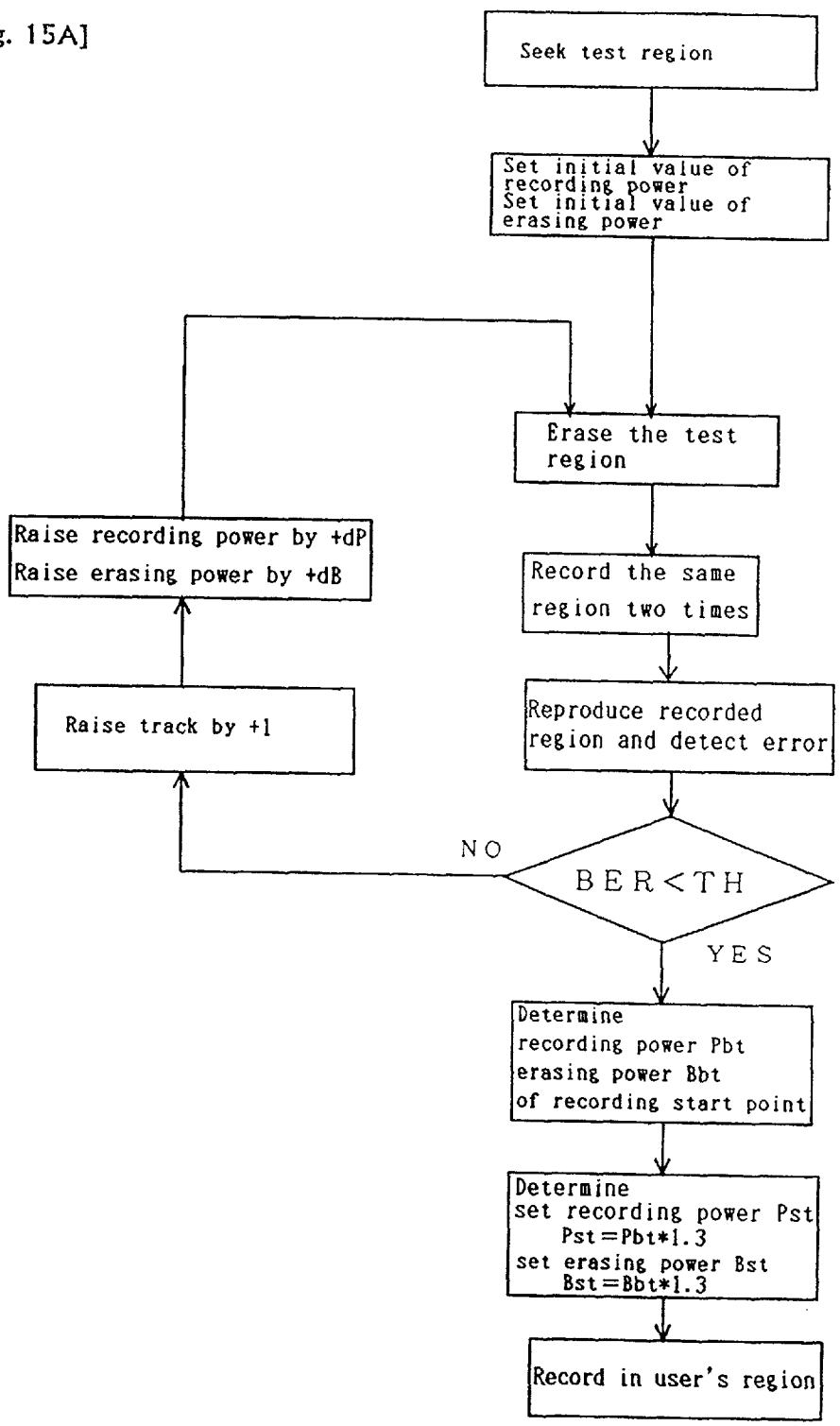

[Fig. 15B]
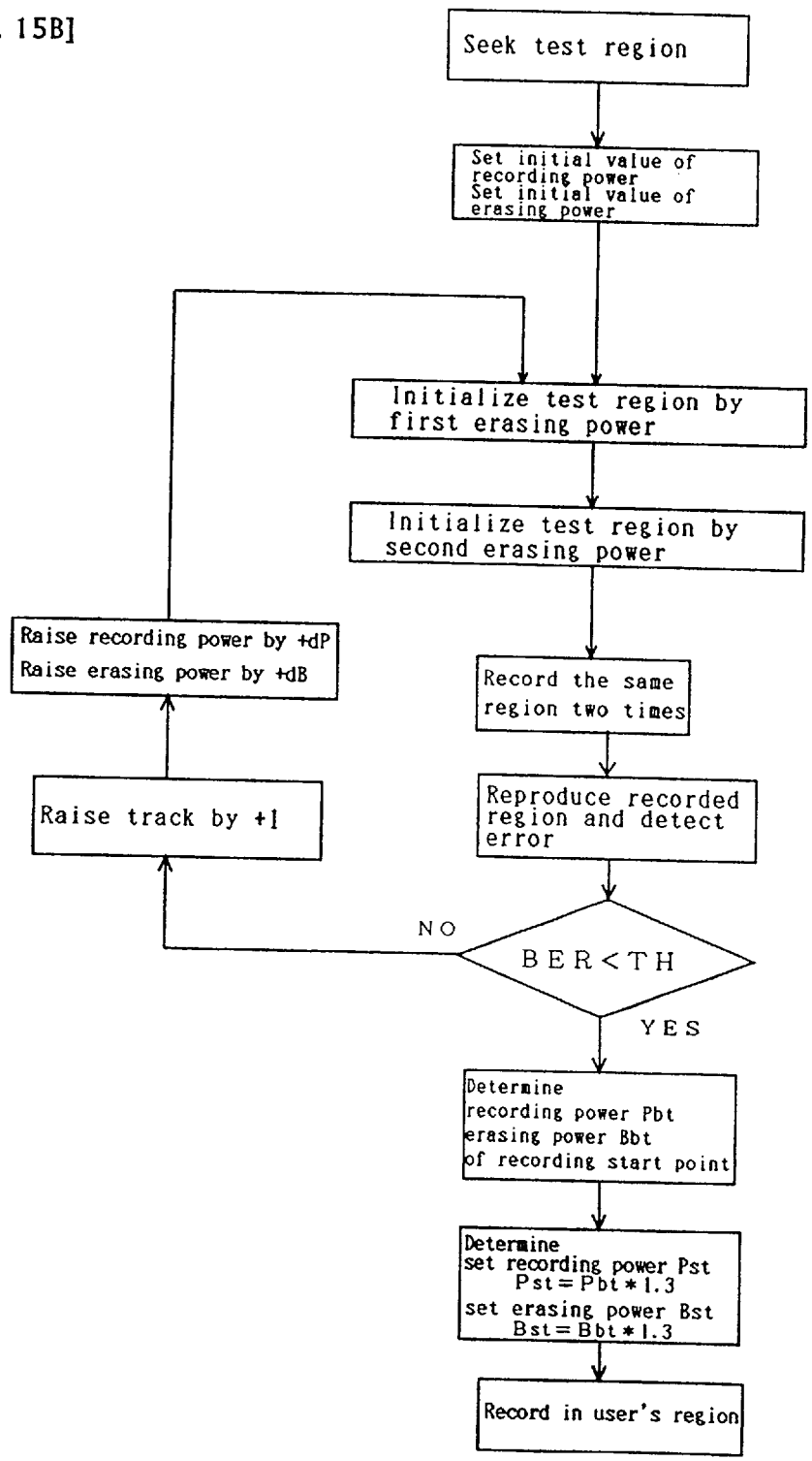

[Fig. 16-A]
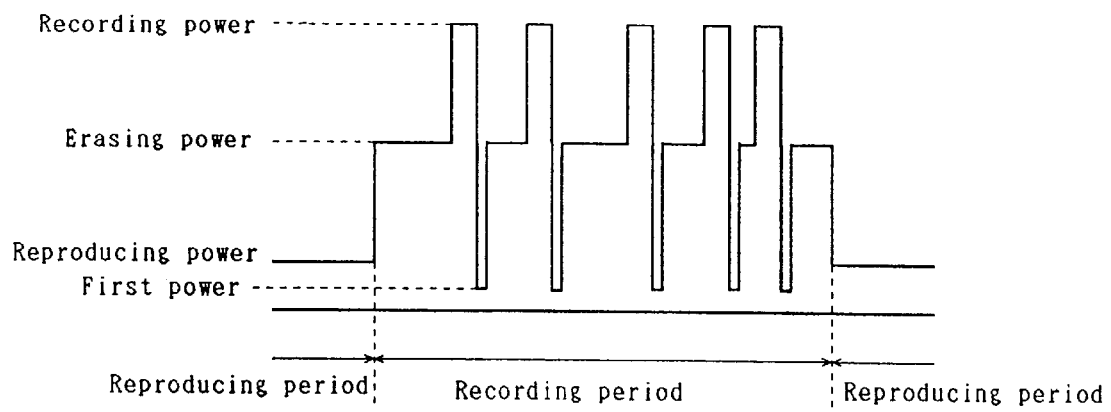
[Fig. 16-B]
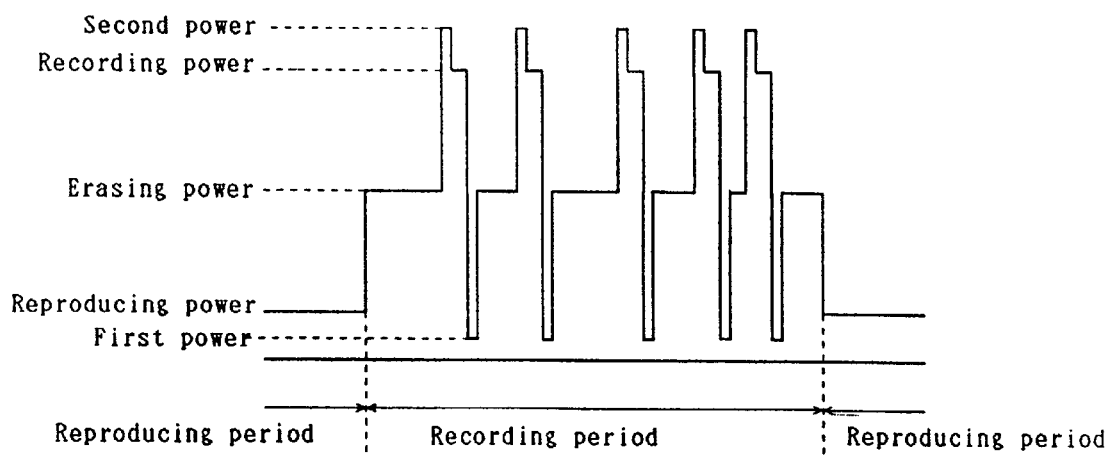

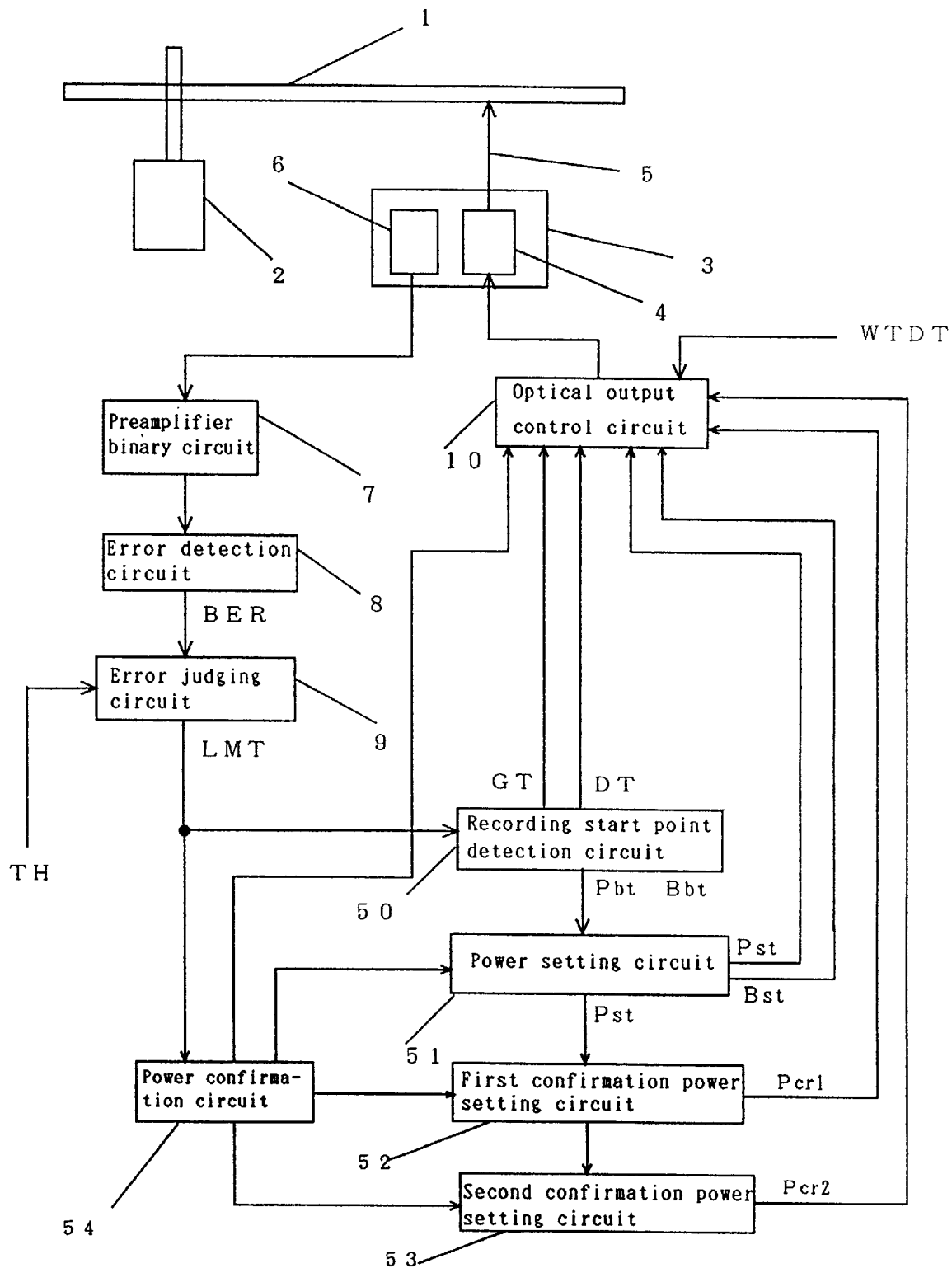
[Fig. 17]

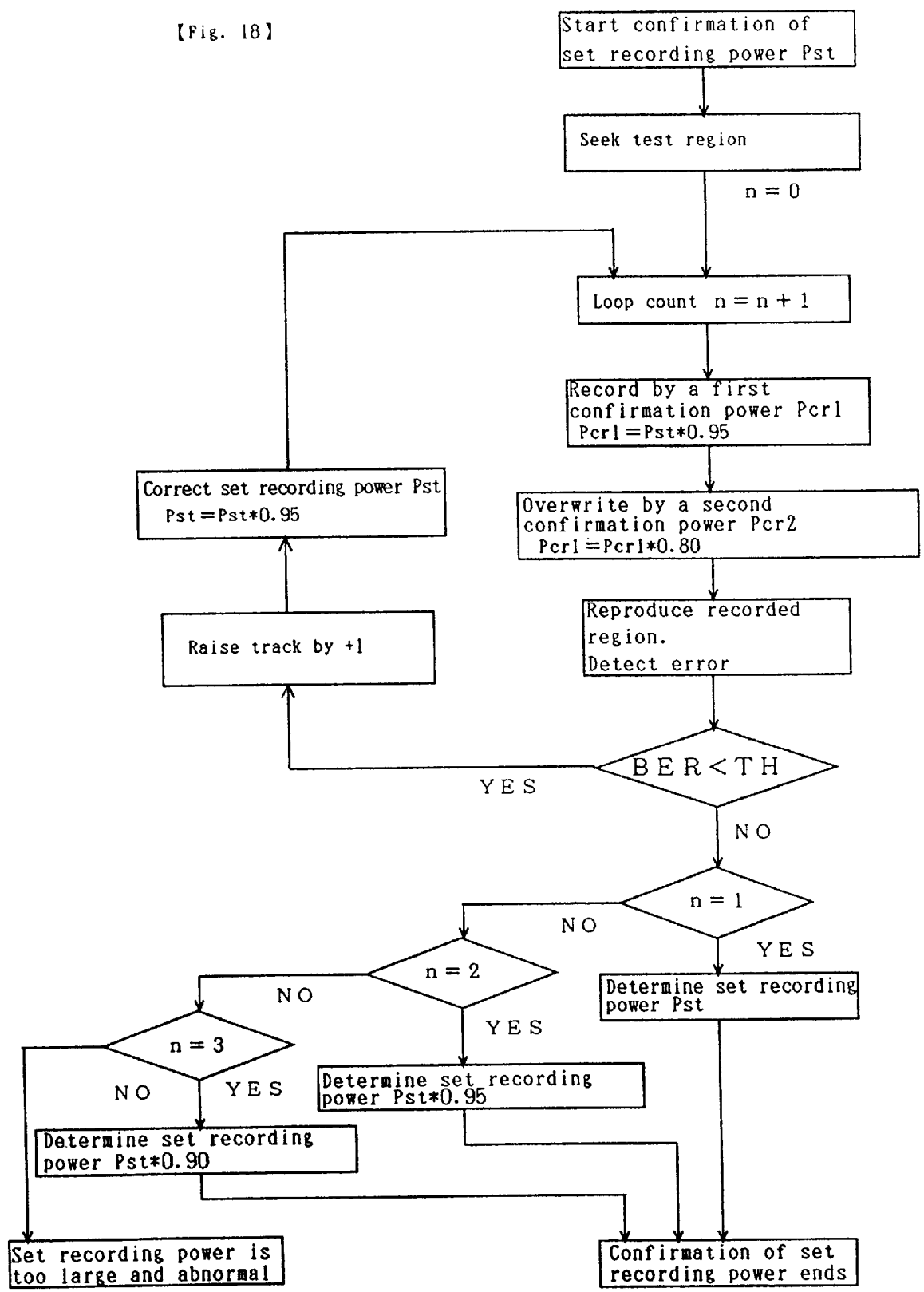
[Fig. 18]

[Fig. 19-A]
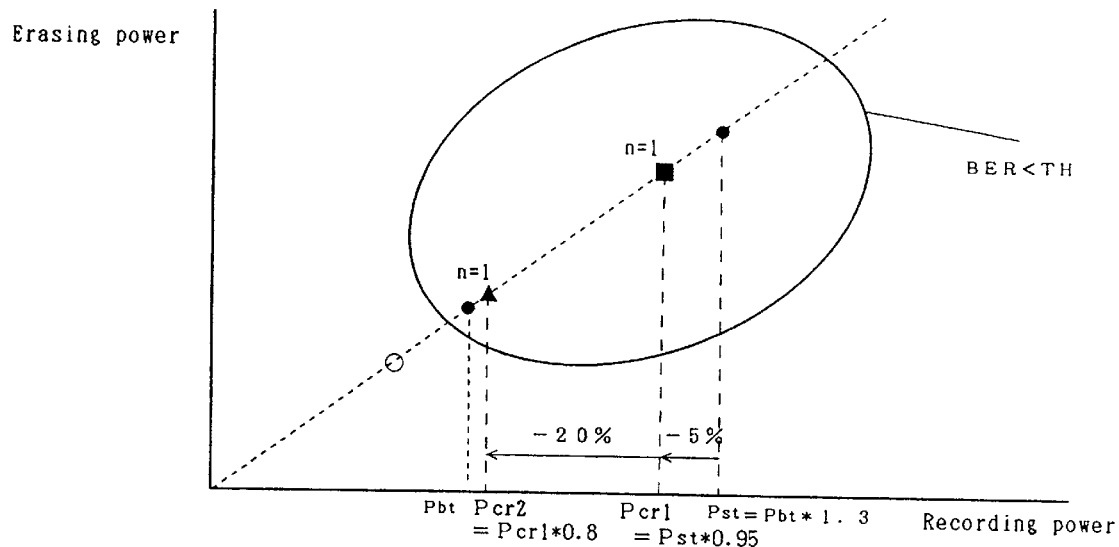
[Fig. 19-B]
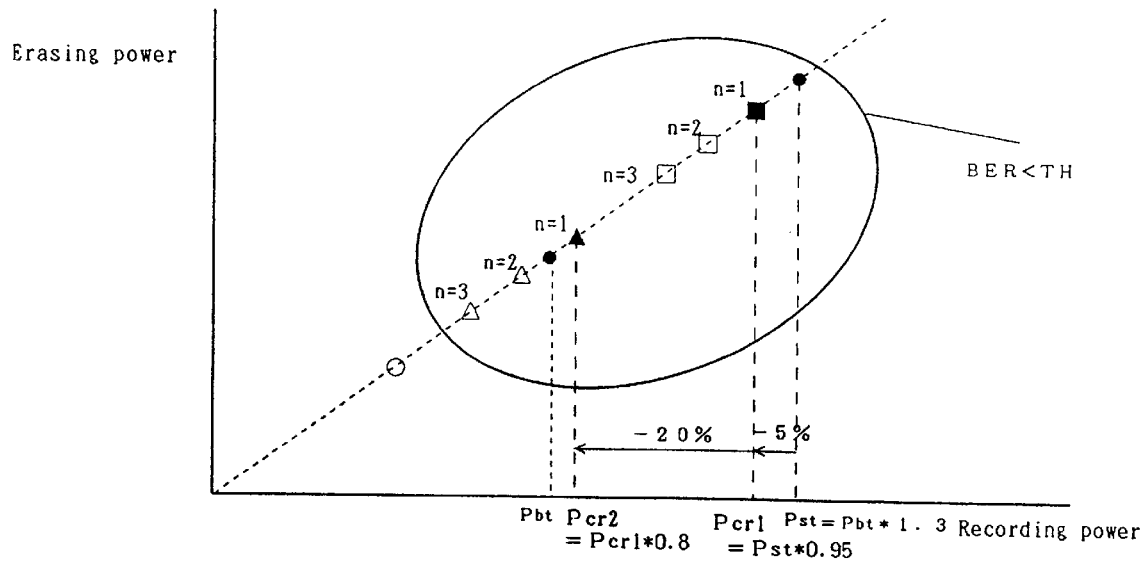

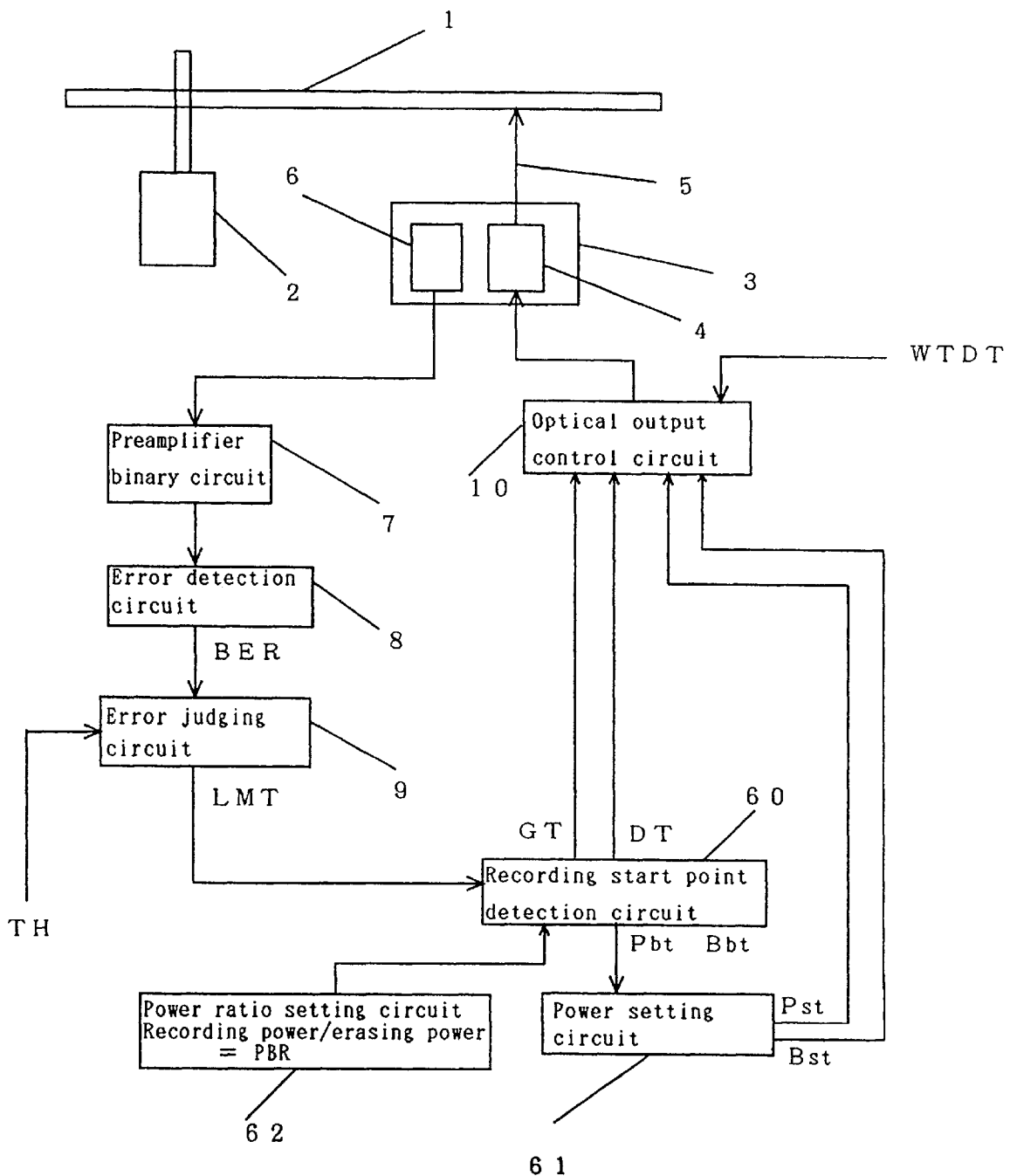
[Fig. 20]

[Fig 21]
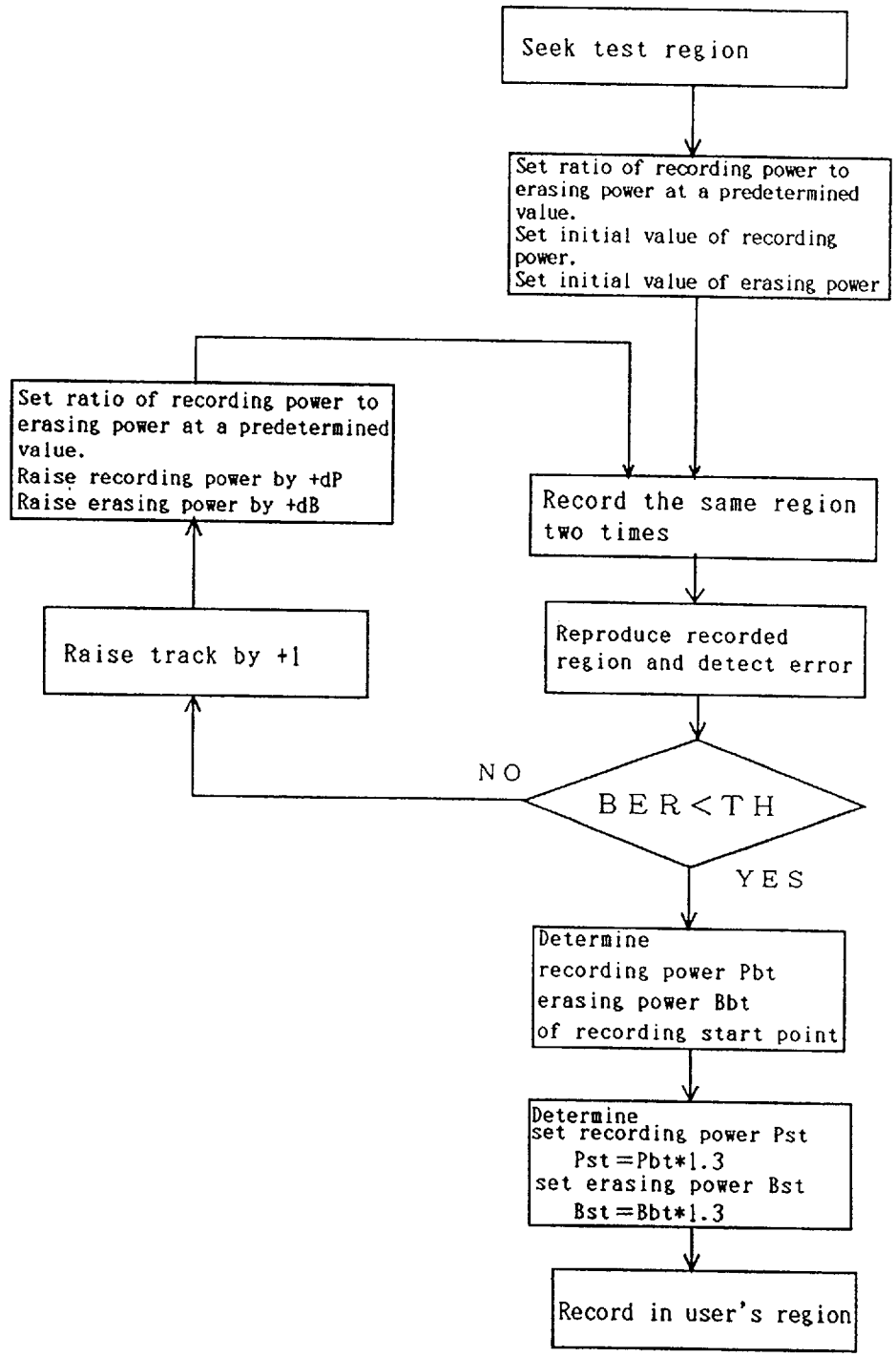

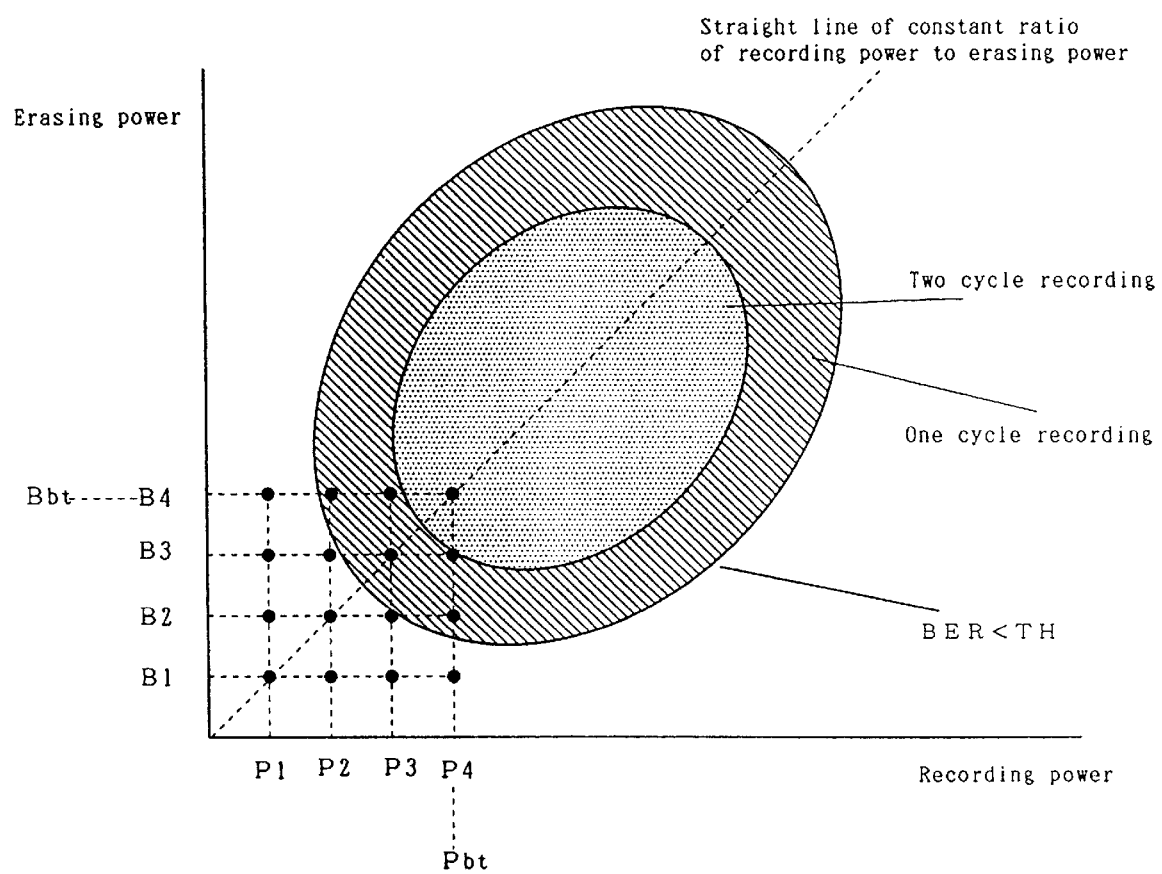
[Fig. 22]

[Fig. 23]
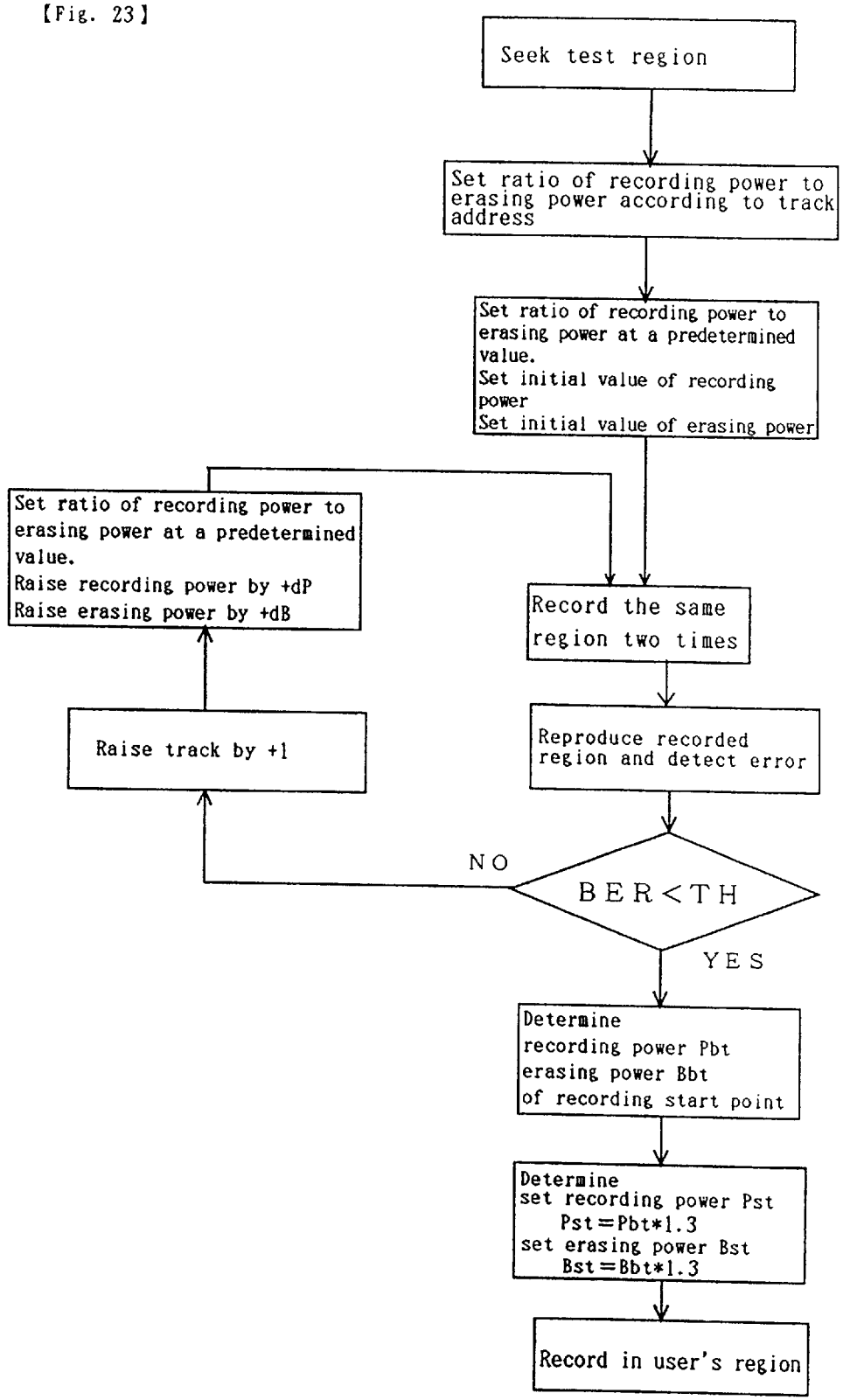

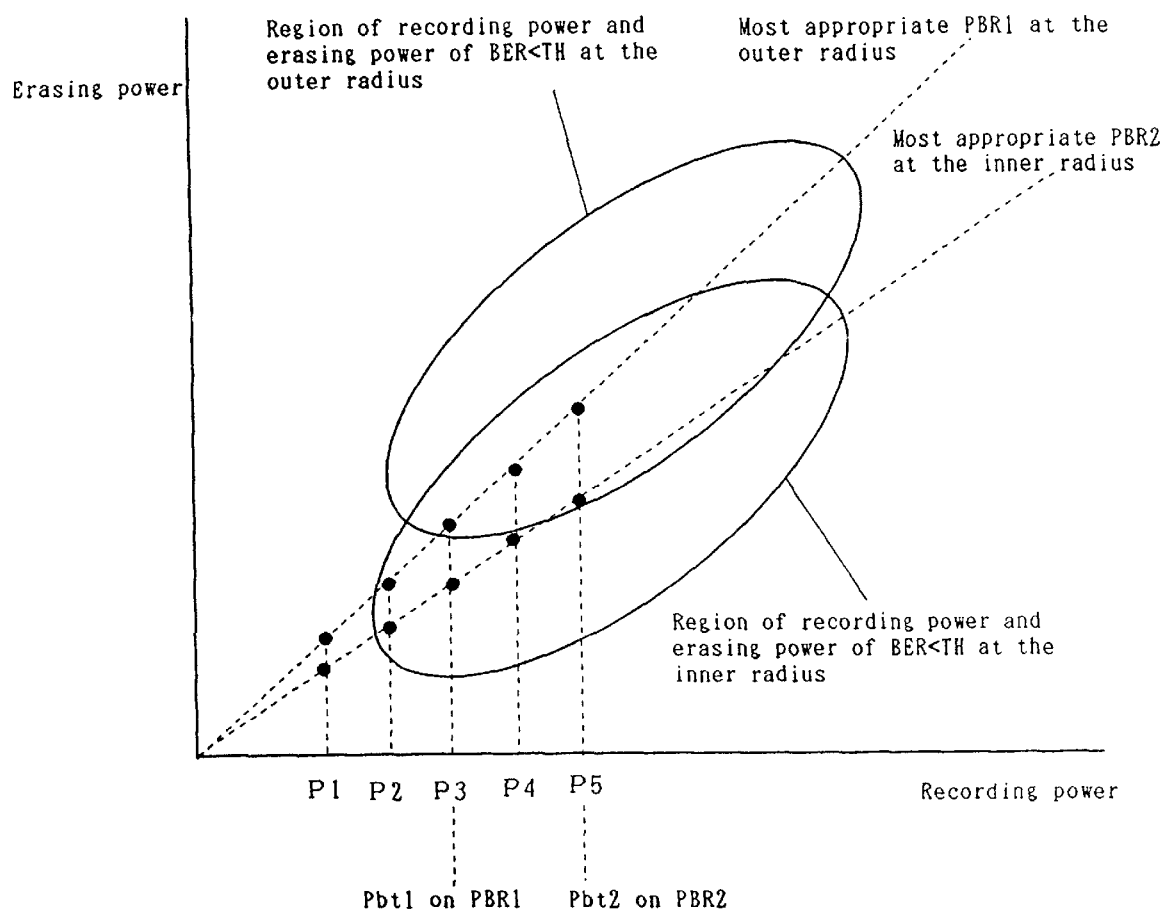
[Fig. 24]

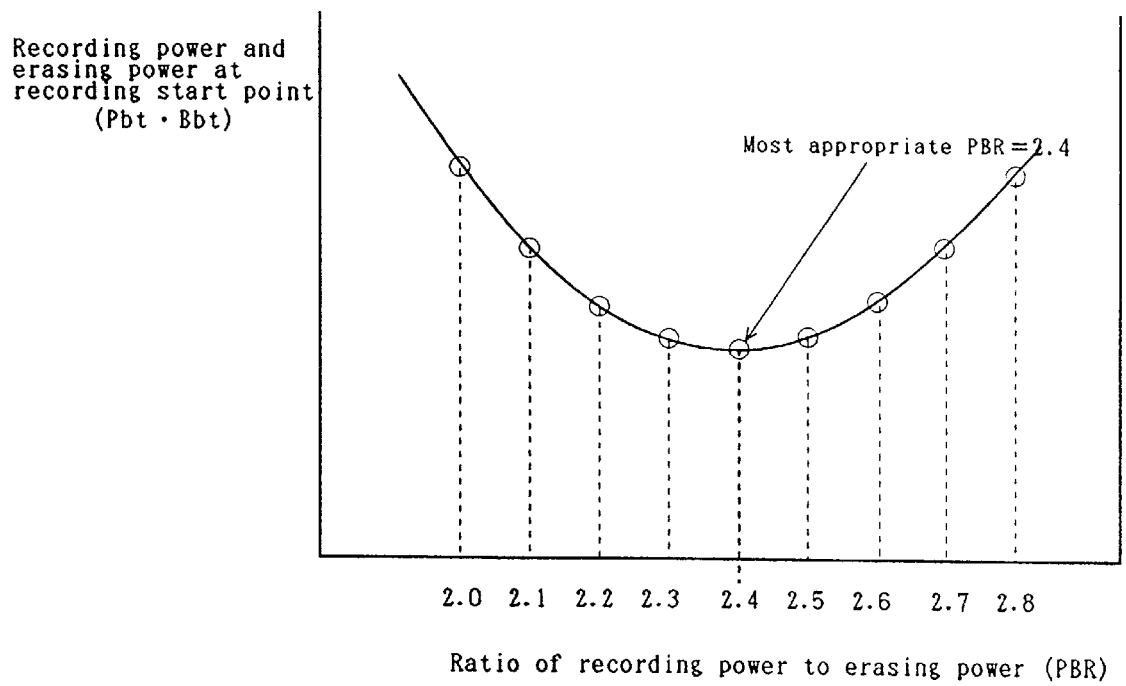
[Fig. 25]

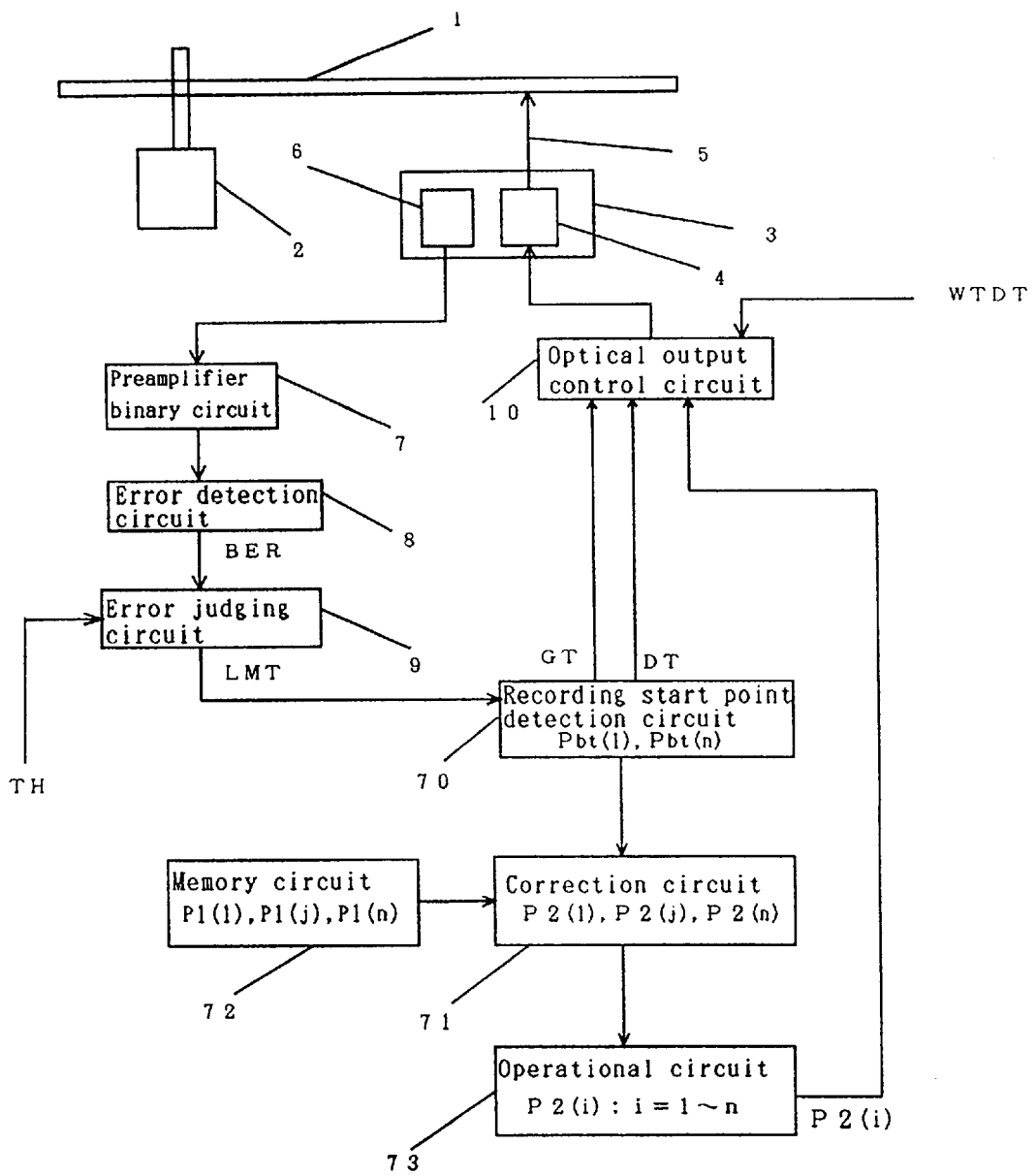
[Fig. 26]

[Fig. 27]
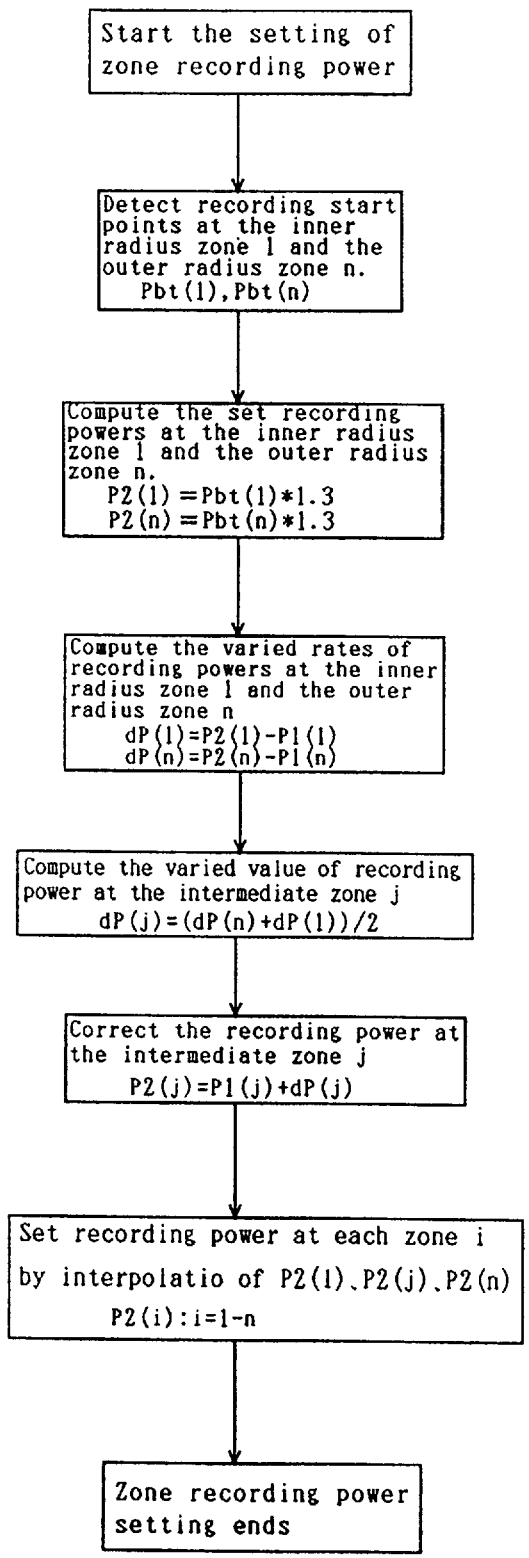

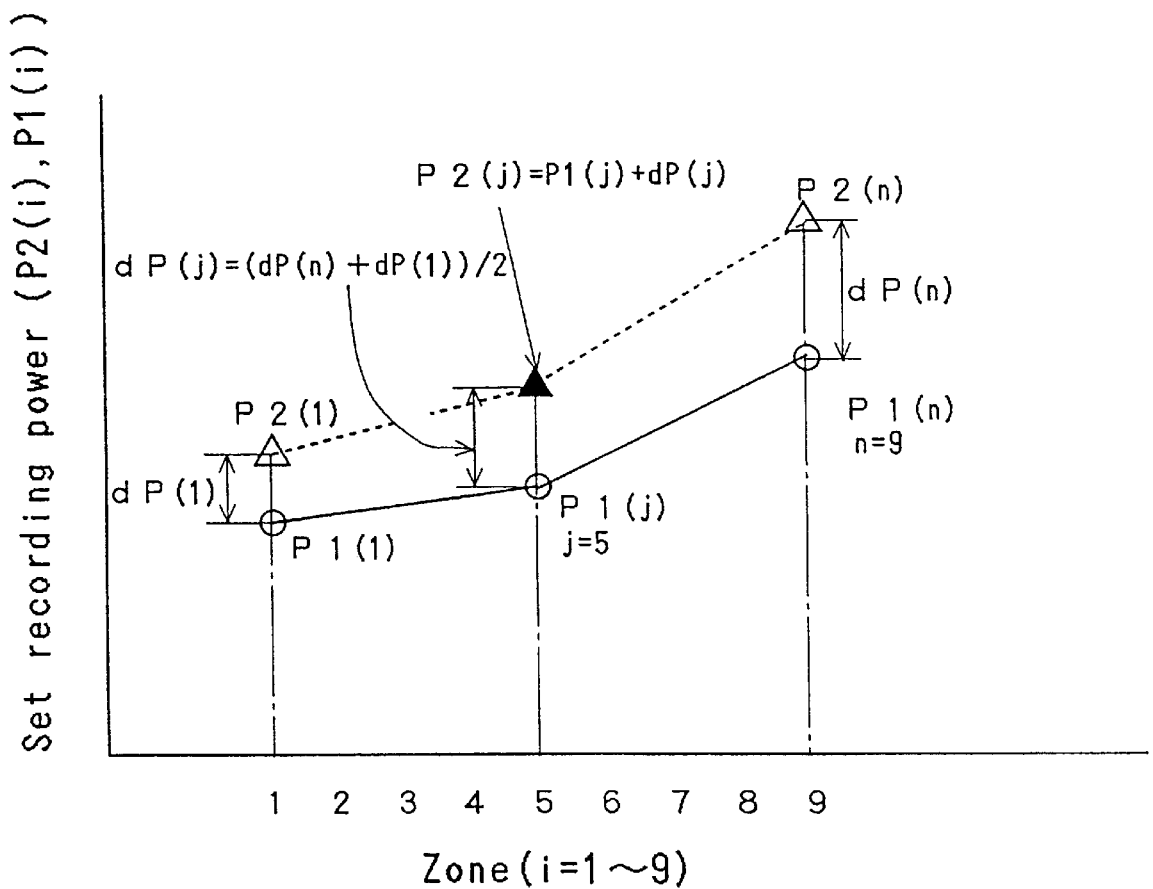
[Fig. 28]

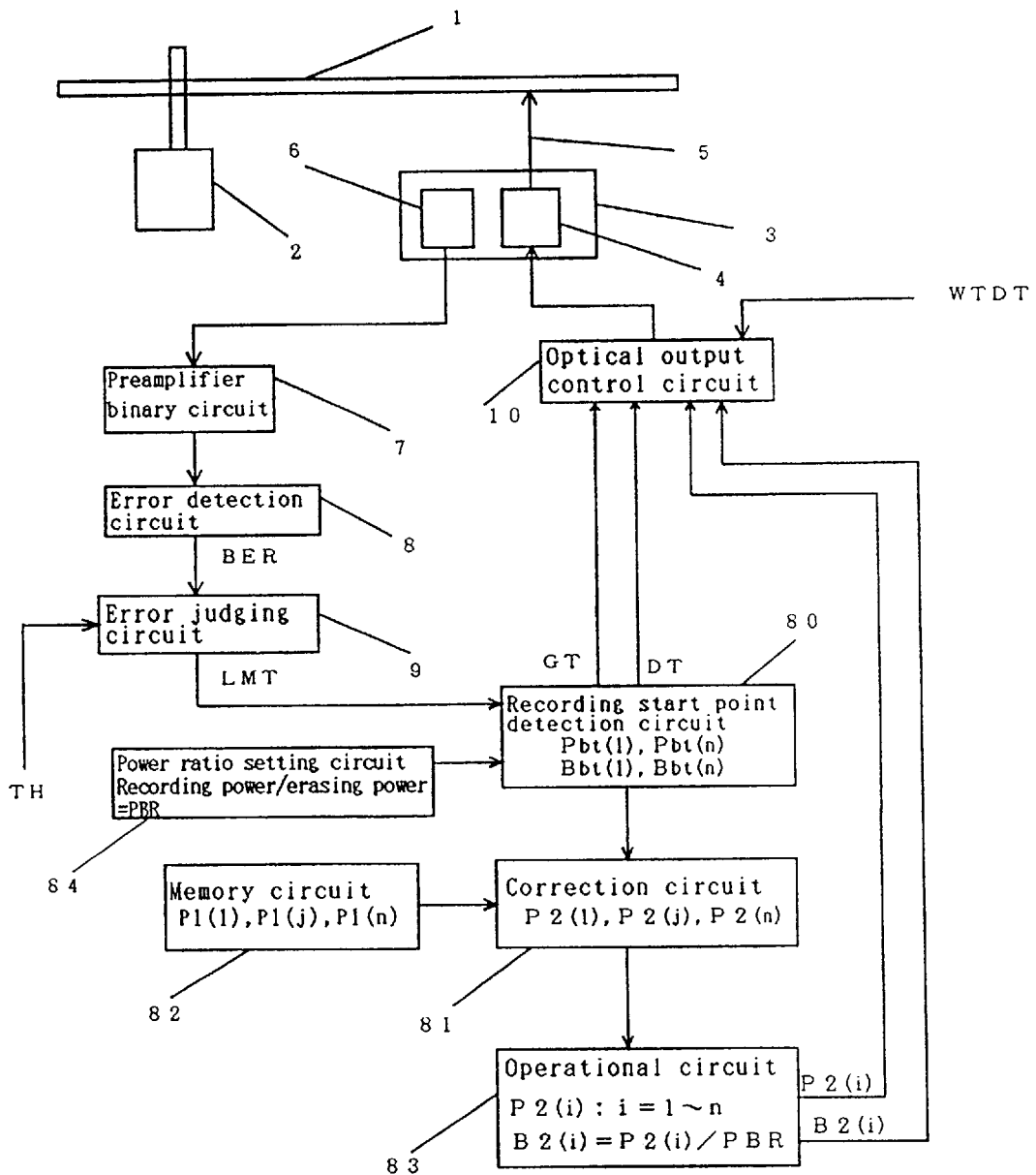
[Fig. 29]

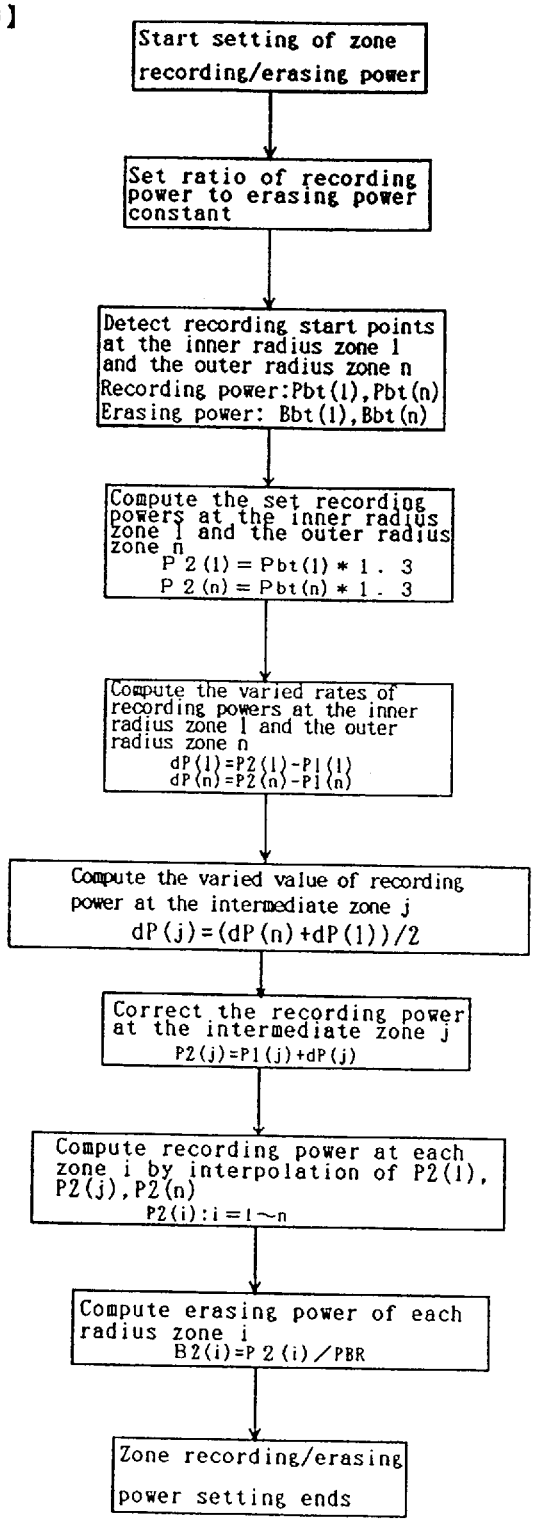
[Fig. 30]

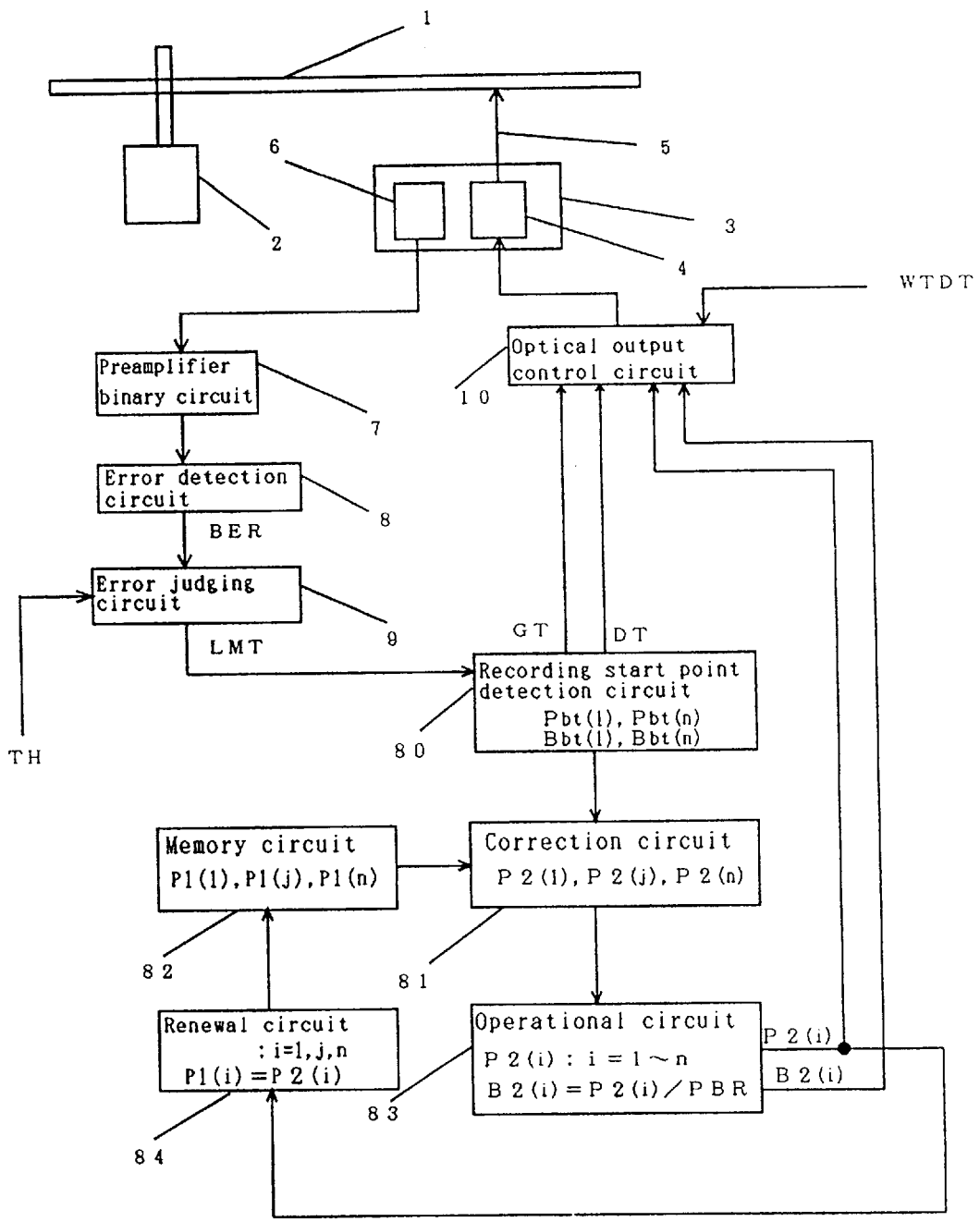
[Fig. 31]

[Fig. 32]
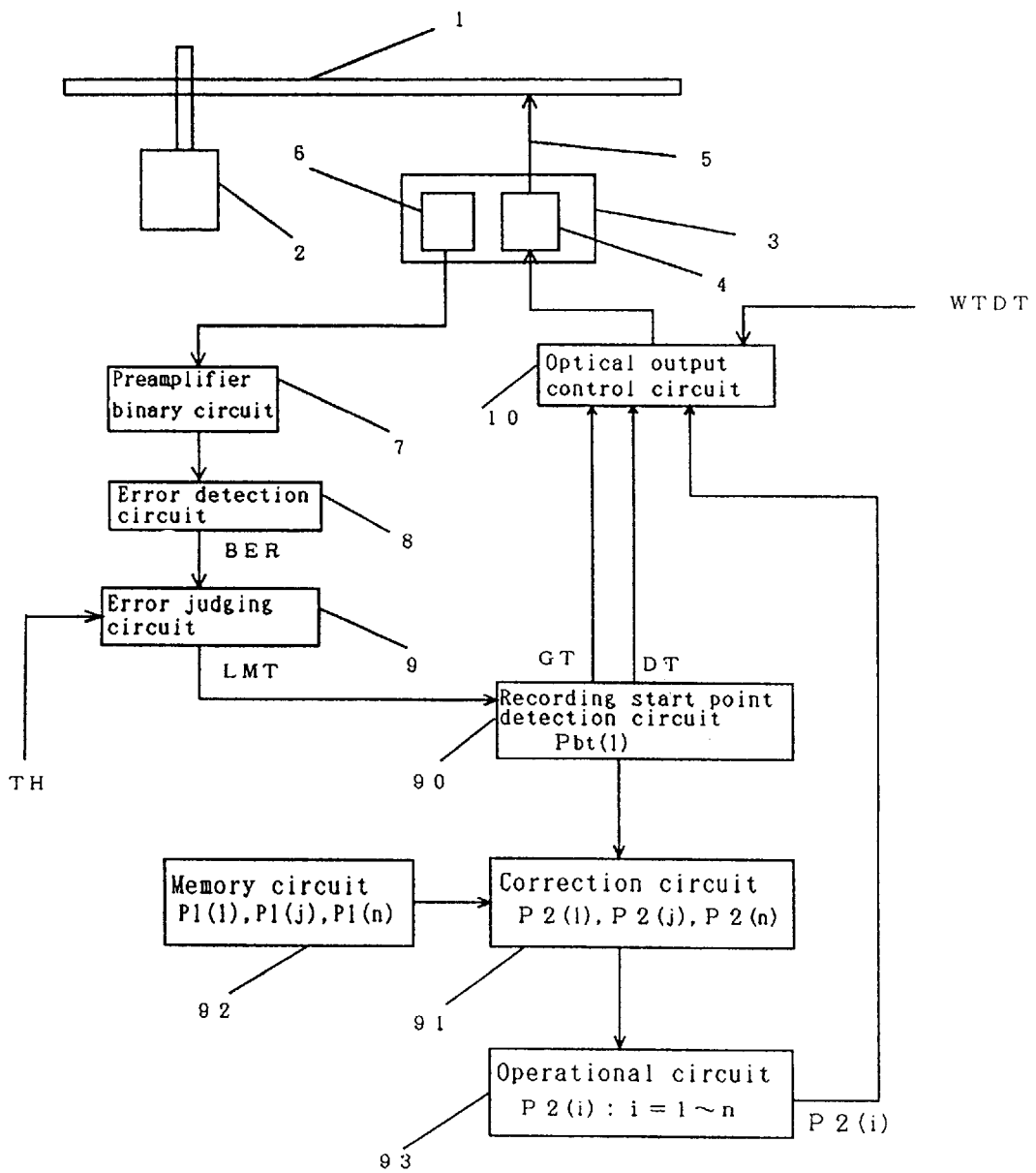

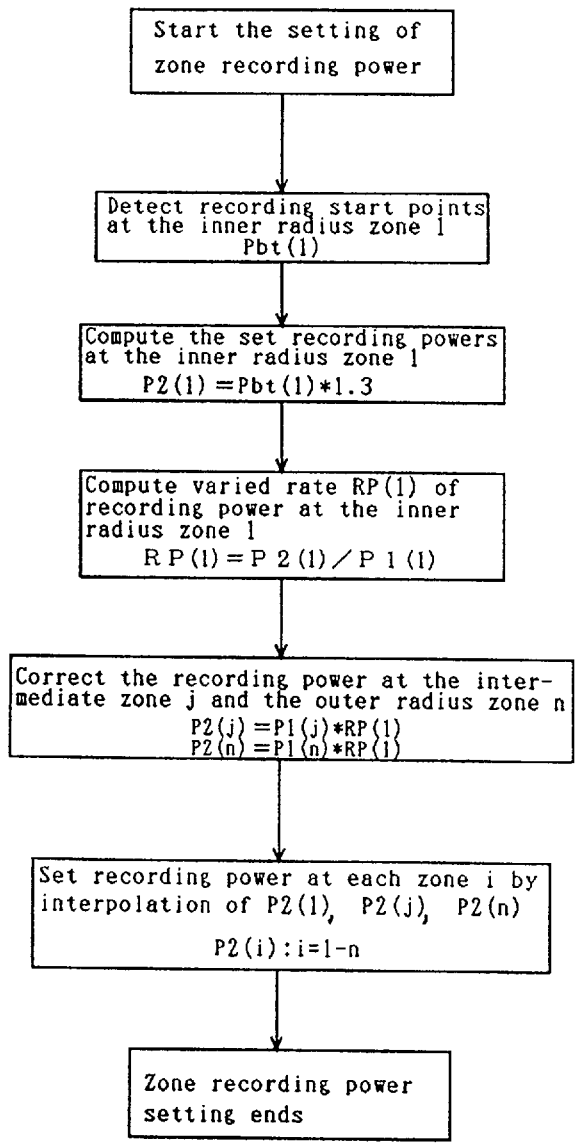
[Fig. 33]

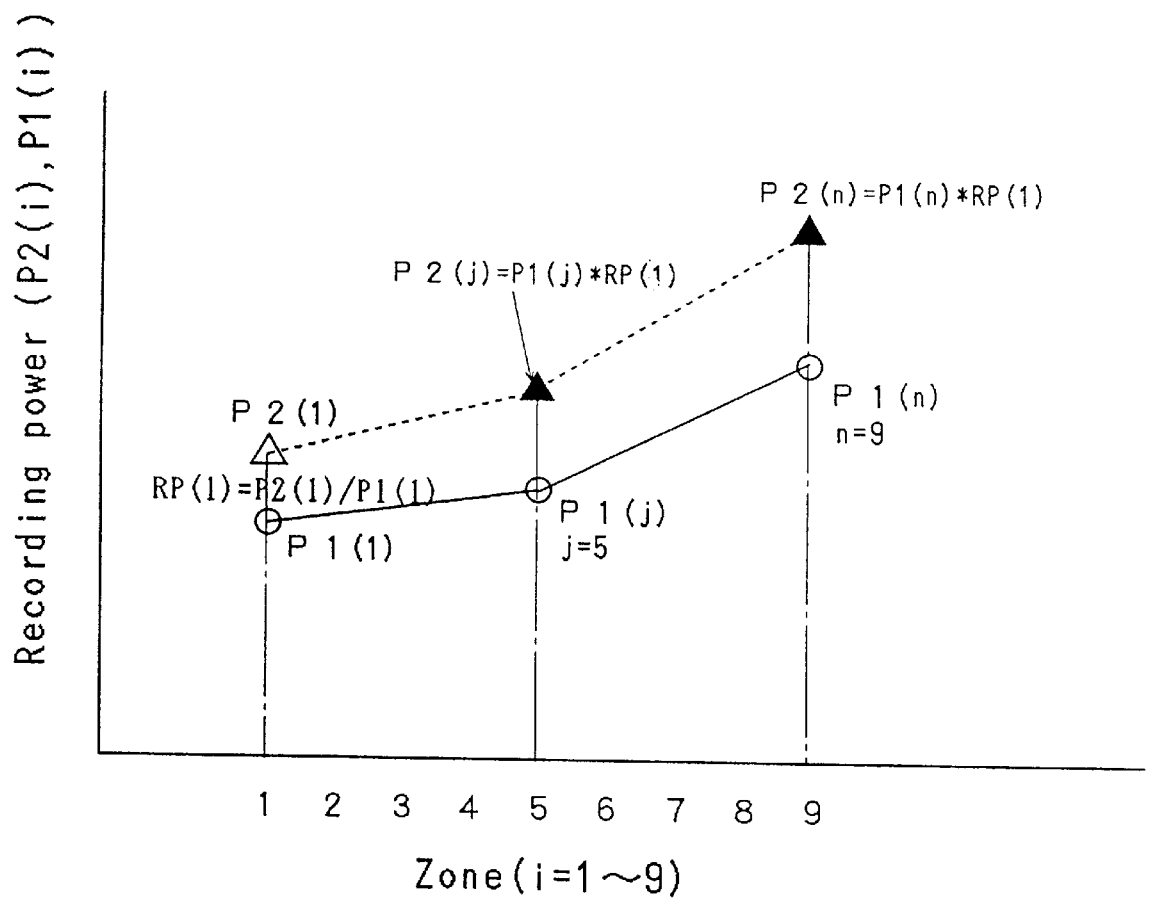
[Fig. 34]

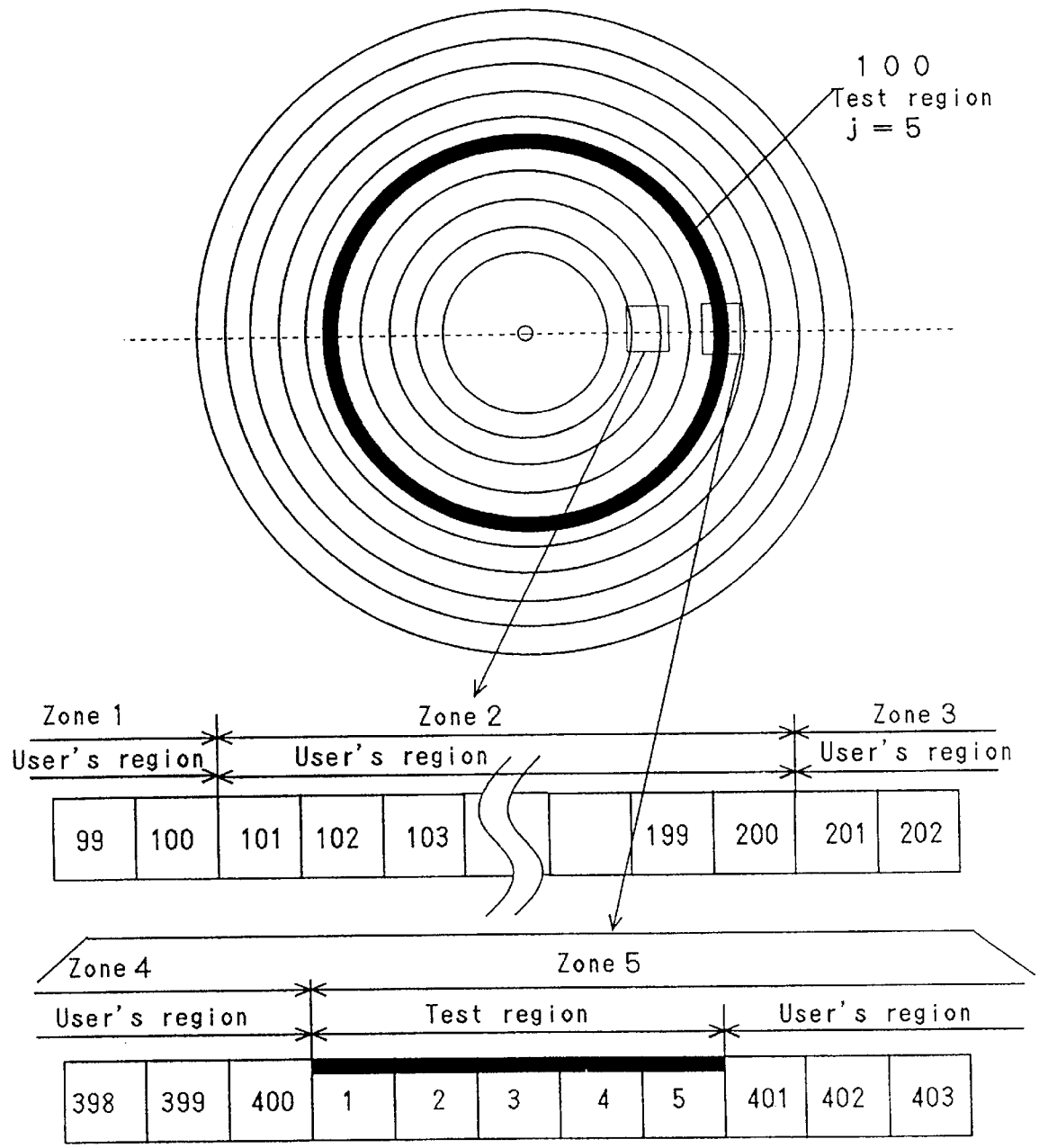
[Fig. 35]

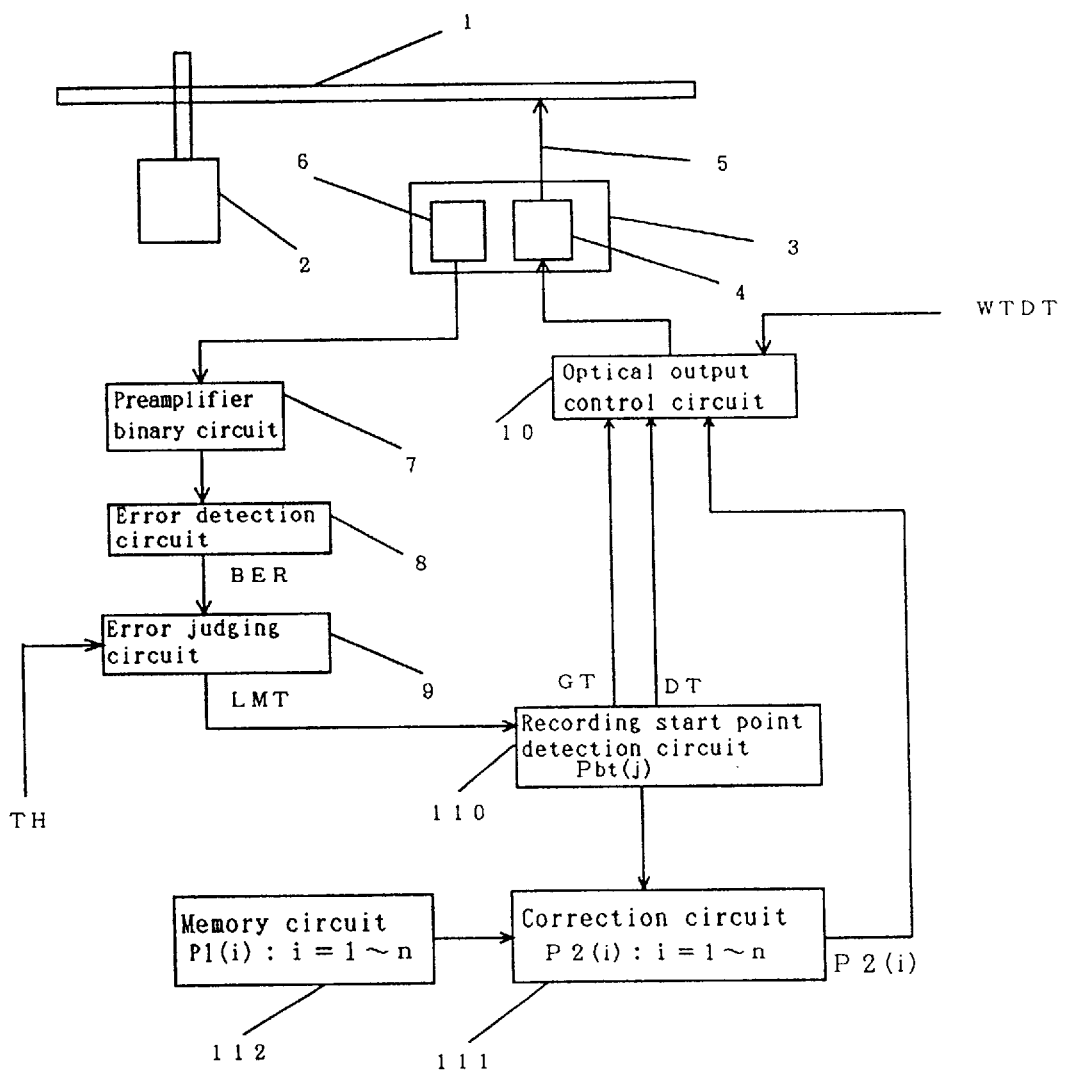

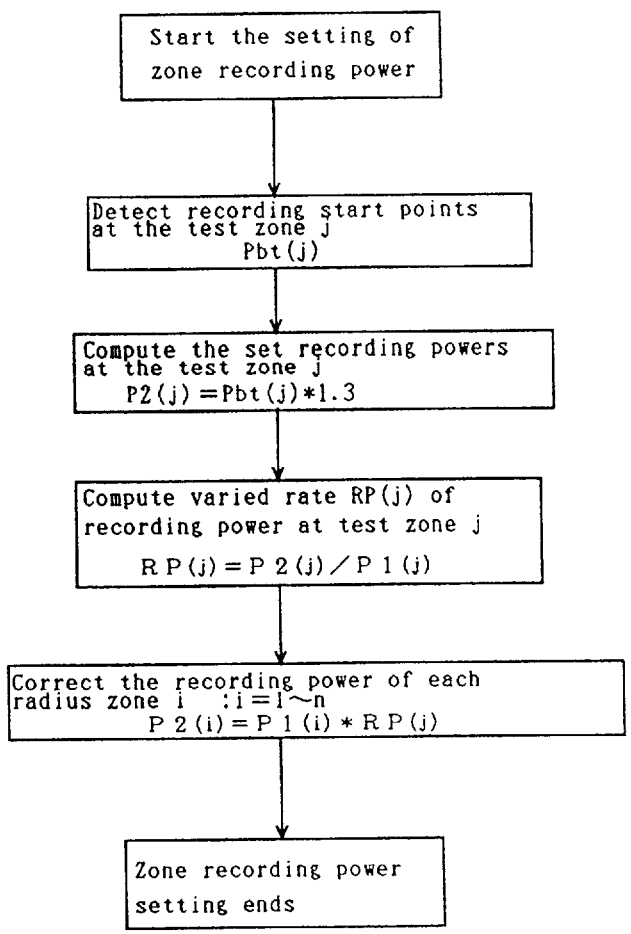
[Fig. 37]

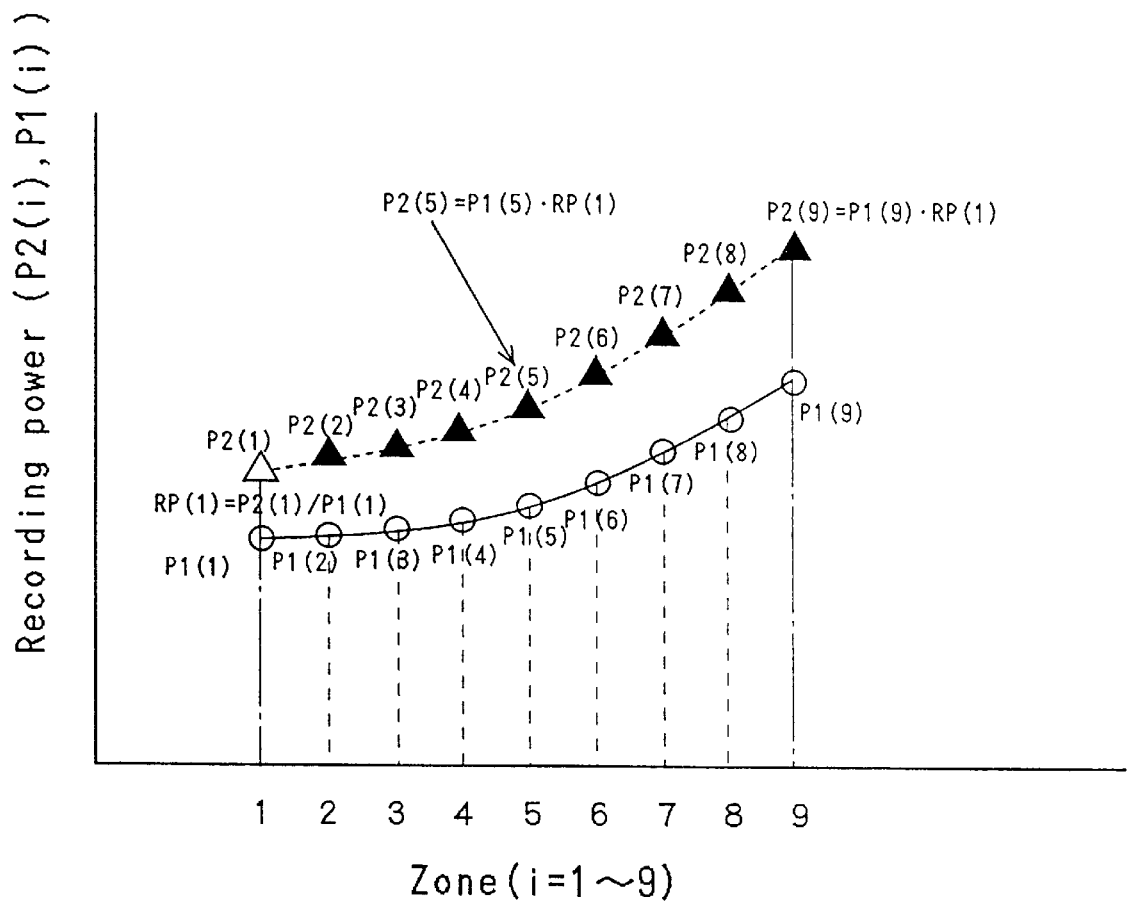
[Fig. 38]

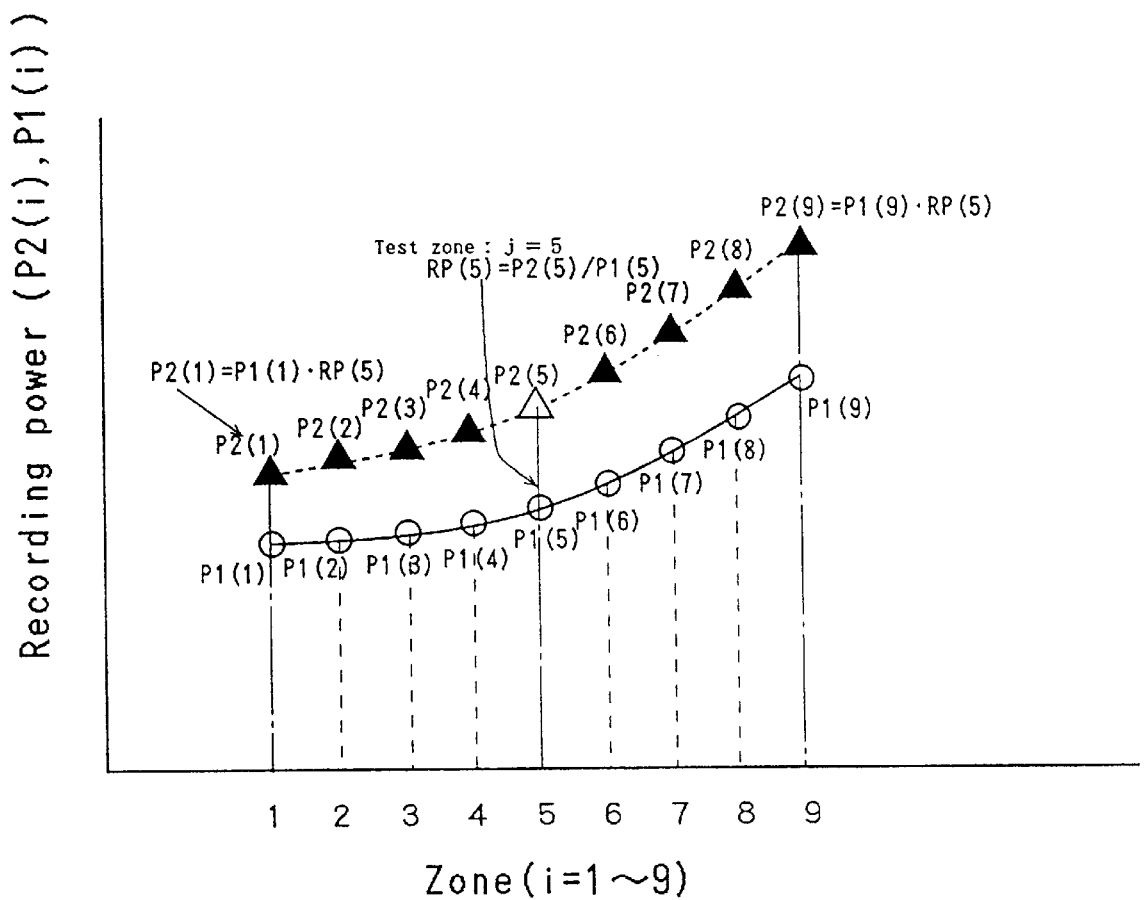
[Fig. 39]

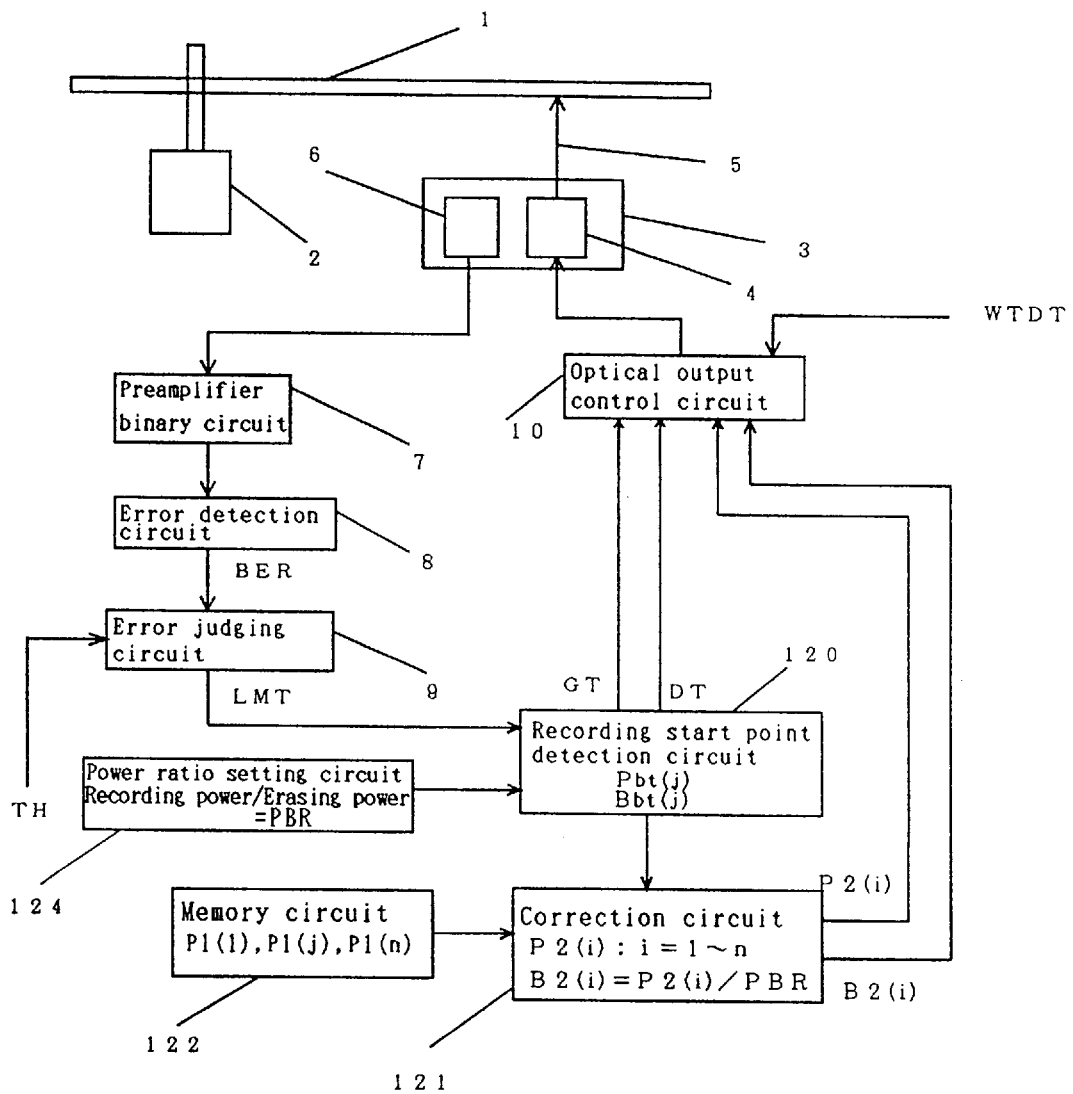

[Fig. 41]
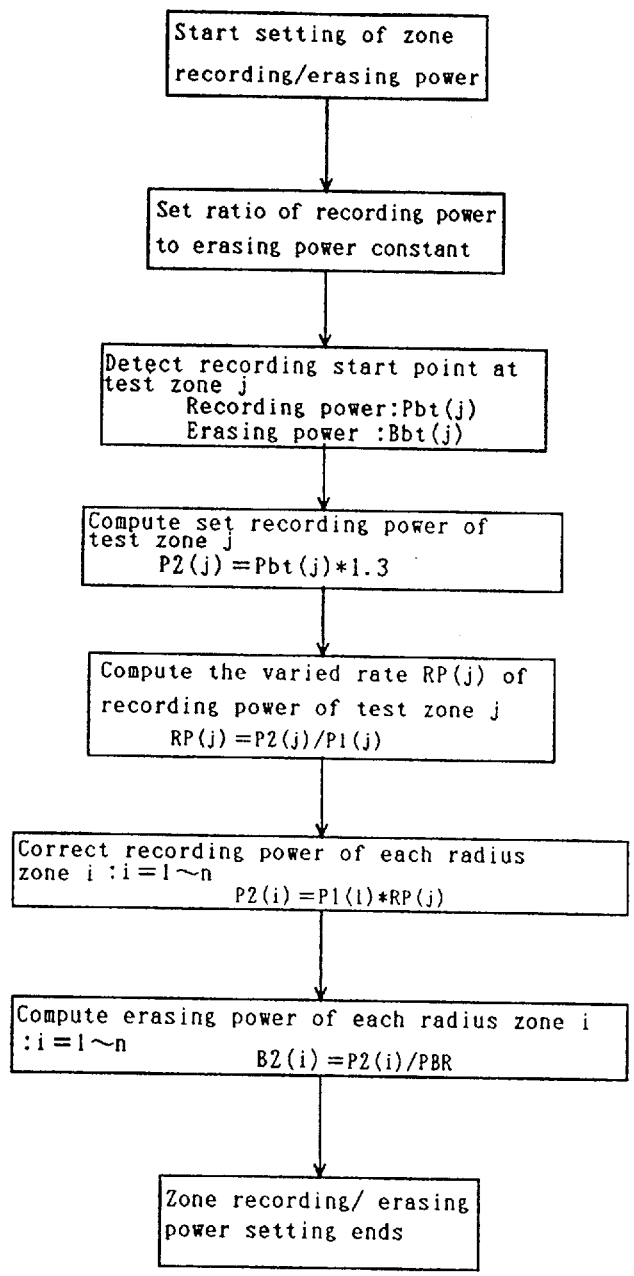

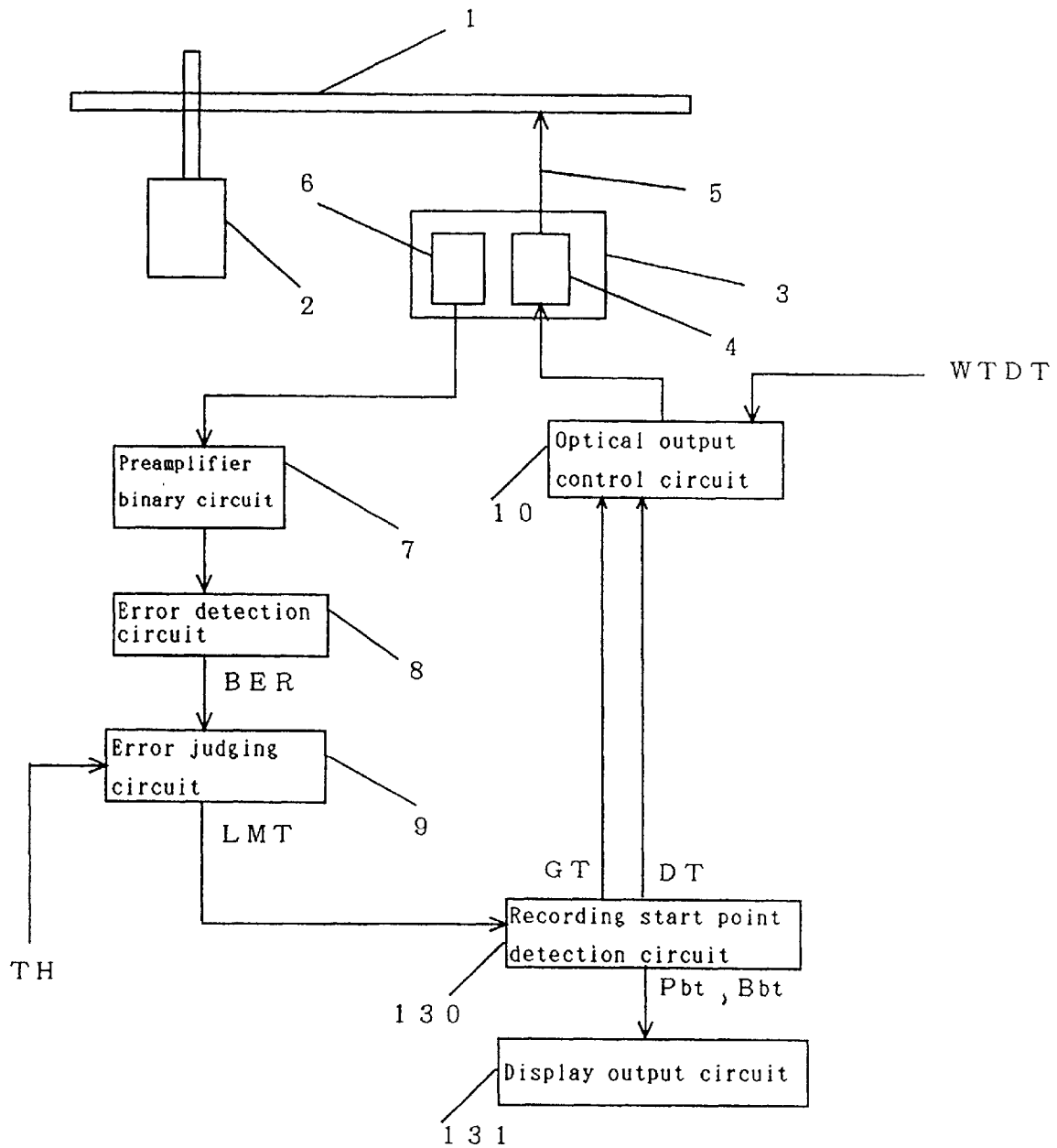
[Fig. 42]

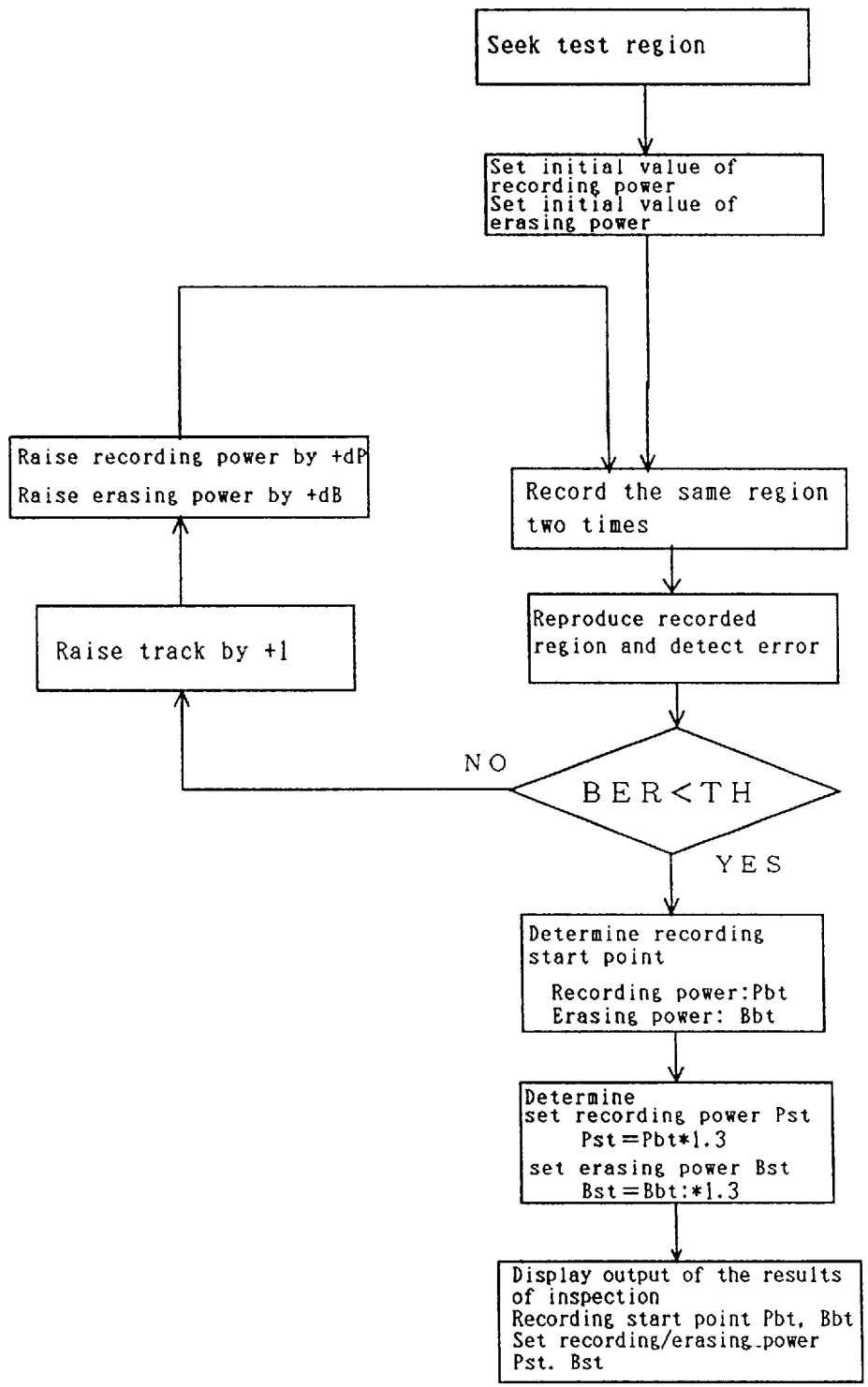
[Fig. 43]

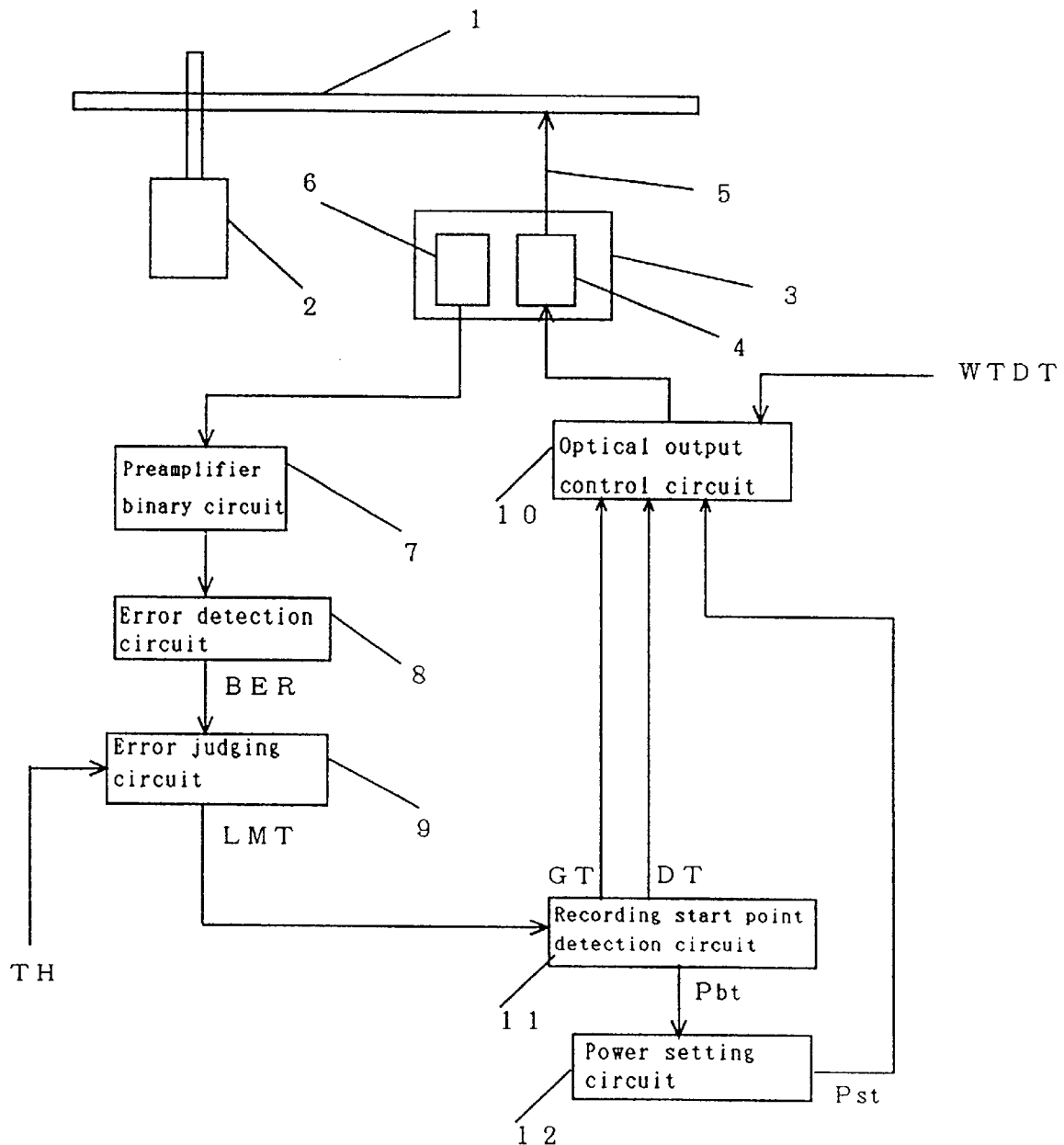

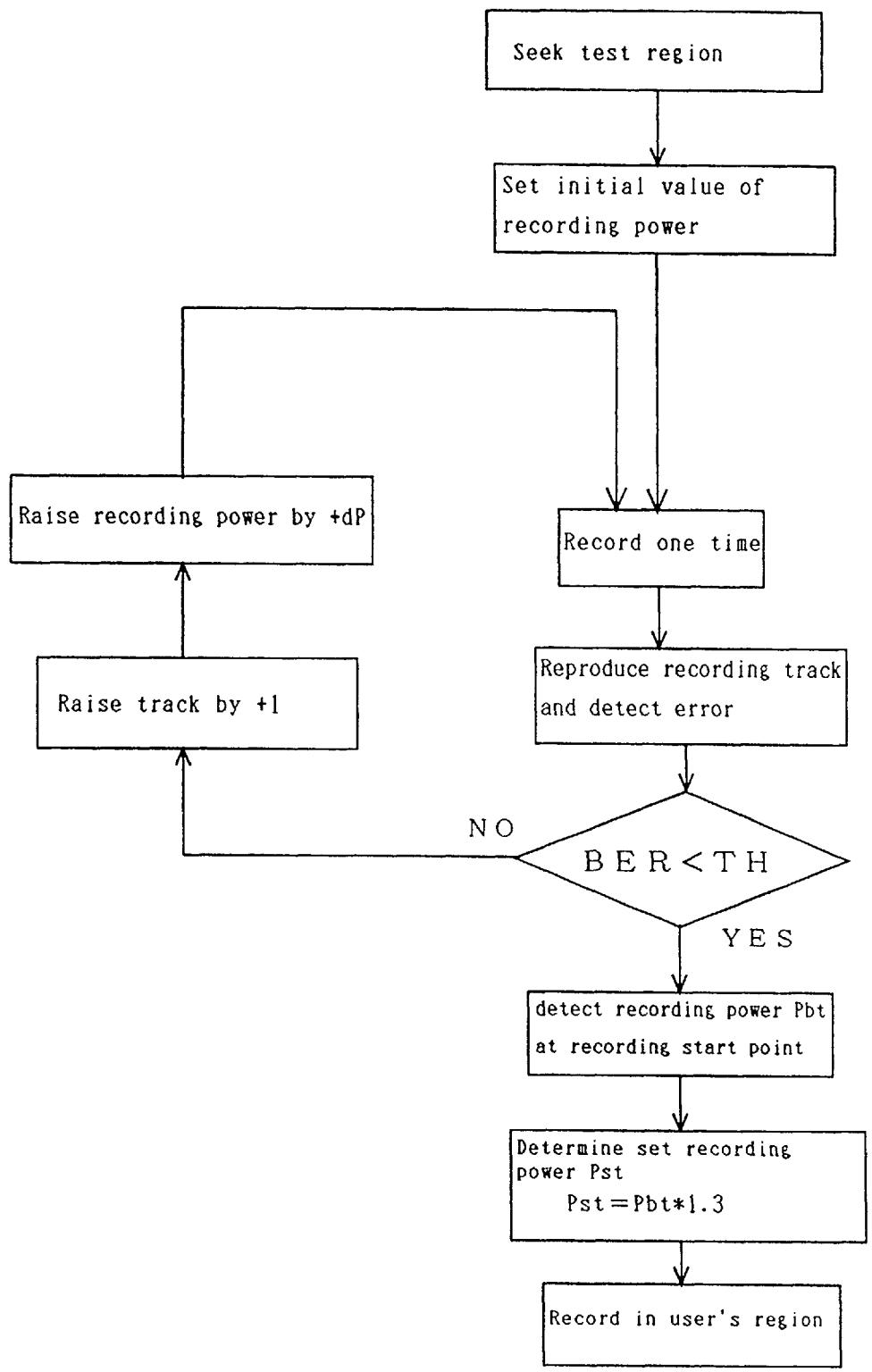
[Fig.45]

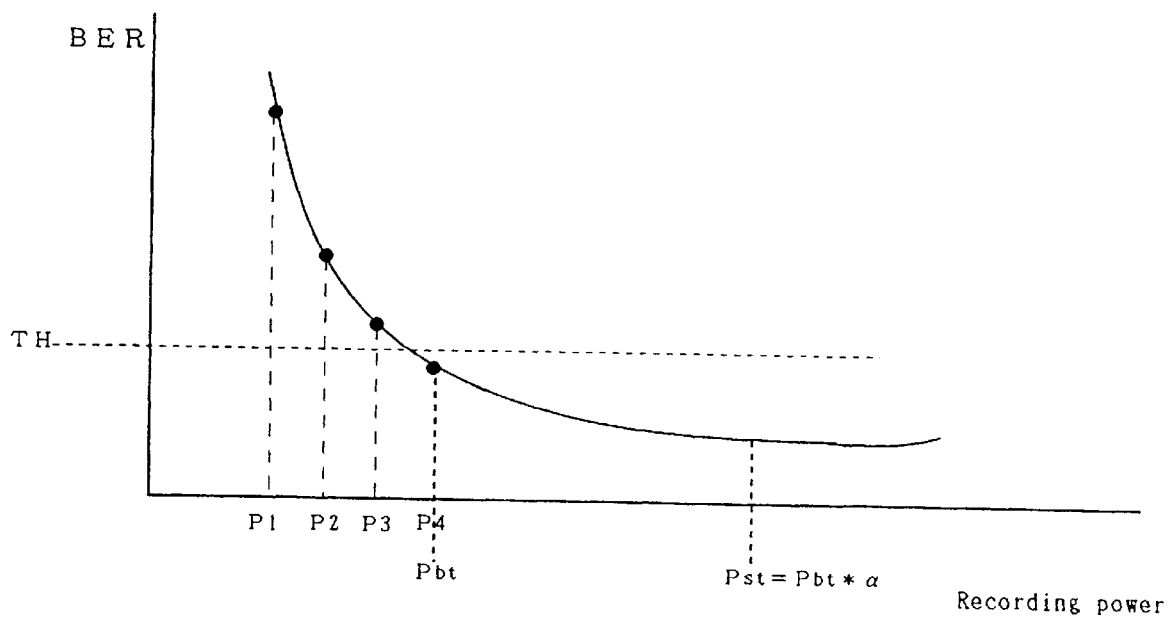
[Fig. 46]

[Fig. 47]
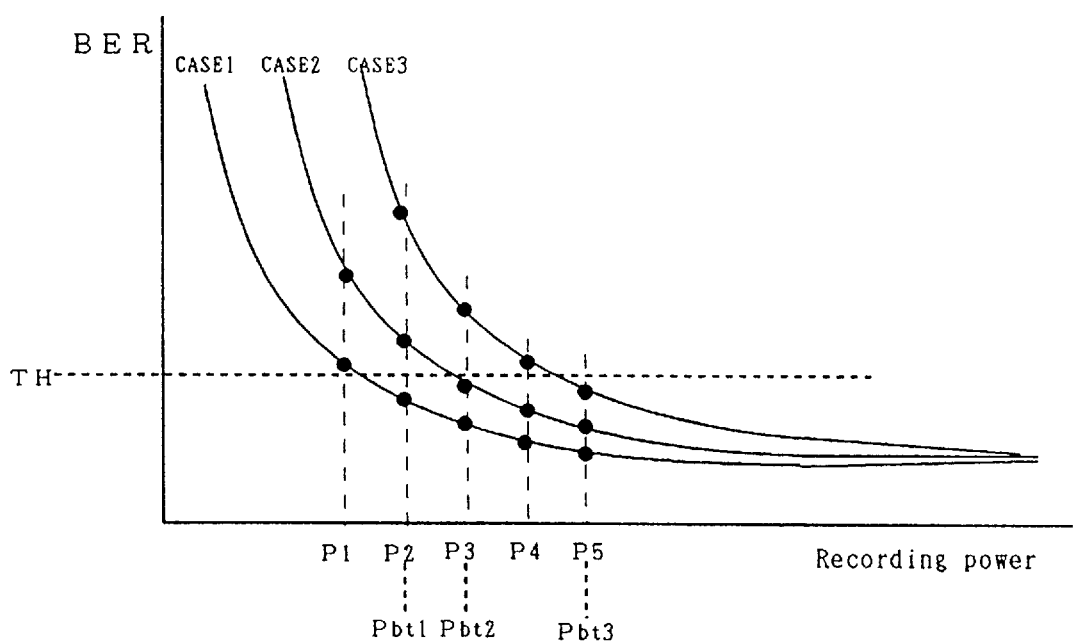

[Fig. 48]
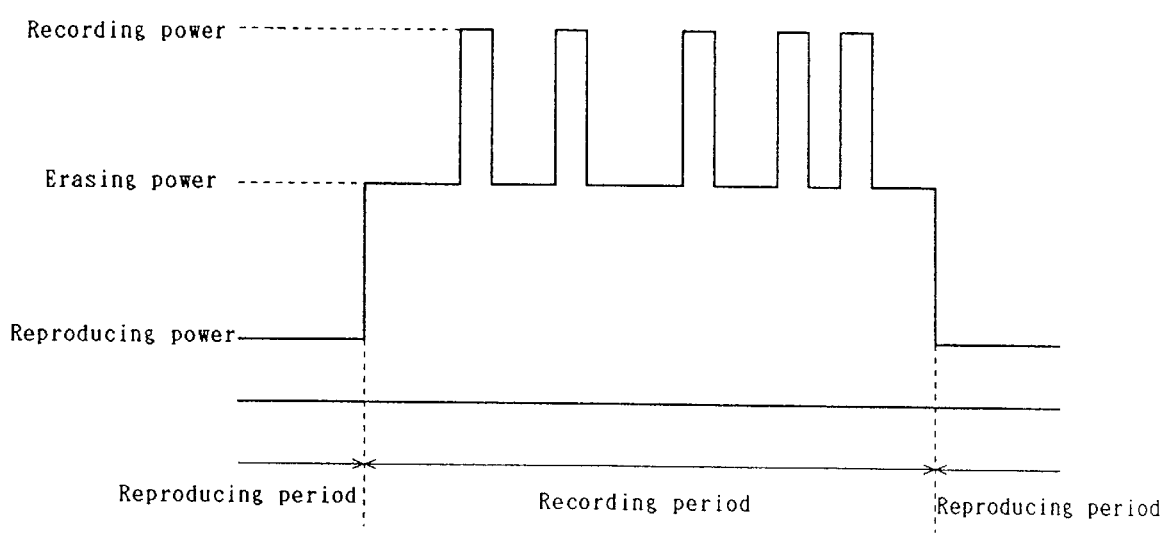

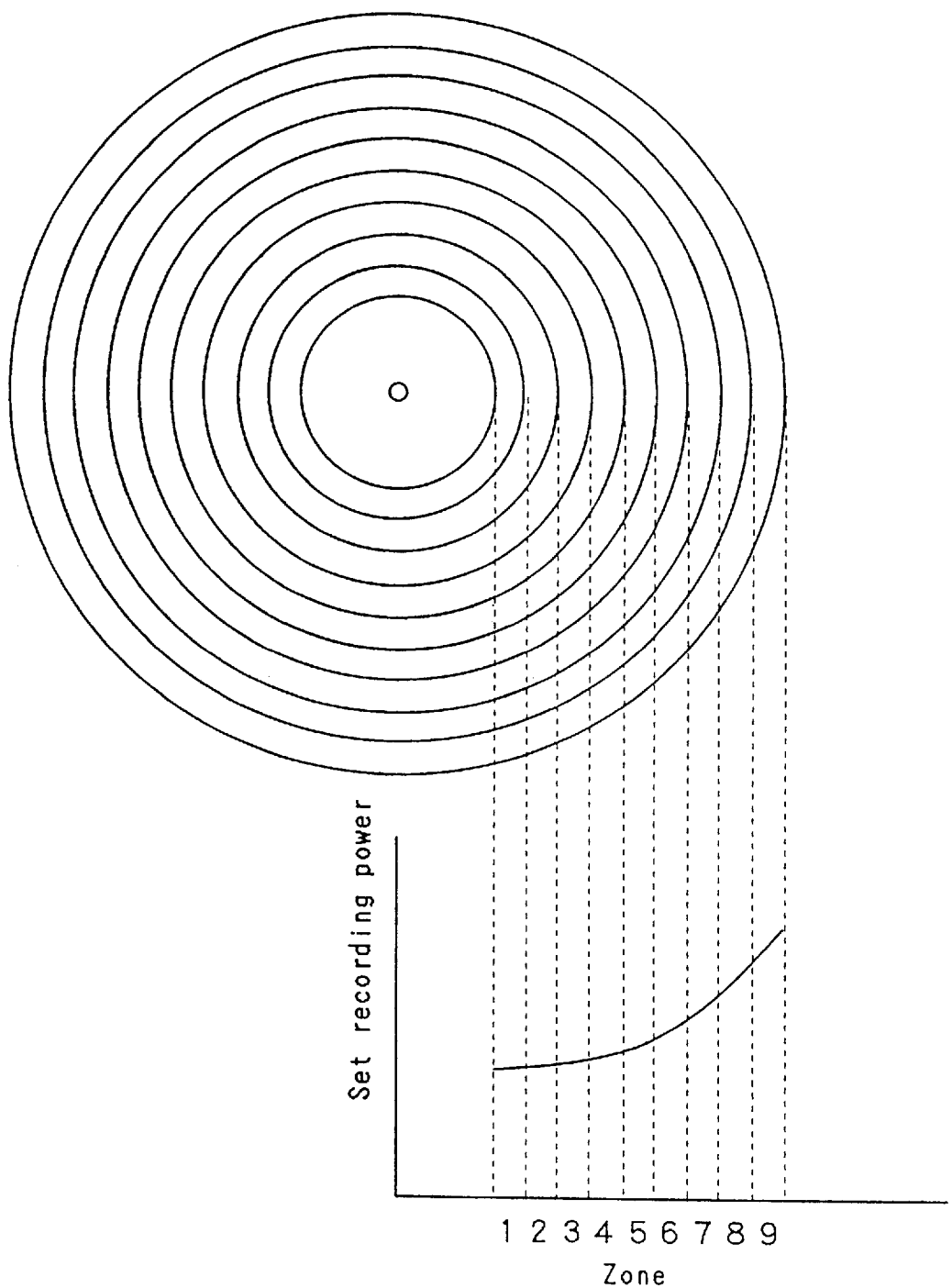
[Fig. 49]

[Fig. 50]
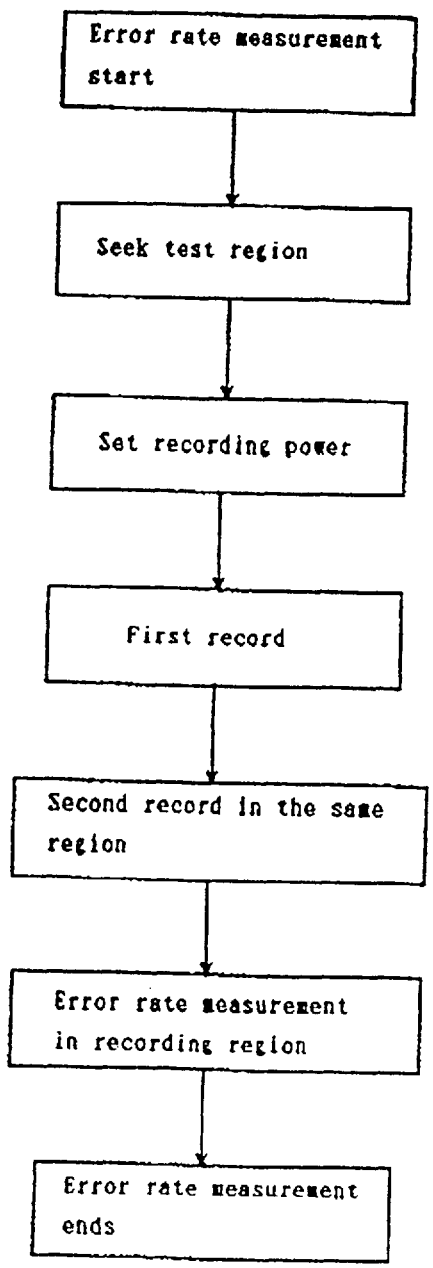

[Fig. 51A]
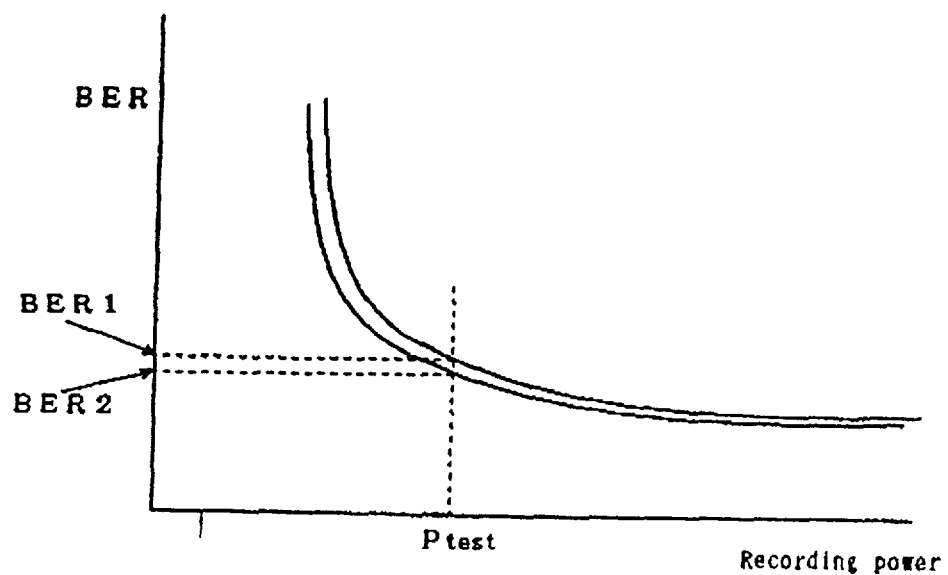
[Fig. 51B]
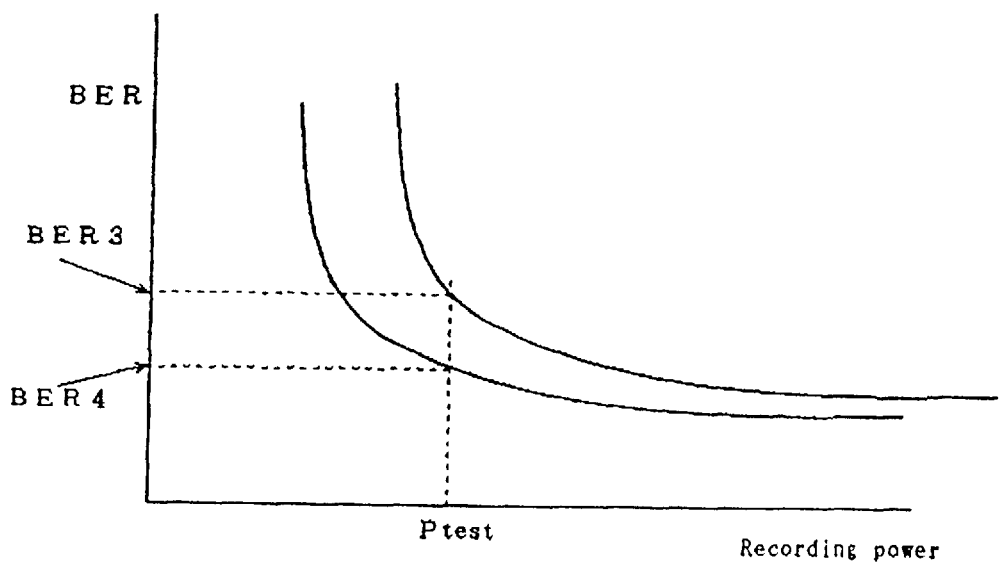

OPTICAL DISK DEVICE AND METHOD FOR SETTING RECORDING POWER AND ERASING POWER

BACKGROUND OF THE INVENTION

1. Field of the Invention

The present invention relates to an optical disk device for recording, over-writing, and reproducing a signal onto or from a track of an optical disk using an optical spot formed by focusing an optical beam of a semiconductor :Laser, and more specifically, to an optical disk device that performs test recording at a specified region to detect a recording power and an erasing power of a recording start point before recording in a user region and setting a final recording power and erasing power from the recording start point to enhance recording/reproducing characteristics of signals in the user region.

2. Discussion of the Prior Art

Recently, re-writable optical disks such as magneto-optical and phase change media have been practically used. With phase change media, recording, erasing, and over-writing are performed by thermal recording by light. However, recording margin on an optical output basis is generally small, namely, about 20% to 40%. As for a magneto-optical disk, to realize over-writing with an optical disk having a multi-layered recording media, a second power must be set by adding the optical output to an additional recording power. The same optical output as in the phase change type of optical disk is needed.

When a recording media comprises multiple layers, recording margin decreases compared to conventional magneto-optical disks. When recording bit length is shortened or bit edge recording or land/groove recording systems are used to achieve high density recording, the recording margin is usually less than 20%. This results in setting difficulty for the most suitable recording power to ensure an appropriate recording margin for the system.

In addition to the fundamental narrowness of recording margin, the appropriate recording power changes according to the temperature characteristics and with time. Therefore, fixed recording power determined at the factory may drift from the most appropriate recording power.

To solve this problem, before recording in a particular user region, a test is performed in a specified test region to detect the recording power around the recording start point to set the recording power.

A block diagram of a conventional optical disk device for setting a recording power is described with reference to FIG. 44. Element 1 is an optical disk, 2 is a disk motor for rotating optical disk 1, 3 is an optical head for recording/reproducing a signal onto optical disk 1, 4 is a semiconductor laser used as an optical beam light source, 5 is an optical beam emitted from semiconductor laser 4, 6 is a photodetector receiving a light reflected from optical disk 1 by way of divided detectors, and 7 is a pre-amplifier, digitizer to process the divided signals of photodetector 6 to generate a reproduced signal or a servo signal or to digitize the reproduced signal. Element 8 is an error detection circuit for detecting a bit error or byte error of the reproduced signal. Hereafter, bit error rate or byte error rate is abbreviated as BER. Error judging circuit 9 is used for (i) determining whether the reproduced signal is under an allowable BER value by comparing a threshold level TH, which indicates the allowable BER, to the BER of the reproduced signal, and (ii) for outputting the result.

An optical output control circuit 10 sets an optical output of semiconductor laser 4 at a recording power determined by recording power data DT during the period recording gate GT is on and modulates the output according to a recording signal, or write data WTDT. Recording start point detection circuit 11, after performing recording in a specified test region, changes the setting of the recording power to a recording power that is within an allowable BER value detected by error judging circuit 9.

When the BER is within a predetermined allowed value, recording power Pbt is output as the recording start point to power setting circuit 12. Power setting circuit 12 multiplies recording start point Pbt by a specific constant to set recording power Pst. Actual recording in a user region is performed by recording power Pst. The action for setting recording power is illustrated referring to the flow chart in FIG. 45. First, an optical head seeks a test region other than a user region. An optical output for recording is set at an initial value. The initial value is set at a lower recording power than ordinary recording start points, and accordingly, BER at the initial value is almost certainly higher than the specific allowed value TH. Next, after recording one time by the previously set recording power, the recorded information is reproduced to detect an error rate. Error judging circuit 9 compares allowed value TH and the reproduced BER. The initial value of the first recording power is set low, so BER is high and the judgment result is "NO". When "NO", the track address is incremented by one to the next track and the recording power is increased by a predetermined increment +dP. Recording is performed one time by a newly set recording power and its error is again detected. If the error is improved by increasing recording power by +dP, the judgement result by the error detection circuit 9 is changed to "YES". A "YES" judgement means that recording power Pbt at recording start point is detected. Recording power is then determined by multiplying the recording start point Pbt by a specific constant 1.3 and actual recording power in the user region is performed.

Referring to FIG. 46, the relationship between recording start point Pbt and recording power Pst is illustrated. In FIG. 46, the abscissa shows recording powers, and the ordinate shows BER. As recording power increases from P1 to P4, it can be seen that BER drops below allowed value TH at P4=Pbt. Generally, in optical disk devices, recording power Pst is set by multiplying recording start point Pbt by a specific constant "a". This constant typically includes some margin. When the margin is set at 30% Pst=(1.3)(Pbt). The margin changes according to the width of recording margin of the media and the margins of various parameters of the optical disk device. However, with conventional detecting methods for a recording start point, recording start points may change, and as a result, recording characteristics of the recording power are not optimized.

FIG. 47 illustrates that the recording start point Pbt can change. In FIG. 47, the abscissa shows recording powers and the ordinate shows BER. The plots show three cases on the media of the same optical disk where the history of use differs. Generally, recording power around the recording start point is small and a stable recording characteristic is rarely obtained. Moreover, when the recording media is subjected to relatively larger recording power, sufficient initializing or erasing is not achieved and recording start points vary as shown in FIG. 47. In Case 1 wherein the recording media is relatively clean and initialized sufficiently, recording start point Pbtl is detected at P2. On the other hand in Case 3 where the recording media is not initialized, sufficiently erased or was subject to a large recording power in the past, recording start point Pbt3 is detected at P5.

As described above, the conventional method has the problem that the recording start point varies largely according to the condition of the recording media.

With over-writable phase change disks, recording power and erasing power of the optical output must be set as shown in FIG. 48. Setting the two optical outputs precisely and efficiently so as to obtain optimal recording characteristics is difficult using conventional methods.

In an actual optical disk, when linear velocity varies, recording sensitivities in the inside radius track and the outside radius track are different. Linear velocity increases as the track moves to the outside and larger linear velocity requires larger recording power as shown in FIG. 49. Therefore, even if the recording power is determined at a test region outside the user region, different recording power must be set in the user region depending on the track used. Thus, precise setting of the recording power in the user region according to the recording power in the test region cannot be solved using conventional methods.

SUMMARY OF THE INVENTION

An object of the present invention is to provide an optical disk device described hereafter to solve the above problem. Before recording in a user region, a test recording is performed at a specific test region to detect a recording power and an erasing power of a recording start point, and the recording power and erasing power are set from the recording start point to enhance recording and reproducing characteristics of the signals in the user region.

To achieve the above object, an optical disk device of the invention comprises an optical output control circuit for switching an optical output between a reproducing power, an erasing power, and a recording power, and modulating recording signals between the erasing power and the recording power, an error detection circuit for detecting an error rate from reproduced signals, an error judging circuit for judging if the error rate of the reproduced signals is within a predetermined allowed value, a recording start point detection circuit for effecting at least two cycle recording over the same region until the error judging circuit judges that the error rate is within a predetermined allowed value by changing the recording power and erasing power to detect the recording power and erasing power of a recording start point, and a power setting circuit for multiplying the recording start point by a specific value to set the recording power and the erasing power for recording in the user region.

The optical disk device of the present invention repeats recording at least two times to detect the recording start point. By repeating recording two times, the recording measuring condition becomes stable and almost free from the effect of the recording media's history. Accordingly, the recording start point can be stably detected.

Further, an optical disk device of the invention comprises an optical output control circuit for switching an optical output between a reproducing power, an erasing power, and a recording power, and modulating recording signals between the erasing power and the recording power, a recording start point detection circuit for detecting the recording power and erasing power of the recording start point by test recording at a predetermined test region, and a power ratio setting circuit for setting recording power in a specific ratio versus the erasing power (hereafter referred to as Peak to Bias Ratio (PBR)).

With the above described apparatus, an optical disk device of the invention detects the recording start point by test recording at the test region and keeping PBR constant. As recording power and erasing power are set under a constant PBR, recording start points of the recording power and erasing power can be efficiently and precisely detected.

Further, an optical disk device of the invention comprises an optical disk having a plural number n (n is an arbitrary integer) of zones constituted by a specific number of tracks, a memory circuit for storing recording powers measured previously for at least three zones i (i is an integer from 1 to n), a recording start point detection circuit for detecting each of recording powers at respective recording start points by test recording at two zones, a correction circuit for correcting the recording powers at the three zones stored in the memory circuit using recording start point points of the two zones, and an operational circuit for setting recording power of each of remaining n−3 zones by processing recording powers of the three zones corrected by the correction circuit.

With the above described apparatus, the optical disk device of the invention detects respective recording start points by test recording at two zones, i.e., at the inner radius zone and the outer radius zone, and corrects the two recording powers at respective recording start points by a predetermined way and sets recording power at the inner radius and the outer radius. Recording power in the user region, where test recording is not performed, can be corrected by using the recording powers of the inner region and outer region and the recording power in the user region previously memorized.

Further, an optical disk device of the invention comprises an optical disk having a plural number n (n is an arbitrary integer) of zones constituted by a specific number of tracks, a memory circuit for storing at least n number of recording powers from among the recording powers and the erasing powers measured previously at each zone i (i is an integer from 1 to n), a recording start point detection circuit for detecting recording power at a recording start point by test recording at one zone, a correction circuit for correcting the recording power at each zone i stored in the memory circuit using the recording power at the recording start point, a power ratio setting circuit for setting a recording power in a specific ratio with respect to erasing power, and an operational circuit for calculating an erasing power at each zone i using the recording power of each zone and PBR.

With the above described apparatus, the optical disk device of the invention detects a recording start point by test recording under constant PBR at one zone, and corrects the recording power at the recording start point by a predetermined process and sets recording power at the test zone. The varied rate of the recording power at the test zone is calculated. Using the varied rate, recording power in each zone i is corrected. Next, erasing power at each zone i is set by processing PBR and recording power at each zone i. Likewise, using the varied rate of the recording power obtained by test recording at one zone, recording power and erasing power in the user region can be corrected and set.

Further, an optical disk inspection device of the invention comprises an optical output control circuit for switching an optical output to a reproducing power, an erasing power, and a recording power, an error detection circuit for detecting an error rate from reproduced signals, an error judging circuit for judging if the error rate of reproduced signals is within a predetermined allowed value, a recording start point detection circuit for detecting a recording power and an erasing power of a recording start point by repeating recording at least two times over the same area of a test region until the error judging circuit judges that the error rate is within a predetermined allowed value by changing recording powers and erasing powers, a power ratio setting circuit for setting a ratio of recording power versus an erasing power at a specific PBR, and a display output circuit for displaying or outputting the recording power and/or the erasing power at the recording start point.

With the above apparatus, the optical disk inspection device of the invention can efficiently and precisely detect recording start points for recording power and erasing power.

Accordingly, the evaluation time of the optical disk inspection device can be shortened and the reliability of measurement accuracy can be improved.

A method for setting recording power and erasing power of the invention comprises the steps of setting a ratio of recording power versus erasing power at a specific ratio PBR, repeating recording at least two times over the same area at a predetermined test region of an optical disk and changing the recording power and the erasing power to detect a recording power and an erasing power of the recording start points for recording power and erasing power when the error rate is within a predetermined allowed value, and multiplying the recording power and/or the erasing power at the recording start point by a specific first value and a specific second value, respectively, to set the recording power and the erasing power for recording in a user region.

When the above method of repeated recording is applied to a phase change type optical disk, the optical disk device is not affected by the recording history of the recording media and the recording start point can be stably and precisely detected. Also, since erasing power and recording power are set under a constant PBR, recording start point can be efficiently and precisely detected.

BRIEF DESCRIPTION OF THE DRAWINGS

FIG. 1 is a block diagram of an optical disk device setting a recording power from a test recording, according to a first embodiment of the invention.

FIG. 2 shows a method for detecting a recording start point and setting a recording power for the optical disk device of the first embodiment.

FIG. 3 shows the relationship between the recording start point and the recording power set by a multiplication factor in the first embodiment.

FIG. 4 shows a method for setting a recording power by adding an offset to a recording start point, according to a second embodiment of the present invention.

FIG. 5 shows the relationship between the recording start point and the recording power set by addition, in the second embodiment.

FIG. 6 is a block diagram of an optical disk device using a magneto-optical disk according to a third embodiment of the invention.

FIG. 7 is a block diagram of an optical disk device setting a recording power and an erasing power from a test recording, according to a fourth embodiment of the invention.

FIG. 8 shows a method for detecting the recording start point and setting the recording power and the erasing power in the fourth embodiment of the present invention.

FIG. 9 shows the relationship between the recording start point and the recording power and the erasing power set by a multiplication factor in the fourth embodiment of the present invention.

FIG. 10 shows a method for detecting a recording start point and setting a recording power and erasing power according to a fifth embodiment of the present invention.

FIG. 11 shows the relationship between the recording start point and the recording power and erasing power set by addition in the fifth embodiment of the present invention.

FIG. 12 shows the relationship between recording power and BER illustrating a varying method of recording power according to a sixth embodiment of the present invention.

FIG. 13 shows a method for detecting a crossing point of the recording start point in the sixth embodiment of the present invention.

FIG. 14 is a block diagram of an optical disk device equipped with an initializing circuit according to a seventh embodiment of the present invention.

FIGS. 15A–B show, respectively, a method for detecting a recording start point and setting a recording power including an initializing step in the test recording, and a method for initialization performed by two cycle recording by a first erasing power and then by a second erasing power.

FIGS. 16A–B are light wave diagrams illustrating recording power and erasing power in a phase change type optical disk according to an eighth embodiment of the present invention.

FIG. 17 is a block diagram of an optical disk device confirming if the recording power is too large, according to a ninth embodiment of the present invention.

FIG. 18 is a method for confirming the recording power in the ninth embodiment of the present invention.

FIGS. 19A–B are illustrations of detecting the recording power when it is too large in the ninth embodiment of the present invention.

FIG. 20 is a block diagram of an optical disk device using PBR according to a tenth embodiment of the present invention.

FIG. 21 shows a method for detecting a recording start point and setting a recording power and erasing power in the tenth embodiment of the present invention.

FIG. 22 is an illustration of PBR in the tenth embodiment of the present invention.

FIG. 23 shows a method for varying PBR according to line speed according to an eleventh embodiment of the present invention.

FIG. 24 is an illustration of the relationship between the line speed and the recording start point in the eleventh embodiment of the present invention.

FIG. 25 shows a method for detecting an appropriate PBR in the eleventh embodiment of the present invention.

FIG. 26 is a block diagram of an optical disk device performing test recording at two zones according to a twelfth embodiment of the present invention.

FIG. 27 shows a method for detecting a recording start point and setting a recording power in the twelfth embodiment of the present invention.

FIG. 28 shows a method for setting a recording power in a user region using the recording power obtained by test recording in two zones, in the twelfth embodiment of the present invention.

FIG. 29 shows a method for detecting a recording start point and setting a recording power and erasing power in the twelfth embodiment of the present invention.

FIG. 30 shows a method for setting a recording power and an erasing power in a user region using the recording power obtained by test recording in two zones in the twelfth embodiment of the present invention.

FIG. 31 is a block diagram of an optical disk device provided with a renewal circuit in the twelfth embodiment of the present invention.

FIG. 32 is a block diagram of an optical disk device performing test recording in one zone according to a thirteenth embodiment of the present invention.

FIG. 33 shows a method for detecting a recording start point and setting a recording power in the thirteenth embodiment of the present invention.

FIG. 34 shows a method for setting a recording power and an erasing power in a user region using the recording power obtained by test recording in one zone in the thirteenth embodiment of the present invention.

FIG. 35 shows a format of an optical disk used in an optical disk device according to a fourteenth embodiment of the present invention.

FIG. 36 is a block diagram of an optical disk device performing test recording in one zone in the fourteenth embodiment of the present invention.

FIG. 37 shows a method for detecting a recording start point and setting a recording power in the fourteenth embodiment of the present invention.

FIG. 38 shows a method for setting a recording power in a user region using the recording power obtained by test recording in one zone at an inner track, in the fourteenth embodiment of the present invention.

FIG. 39 shows a method for setting a recording power in a user region using the recording power obtained by test recording in one zone at an intermediate track in the fourteenth embodiment of the present invention.

FIG. 40 is a block diagram of an optical disk device provided with a power ratio setting circuit for performing test recording in one zone in the fourteenth embodiment of the present invention.

FIG. 41 shows a method for detecting a recording power startpoint and setting a recording power and an erasing power.

FIG. 42 is a block diagram of an optical disk device according to a fifteenth embodiment of the present invention.

FIG. 43 shows an inspection method of the fifteenth embodiment of the present invention.

FIG. 44 is a block diagram of an optical disk device according to the prior art.

FIG. 45 shows a method for detecting a recording start point in the test region and setting a recording power according to the prior art.

FIG. 46 shows the relation between a recording start point and a set recording power according to the prior art.

FIG. 47 shows the variation of recording start points in the prior art.

FIG. 48 is a light wave diagram at the recording of a phase change type optical disk.

FIG. 49 shows the variation of recording power in each zone of an optical disk.

FIG. 50 shows a method for measuring error rate by repeating recording two times.

FIGS. 51A–B show the difference in error rate measurement between one cycle recording and two cycle recording.

DETAILED DESCRIPTION OF THE INVENTION

Embodiment 1

An optical disk device of a first embodiment is illustrated with reference to FIG. 1 through FIG. 3. An optical disk device of the first embodiment repeats recording two times in a test region to detect a recording power of a recording start point and multiplies the recording start point by a specific value to set a recording power.

FIG. 1 is a block diagram of an optical disk device according to the first embodiment. Since the components are the same as in the conventional optical disk device described earlier, a discussion thereof is omitted here.

Error rate is simply referred to as BER, though, actual error rate can be the number of bit or byte errors, field errors, frame errors, or synchronizing errors measured during a specific interval. In the following embodiments, these are expressed generally, as BER. Of course, respective predetermined allowed values vary according to the type of BER implemented. However, for purposes of discussion herein, the predetermined allowed values are simply expressed generally, as a threshold TH.

A method for setting recording power will be illustrated referring to the flow chart in FIG. 2. The illustration is sequentially performed from the top. First, an optical head seeks a test region other than a user region. An initial value of optical output power at recording is set. The initial value of recording power is set lower than an ordinary recording start point, and as a result, BER is almost certainly higher than a predetermined allowed threshold value TH. After repeating recording two times in the same region at the recording power of the initial set value, the reproduced errors are detected. That is, error detecting circuit 9 compares allowed value TH and reproduced BER.

Since initial value of the first recording power is set low, BER is poor and the judgment result is "No". In case of "No," the track address is incremented by one and the track is shifted to the next track. The recording power is then increased incrementally by +dP. After repeating recording two times by the newly set recording power, the errors are detected. If the error rate is improved due to the increase of recording power by +dP, the judgement result is "YES". A judgement "YES" means that the recording power of recording start point Pbt is detected. Recording start point Pbt is multiplied by predetermined constant 1.3 and recording power Pst is set. Actual recording in a user region is performed by the set recording power Pst.

The fact that detection of a recording start point becomes stable by repeating recording two times is illustrated with reference to FIG. 3. In FIG. 3, the abscissa indicates recording power and the ordinate indicates BER. In FIG. 3 four cycles of recording 1, 2, 3, are plotted. In the case of recording cycle one, recording characteristics are largely affected by past history of the recording media, and recording start point Pbt1 and Pbt2 are different as shown. Furthermore, when recording is repeated, there is not much difference between two cycles and three cycles. This means that past history of the recording medium at a weak power near the recording start point largely affects the recording characteristic: at the first recording but to a much lesser extent at the second or subsequent recording. As a result, recording start points at 2 cycles and 3 cycles result in the same value Pbt3 and recording power is stably detected.

Detected recording start point Pbt3 is multiplied by a constant 1.3 to set recording power Pst, and recording in a user region is performed. If the recording power is larger than Pst, the power approaches upper limit Ptop at which the recording medium may be destroyed, and BER increases. Recording margin is defined as the range between recording start point Pbt3 and upper limit Ptop. In ordinary disks, when margin is about 50%, set power Pst is set a :Little higher than the center, that is, Pst=1.3*Pbt3. Set power Pst has a recording margin of −30% and +20%. Margin varies according to recording media and recording method. When margin of the medium is large, the constant is set higher, and when margin of the medium is small, the constant is set lower. In practical optical disk devices the required margin is at least 10% corresponding to a constant of 1.1. In ordinary phase change disks, the margins are about 30%–40%. The maximum margin of an optical disk is about 50%–60% and accordingly, the upper limit of the multiplying constant is about 1.5.

As described above, in the first embodiment, by repeating recording over the same region at least two times the recording start point can be stably detected without being influenced by the past history of the recording medium near the recording start point of weak recording power.

In this first embodiment, when BER is above allowed value TH, the track is shifted by one track but this, of course, can change according to a chosen unit for measuring error rate by section. Thus, measurement shifting is performed from one sector to another, and there is no need to shift from one track to another. On the other hand, if a large error rate measurement unit is desired a plurality of tracks can be chosen.

Embodiment 2

An optical disk device of a second embodiment is illustrated referring to FIG. 4 and FIG. 5. The optical disk device of the second embodiment repeats recording two times in a test region to detect a recording power of a recording start point and adds a specific value to the recording start point, instead of multiplying, to set a recording power.

The components of this second embodiment are the same as in the conventional optical disk device and the first embodiment described above, and therefore will not be explained again.

A method for setting recording power will be illustrated referring to the flow chart in FIG. 4. Since the steps through detection of recording start point is the same as in the first embodiment, that explanation is omitted here. After recording power Pbt at the recording start point is detected, a specified number Pof is added to recording start point Pbt to decide recording power Pst. Actual recording in a user region is performed by set recording power Pst.

Next, a method for setting a recording power will be illustrated referring to FIG. 5. In FIG. 5, the abscissa indicates recording power and the ordinate indicates BER. In FIG. 5, four cases of recording cycles 1, 2, 3, are plotted. In the case of a weak recording power near the recording start point and with respect to recording cycle one, recording characteristics are largely affected by the past history of the recording media. However, when the recording is repeated two or more times, the difference decreases. As a result recording start points at 2 cycles and 3 cycles result in the same value Pbt3 and recording power is stably detected.

Recording margin varies according to recording media, linear velocity, and recording pulses. Expressing the recording margin by an optical power in mW, ordinary optical disks have margins of about 2 mW to 10 mW. If the margin is 6 mW as a whole, the margin is divided to −4 mW and +2 mW and equation for Pst is set according to Pst=Pbt3+4 mW. That is the added constant, Pof, is 4 mW. As described above, in the second embodiment, by adding a constant, recording power Pst can be determined without being affected by the variations of recording start points.

Embodiment 3

An optical disk device of a third embodiment will be illustrated referring to FIG. 6. The third embodiment is a magneto-optical disk device using a magneto-optical disk which repeats recording two times in a test region to detect a recording start point and determines a recording power from the recording start point.

The invention is applicable to phase change types of optical disks whose optical output is controlled by recording power and erasing power. However, the recording media can also be a magneto-optical disk. In FIG. 6, the portions added to and varied from FIG. 44, depicting the block diagram of a conventional optical disk device, are explained.

In FIG. 6, magnetic output control circuit 200 controls magnetic coil 201 to modulate its magnetic field during recording and to output a specific bias magnetic field during erasing. There is no magnetic output from magnetic coil 201 during reproducing. Magnetic output from magnetic coil 201 is indicated by 202.

In the recording method of optical magnetic disks in this third embodiment, different methods for modulating the optical output can be used. One method is recording using a multi-layer film as a recording medium on the optical disk and switching optical output between recording power and erasing power to over-write the media as in the case of phase change type disks. Another is a method in which an optical output is synchronized with the magnetic output and modulated when the magnetic output is modulated in recording in order to improve jitter at the edge of recording pits. In both cases, the optical output should be modulated by at least recording power, and the method of the invention for setting the recording power by detecting a recording start point by repeating the recording two times can be applied. In particular, in a recording method in which a multi-layer film is over-written, recording margin is generally narrow. Accordingly, recording power and erasing power should be accurately set at the center of the recording margin. The method for setting recording power of the invention is well suited for this purpose.

Embodiment 4

An optical disk device according to a fourth embodiment is next illustrated referring to FIG. 7 through FIG. 9. The optical disk device of the fourth embodiment uses an optical disk device for setting a recording power and an erasing power and repeats recording power at least two times in a test region to detect a recording power and an erasing power of a recording start point and multiplies the recording start point by a specific value to set a recording power and an erasing power.

In FIG. 7, the portions added to and varied from the conventional optical disk device shown in FIG. 44 are explained.

A recording start point detection circuit 20 detects recording power Pbt and erasing power Bbt of the recording start point. A power setting circuit 21 multiplies recording power Pbt and erasing power Bbt of the recording start point by a predetermined value to set the recording power Pst and erasing power Bst.

A method for setting a recording power and an erasing power is illustrated referring to the flow chart in FIG. 8. First, initial values of the recording power and the erasing power are set. The initial values are set lower than ordinary recording start points whereby BER will almost certainly be higher than a predetermined allowed value TH. After repeating recording two times in nearly the same region at the recording power and the erasing power of the initial set power values, the reproduced errors are detected. Since the initial values are set low, BER is poor and a judgment of "No" results. In case of a "No", the track address is incremented by one and shifted to the next track. The recording power is increased by +dP and the erasing power by +dB. After repeating recording two times at the newly set recording power and erasing power, errors are detected. If the BER is improved due to the increase of recording power by +dP and erasing power by +dB, a judgment of "YES" results and recording power Pbt and erasing power Bbt at the recording start point are detected. Recording start point Pbt and Bbt are multiplied by a predetermined constant 1.3 and recording power Pst and erasing power Bst are thus set. Actual recording in a user region is performed by the set recording power Pst and erasing power Bst.

FIG. 9 illustrates how to detect a recording start point of recording power and erasing power simultaneously and surely by repeating the recording two times.

In FIG. 9, the abscissa indicates recording powers and the ordinate indicates erasing powers. The outer plotted data in the oval shows a recording margin of the recording power and the erasing power where BER falls under a predetermined allowed value TH by one cycle recording. The inner portion of the oval shows a recording margin of the recording power and the erasing power where BER falls under a predetermined allowed value TH by two cycle recording. In the graph, at one cycle, the recording start point is detected as recording power P3 and erasing power B3, while, at two cycles, recording power Pbt at the recording start point becomes larger as P4 and erasing power Bbt becomes B4 due to residual noise caused by over-writing. Thus, two cycle recording can detect a more precise recording start point. As illustrated in the first embodiment, there is little difference in obtained results between two cycle recording and more than two cycle recording.

The recording margin of the recording power and the erasing power where BER falls under a predetermined allowed value TH is located around a straight line extending from the origin and having a specific slope. Accordingly, to detect the recording start point, recording power and erasing power can be respectively increased by +dP and +dB.

Recording power Pbt=P4 and erasing power BbT=B4 at recording start point detected by two cycle recording are multiplied by a specific constant value, namely, 1.3 to set the recording power Pst and erasing power Bst. The set recording power Pst and erasing power Bst appear at nearly the center of the oval, as shown. With ordinary commercial recording media recording margin is set least at 20%. In this case, recording power is set at 10% recording margin corresponding to the specific constant value 1.1. When the recording margin is as large as 60%, recording power is set at recording margin −50%, +10%, that is, the specific constant value is 1.5.

As described above, in the fourth embodiment, recording power and erasing power of the recording start point are simultaneously obtained by repeating recording at least two times in a predetermined test region, and the recording start point is multiplied by a specific constant to set recording power and erasing power precisely and efficiently resulting in improved signal quality during recording and reproducing.

Embodiment 5

An optical disk device according to a fifth embodiment is illustrated referring to FIG. 10 and FIG. 11. The optical disk device of the fifth embodiment repeats recording at least two times in a test region to detect a recording power and an erasing power of a recording start point and adds a specific value to the recording power and the erasing power of the recording start point to set a recording power and an erasing power.

The components of the optical disk device for the present embodiment are the same as in the fourth embodiment.

A method for setting a recording power and an erasing power is illustrated referring to the flow chart in FIG. 10. The steps through detection of the recording start point are the same as in the fourth embodiment, and explanation is, accordingly, omitted here. After recording power Pbt and erasing power Bbt at the recording start point are detected, a specific constant Pof is added to recording start point Pbt to set recording power Pst and a constant Bof is added to recording start point Bbt to set erasing power Bst. Actual recording in a user region is performed by the set recording power Pst and erasing power Bst. Thus, adding numeric values Pof and Bof is the basic difference between this embodiment and the fourth embodiment.

Next, the relationship between the recording power Pbt and erasing power Bbt at the recording start point and recording power Pst and erasing power Bst to be set is illustrated in FIG. 11. In FIG. 11, the abscissa indicates recording power and the ordinate indicates erasing power. The outer portion of the plotted data in the oval shows a recording margin of the recording power and the erasing power where BER is within a predetermined allowed value TH with one cycle recording. The inner portion of the oval shows a recording margin of the recording power and the erasing power where BER falls within a predetermined allowed value TH with two cycle recording. As shown in the graph, with two cycles, recording power Pbt at the recording start point is detected as P4 and erasing power Bbt as B4. Thus, the actual usable recording start point is detected by two cycle recording rather than one cycle recording.

Constant Pof is added to recording start point Pbt to set recording power Pst at almost the center of the recording margin. Similarly, constant Bof is added to recording start point Bbt to set erasing power Bst at almost the center of the recording margin.

As described above, the recording power and the erasing power of the recording start point are simultaneously obtained by repeating recording at least two times in a predetermined test region, and the recording start point is added to a constant to set recording power and erasing power precisely and efficiently, thereby resulting in improved signal quality for recording and reproducing.

Embodiment 6

An optical disk device according to a sixth embodiment is illustrated referring to FIG. 12 and FIG. 13. The optical disk device of the sixth embodiment increases the recording power and erasing power when the BER of the signal reproduced is over a predetermined allowed value, and decreases the recording power and erasing power when the error rate of the signal reproduced is under the predetermined allowed value, to detect a recording power and an erasing power of the recording start point. The object of this embodiment is to prevent the recording start point from being detected too high, and to thereby detect the recording start point more precisely.

In FIG. 12, the abscissa indicates recording power and the ordinate indicates error rate BER. Two kinds of recording media with different recording sensitivities are plotted.

The starting point of recording power in the test region is generally set at P3 where the error rate is over the allowed value TH. For recording media of ordinary sensitivity, the error rate at the first recording power P3 is more than the allowed value TH as shown with a darkened circle. Then, recording power is raised to P4 at which recording and error rate measuring is again performed. The error rate at recording power P4 is also more than the allowed value TH as shown with a darkened circle. Thus, recording power is again raised, to P5, to perform recording and error rate measuring again. The error rate at recording power P5 is under the allowed value TH as shown with the undarkened circle and recording start point Pbt1 is set. As described, as to recording media of ordinary sensitivity, the test recording starts from point P3 and the recording start point is detected by the error rate's crossing of the allowed value TH between P4 and P5.

The case of recording media with high sensitivity is illustrated next. The BER at the first recording power P3 is under the allowed value TH as shown with an undarkened circle. If simply judged from the output of error judging circuit 9, this recording power P3 would be the recording start point. However, as seen from the graph, the recording start point of the high sensitivity recording media is located at a lower point. That is, the recording start point P3 judged by only the output of error judging circuit 9 is a recording power start point too high in value.

Accordingly, in the sixth embodiment, the recording start point is judged not only by the output of error judging circuit 9, but also by precisely detecting the cross point. More specifically, when the error rate at the first recording power P3 is under allowed value TH, recording power is decreased from P3 to P2 to again perform recording and error rate measuring. The error rate at recording power P2 is also under allowed value TH as shown with an undarkened circle. Recording power is again decreased to P1 to perform, once again, recording and error rate measuring. The error rate at recording power P1 is over the allowed value TH as shown with a darkened circle and the error rate curve crosses allowed value TH. Here, recording power P2 is set as the recording start point Pbt2. Recording power P2 correctly expresses the recording start point of the recording media with high sensitivity.

FIG. 13 shows a method for detecting the recording start point when the error rate crosses allowed value TH in the sixth embodiment.

First, the test region is sought. The case where error rate of recording at the same region is under allowed value TH is illustrated. When error rate is under TH, whether it is the cross point is judged from whether the error rate at the preceding recording is over the allowed value TH. If the error rate at the preceding recording is over the allowed value TH, the error rate is deemed to have crossed allowed value TH. In this case, the process exits the loop and proceeds to "detection of TH cross point ends." The recording start point is set near the cross point and recording power Pbt and erasing power Bpt are set. The recording power and the erasing power at the recording start points are multiplied or added with a predetermined constant and recording power Pst and erasing power Bst are set, and recording at user region is performed.

Next, when the error rate of recording at the same region is under allowed value TH and the error rate of the preceeding recording is also under allowed value TH, error rates at the present recording powers are under allowed value TH, and no cross point is detected. In this case, the process proceeds to the left loop. The track is incremented, recording power and erasing power are reduced, and two cycle recording is repeated. If the error rate is over the allowed value TH by reducing recording power and erasing power, the process enters the right judging loop. Here, as the preceding recording error rate is under allowed value TH, the cross point can be found and the process moves to "detection of TH cross point ends". The recording power start point is set near the cross point and recording power Pbt and erasing power Bpt are set.

Next, the case where error rate of recording at the same region is over allowed value TH is illustrated. When BER is over allowed value TH, the process enters the right loop. The cross point is judged from whether the error rate at the preceding recording is under the allowed value TH. When the error rate at the preceding recording is under the allowed value TH, since the BER in this iteration is over the allowed value TH, the error rate crosses allowed value TH. In this case, the process parts from the loop and moves to "detection of TH cross point ends" in the lower part. The recording start point is set near the cross point and recording power Pbt and erasing power Bbt are set. The recording power and the erasing power at the start point are multiplied or added with a predetermined constant and recording power Pst and erasing power Bst are set, and recording at a user region is performed.

Next, when the error rate of recording at the same region is over allowed value TH and the error rate of the preceding recording is also over allowed value TH, error rates at the present recording powers are over allowed value TH, and no cross point is detected. In this case, the process goes to the right loop, and the track is increased, recording power and erasing power are incremented, and two cycle recording is repeated again. If the error rate is under the allowed value TH by increasing recording power and erasing power, the process enters the bottom judging loop. Here, as the preceding recording error rate is over allowed value TH, the cross point can be found and the process moves to "detection of TH cross point ends" at the lower part. The recording start point is set near the cross point and recording power Pbt and erasing power Bbt are determined.

As described above, in the sixth embodiment, even if the recording sensitivity of recording media largely varies, the recording start point can be precisely detected since the power is changed by detecting the cross point.

In the present embodiment, the illustration is performed with respect to an optical disk device using recording power and erasing power. However, the same procedures can be applied to an optical disk device using only recording power.

Embodiment 7

An optical disk device according to a seventh embodiment is illustrated referring to FIG. 14 and FIG. 15. The optical disk device of the seventh embodiment is provided with an initializing circuit 40 for initializing the test region before recording in the test region. The object of the embodiment is to detect the recording start point correctly by making recording characteristics at the test region uniform through prior initialization.

FIG. 14 is a block diagram of an optical disk device of the seventh embodiment. Only the portion added to and changed from the block diagram of the conventional optical disk device shown in FIG. 44 is explained. Recording start point detection circuit 30 inserts a routine for initializing before test recording occurs. Power setting circuit 31 is used for multiplying or adding the recording start point by or to a predetermined constant to set recording power Pst and erasing power Bst and for sending these values to optical output control circuit 10. Initializing circuit 40 initializes the test region before two cycle test recording. Initialization is, practically, the same as erasing.

Referring to FIG. 15A, a method for detecting the recording start point including an initialization routine at a test region is illustrated.

Basically, detection of a recording start point and setting of recording power and erasing power are the same as in the embodiments described earlier and explanation is therefore omitted here. The difference in this embodiment is that an initializing routine is included before two cycle recording at the same region. Since the recorded history of the recording region is erased as a result of initialization before the test recording, the recording start point is even more precisely detected, especially taking into account the effect of the two cycle recording.

The number of test regions is generally limited to a specific number, so once the specific number of tracks are used, previously used regions have to be used again as test regions. In this embodiment, initializing is performed before recording so that the influence of the past recorded history of the test region can be eliminated and detection accuracy of the recording start point can be improved.

Also, the necessary capacity for test regions can be decreased since the test regions are repeatedly used. Moreover, format efficiency of the optical disk can be improved.

One simple method for initialization comprises setting the recording power and the erasing power to the same value. Thus, by not controlling only erasing for initialization use, but by setting recording power and erasing power to the same value at the controlling of the recording gate, as under ordinary recording conditions, the initializing can be readily performed.

Next, referring to FIG. 15B, a method for two step initializing by a first erasing power and a second erasing power which is set lower than the first erasing power is illustrated. This embodiment is the same as the previous embodiment having an initializing circuit but different with respect to the initializing routine prior to the two cycle recording. In the preceding embodiment, initializing was performed via a single erasing step while in the present embodiment a two step erasing process by a first erasing power and a second erasing power is performed.

By initializing first with a first erasing power, recorded history in the test region is almost erased. However, since the test region is used in different optical disk devices and under different conditions, it may have been used at different recording powers and erasing powers. Erasing powers for initialization are generally fixed values, therefore the most appropriate initializing condition may vary from the fixed value due to recording/erasing sensitivity of the optical disk device. Initializing again the area initialized by the first erasing power by a second erasing power lower than the first erasing power results in any differences in recording/erasing sensitivities to be absorbed, thereby resulting in thoroughly erased recorded history. By detecting a recording start point in this kind of test region, a more accurate recording start point can be detected independent from recording/erasing sensitivities and recorded histories of the optical disk device and recording media, and the most appropriate recording power and erasing power can be set.

Considering that the second erasing power can only erase to a limited extent, if the first erasing power is too strong, and thus has the character of recording power, sufficient erasing cannot be accomplished. Moreover, as the high erasing power is not modulated, thermal load of optical output is large which may damage the recording media. Therefore, it is preferable to set the first erasing power at one time to two times the second erasing power.

Embodiment 8

An optical disk device according to an eighth embodiment is illustrated referring to FIGS. 16A–B. The eighth embodiment is an optical disk device to improve in jitter characteristic in recording pits on recording media by using a first power and a second power other than recording power and erasing power. FIG. 16-A is an optical output wave form diagram in which the first power is set at a lower level than erasing power after modulated recording power. The first power is generally referred as a cooling pulse and quickly cools the temperature caused by the recording power to form a sharp edge of a recording pit to improve jitter characteristic. The method for detecting a recording start point through two cycle recording at the test region of the invention can be applied to an optical disk device using a phase change type optical disk added with the first power. The most simple method is to fix the first power at a predetermined value.

FIG. 16-B is a wave form diagram in which the second power set in a specific higher level than the recording power and is added at the rising of the recording power in addition to the first power. The second power makes the temperature rise sharply at the rising of the recording power to improve jitter characteristics at the start of the recording pit. The method for detecting a recording start point through two cycle recording at the test region of the invention can be applied to an optical disk device using a phase change type optical disk added with the first power and the second power. Compared with recording power and the erasing power, the amount of energy applied for recording of the first power and the second power is negligible. Accordingly, the first power and the second power can be set at 0 or a predetermined fixed value at the detection of the recording start point in the test region.

As described above, in the eighth embodiment, even an optical disk device using a phase change type optical disk subjected to the first power and/or second power in addition to ordinary erasing power and recording power, recording start points can be detected by two cycle recording and set recording power and erasing power can be set without any trouble.

The present invention can be applied to a method for recording using recording pulses corresponding to the modulation of a recording signal composed of a series of pulses having a clock of higher frequency than a basic clock.

Embodiment 9

An optical disk device according to a ninth embodiment is illustrated referring to FIG. 17 through FIG. 19. The ninth embodiment is an optical disk device in which the detected recording start point is multiplied by a predetermined value to set recording power and erasing power. These values are then tested and are corrected if they are too large. The object of the present embodiment is to prevent recording media deterioration caused by excessive recording power being improperly set.

FIG. 17 is a block diagram of an optical disk device of this embodiment. The portions added to and different from the conventional optical disk device shown in FIG. 44 are explained below.

Recording point detection circuit 50 detects recording power Pbt and erasing power Bbt at the recording start point at a predetermined test region. Power setting circuit 51 multiplies recording power Pbt and erasing power Bbt of recording start point by a predetermined constant to set recording power Pst and erasing power Bst. First confirmation power setting circuit 52 sets a first confirmation power Pcr1 decreased by a predetermined range from recording power Pst. For ordinary recording media, a range decreased by 5%–20% is used. The percent decrease depends on an estimate of the probability of the maximum recording power Pst. If probability is over 10%, 15% may be set as a set value that is smaller than that of 10%. If there is little chance of excess, 5% may be set. Second confirmation power setting circuit 53 sets a second confirmation power Pcr2 decreased by a predetermined range from the first confirmation power Pcr1. For ordinary recording media, a range decreased by 10%–30% is used.

This value is a severe recording condition for power compatible phase change type optical disks in which the recording power recorded in the second cycle decreases compared to the recording power recorded in the first cycle. With the power compatible recording medium, if recording margin is wide, the power setting value may be set high, and if recording margin is narrow, the power setting value may be set low. Power confirmation circuit 54 confirms if recording power Pst and erasing power Bst set by the above process are too high. If too high, circuit 54 corrects set recording power Pst and erasing power Bst to a lower level.

Referring to FIG. 18, a power confirming method and a correction method of this embodiment is illustrated. For simplicity, only the recording power is described in the figure and the erasing power is omitted. After set recording power Pst is determined from the recording start point at the test region, the recording power confirmation method starts.

The device seeks the test region, and the loop counter is set to n=0. The process enters the loop and the loop counter is set to n=1. Recording is performed by the first confirmation recording power Pcr1=0.95*Pst which is set by reducing recording power Pst by 5%. Then the same track is over-written by a recording power set by reducing the first confirmation recording power Pcr1 by 20%.

Error rate at the track over-written is then measured. When it is above allowed value TH, set value Pst is judged as being not too large and appropriate, and the process passes through the loop. Owing to the power compatible condition where a track recorded by the first confirmation power Pcr1 is further over-written by the second confirmation power Pcr2, error rates in most cases are over TH and the process passes straight through the loop without circulating in the loop. Therefore, the confirming is processed at high speed. When passed through loop counter at n=1, set recording power Pst is not too large but appropriate, so the correction is not performed and the method for confirming recording power is finished.

When the error rate is under allowed value TH at loop counter n=1, this means that the severe power compatible condition where a track recorded by the first confirmation power Pcr1 is further over-written by the second confirmation power Pcr2 is cleared. The value Pst is not appropriate and may be set too high. One reason why set value Pst is too large, is that the recording start point detected was too large. This may be caused, for example, by noise characteristics of a semiconductor laser of an optical head. Also, noise from a semiconductor laser increases near a low recording power start point and, as a result, the recording start point tends to be detected higher. The recording start point may also be detected higher due to improper operation of an error detection system of the optical disk device. Also, error rate may rise due to unstable conditions of a servo system at test recording, resulting in detection of a larger recording start point.

When set recording power Pst is judged too high, the track is shifted, and recording power Pst is lessened by 5%, that is, Pst=Pst*0.95. The process enters the confirmation loop by using the 5% lessened value, and the loop counter becomes n=2. On a basis of 5% lessened set recording power Pst, similar to the preceding discussion, the first confirmation recording power Pcr1=Pst*0.95 and the second confirmation recording power Pcr2=Pcr1*0.80 are set and recording and over-writing are performed.

When the error rate is over allowed value TH at loop counter n=2, set value Pst corrected 5% smaller is judged not too large, but proper, and the process passes through the loop. Passing through the loop at the loop counter n=2, the value Lessened 5% from initial set value Pst is set as the recording power and the method for confirming recording power terminates.

When the error rate is under allowed value TH at the loop counter n=2, set value Pst corrected 5% smaller is judged still too large, and the track is shifted and set recording power Pst is further reduced by 5%, that is, Pst=Pst*0.95. This set value enters the confirmation routine described before and confirmation of set power is performed.

When the error rate is over allowed value TH at the loop counter n=3, set value Pst corrected about 10% smaller is judged not too large, but proper, and the process passes through the loop. Passing through the loop at the loop counter n=3, the value lessened 10% from initial set value Pst is set as the recording power and the method for confirming recording power terminates.

When the error rate is under allowed value TH at loop counter n=3, set value Pst corrected 10% smaller is judged still too large and the system is considered as abnormal and the method for confirming recording power terminates.

In this case, recording in a user region is not performed.

The operation principle of the ninth embodiment is illustrated referring to FIGS. 19A and B. FIG. 19A shows a state where set recording power Pst is not too large but appropriate.

The abscissa indicates recording power and the ordinate indicates erasing power in FIGS. 19A and B. The oval region indicates a margin in which the error rate is under the allowed value TH. Recording start point Pbt shown in a darkened circle is detected by test recording in the test region. The recording start point Pbt is multiplied by a constant 1.3 to set recording power Pst=Pbt*1.3. Next, a first confirmation recording power Pcr1 is set at 5% down from the value of set recording power Pst and recording is performed. Then, a second confirmation recording power Pcr2 is set at 20% down from the value of the first confirmation recording power Pcr1 and the track recorded before is over written by Pcr2. As shown in FIG. 19A, the second confirmation recording power Pcr2 approaches the recording start point Pbt. Due to the severe power compatible condition where second recording power is smaller than the first recording power, the error rate associated with the second confirmation recording power Pcr2 becomes more than predetermined allowed value TH. The process passes through the loop at the loop counter n=1, set recording power Pst is judged as being not too large, but appropriate, and the confirming method of recording power terminates. Recording power Pst without correction is used in a user region.

The case where set recording power Pst is too large and abnormal is illustrated referring to FIG. 19-B. The oval region indicates a margin in which the error rate is under the allowed value TH. A recording start point Pbt shown by a darkened circle is detected by test recording in the test region. The recording start point is set relatively higher due to the influence of laser noise. The recording start point Pbt set relatively higher is multiplied by a constant 1.3 to set recording power Pst=Pbt*1.3. Therefore, set recording power Pst is set higher and set near the upper limit of the recording margin.

Next, at loop counter n=1, a first confirmation recording power Pcr1 is set at 5% down from the value of set recording power Pst and recording is performed. Then, a second confirmation recording power Pcr2 is set at 20% down from the value of the first confirmation recording power Pcr1 and over-writing is performed. As shown in FIG. 19-B, second confirmation recording power Pcr2 is relatively higher than the lower limit of the recording margin, and even under a severe condition where the second recording power is smaller than that of the first recording power, the error rate at the over writing of second confirmation recording power Pcr2 becomes lower than predetermined allowed value TH. Set recording power Pst is reduced by 5%, that is, Pst=Pst*0.95 and moves to the next loop n=2. After recording by first confirmation recording power Pcr1 set from recording power Pst reduced by 5%, over-writing is performed at second confirmation recording power Pcr2. In the loop n=2, second confirmation recording power Pcr2 is relatively higher than the lower limit of the recording margin, therefore, the error rate falls under allowed value TH. Then, set recording power is further reduced by 5% as Pst=Pst*0.95, and the process moves to the next loop n=3. After recording by first confirmation recording power Pcr1 set from recording power Pst reduced by total 10%, over-writing is performed at second confirmation recording power Pcr2. In the loop n=3, second confirmation recording power Pcr2 is at a position relatively closer to the lower limit of the recording margin, therefore, the error rate is over allowed value TH. Accordingly, the process parts from the loop at n=3, and terminates the confirming method of recording power performed on a basis of set recording power Pst reduced by a total of 10%, i.e. 5% two times because the recording power was too high.

As illustrated above, in the ninth embodiment, correction can be performed after confirming if recording power Pst set from recording start point detected at the test region is too high. When the recording power Pst is, in fact, too high, it is reduced, prior to recording, from 5% to 20% and used for recording as the first confirmation recording power Pcr1, thereby avoiding deterioration of the recording media. Since the second confirmation recording power Pcr2 is a value reduced by 10% to 30% from first confirmation recording power Pcr1, the lower limit of the recording margin can be more precisely detected by using the power compatibility characteristic. Moreover, by adjusting the setting of first confirmation recording power Pcr1 and second confirmation recording power Pcr2, the error rate of over writing becomes more than predetermined allowed value TH where recording power Pst is properly set and in most cases will pass through the power confirmation loop the first time resulting in a high speed confirming process.

Embodiment 10

An optical disk device according to a tenth embodiment is illustrated referring to FIG. 20 through FIG. 22. The tenth embodiment is an optical disk device setting PBR which is a ratio of recording power versus erasing power, detecting a recording power and an erasing power of a recording start point at the test region, and the multiplying detected recording start point by a predetermined value to set recording power and erasing power.

FIG. 20 is a block diagram of an optical disk device of the embodiment, the portion added to or varied from the conventional optical disk device shown in FIG. 44 is explained below.

Recording start point detection circuit 60 detects recording power Pbt and erasing power Bbt at a predetermined test region. Power setting circuit 61 multiplies recording power Pbt and erasing power Bbt by a predetermined value to set recording power Pst and erasing power Bst. Power ratio setting circuit 62 sets a ratio PBR to a certain value.

Referring to the flow chart in FIG. 21, a method for setting recording power and erasing power utilizing PBR is shown. A recording power and an erasing power are set at initial values in accordance with constant PBR relationship. The initial values are set at initial values higher than a predetermined allowed value TH. After repeating recording two times at almost the same region by using the set recording power and erasing power, reproducing and error detecting are performed. Since the first initial value is set relatively low and BER is poor, the judgement result is "NO". When "NO", the track address is incremented and moved to the next track. Recording power is increased by +dP and erasing power increased by +dB, such that the PBR ratio is kept constant. After repeating recording two times using the newly set recording power and erasing power, errors are detected. If the errors are sufficiently improved as a result of increasing recording power by +dP and erasing power by +dB, the judgement result is "YES." A "YES" indicates that recording power Pbt and erasing power Bbt at the recording start points are detected. Recording power Pbt and erasing power Bbt are then multiplied by a constant 1.3 and recording power Pst and erasing power Bst are set. Recording in a user region is then performed using the set recording power Pst and erasing power Bst.

FIG. 22 shows how the recording start point can be precisely and efficiently detected by utilizing PBR. In FIG. 22, the abscissa indicates recording power and the ordinate indicates erasing power. The plotted data in the outer oval region indicate the margin of recording power and erasing power in which BER is within the allowed value TH by one cycle recording and the inner oval region indicates the margin of recording power and erasing power in which BER is within the allowed value TH by two cycle recording. The case where recording power Pbt is detected as P4 by two cycle recording and erasing power Bbt is detected as B4 is described. If recording power and erasing power are two-dimensionally detected, recording has to be practiced at 16 points, that is 4 points by 4 points, and the efficiency decreases. Where erasing power is fixed and recording power is varied, recording power may vary by the influence of the fixed erasing power. On the other hand, when recording power and erasing power are varied with respect to a constant PBR, a recording start point can be precisely and efficiently detected to improve signal quality in recording/reproducing.

As explained above, PBR is the ratio of recording power versus erasing power and is generally on the order of 1.5 to 3.0. The value depends on the balance of recording sensitivity and erasing sensitivity of the recording media. For recording media having good recording sensitivity, PBR is generally smaller. For recording media having good erasing sensitivity, PBR is generally larger. The most appropriate PBR depends on the kind of recording media used. This is further explained in embodiment 11.

Embodiment 11

An optical disk device according to an eleventh embodiment is next explained referring to FIG. 23 through FIG. 25. The eleventh embodiment is an optical disk device using the PBR method of setting recording power and erasing power.

The components of an optical disk device according to this embodiment are the same as in embodiment 10.

Referring to the flow chart in FIG. 23, a method for setting recording power and erasing power utilizing PBR and linear velocity is shown. When a test region is sought, the value of PBR is varied according to the track address. The most appropriate PBR is set according to a linear velocity so that recording margin is maximum, and recording start point is minimum.

Recording power Pbt and erasing power Bbt of the recording start point are thus detected by the most appropriate PBR. Recording power Pbt and erasing power Bbt are then multiplied by the predetermined value 1.3 to set recording power Pst and erasing power Bst. Actual recording in a user region is performed by set recording power Pst and erasing power Bst.

Referring to FIG. 24, even when recording at an inner track and an outer track, where linear velocities differ, recording start points can be precisely and efficiently detected. In FIG. 24 the abscissa indicates recording power and the ordinate indicates erasing power. The plotted upper oval data shows a recording margin where the error rate is under allowed value TH at the outer track where the linear velocity is high, and the lower oval data shows a recording margin where the error rate is under allowed value TH at the inner track where the linear velocity is low.

As recording sensitivity characteristics depend on linear velocity, straight lines passing through almost the center of the recording margins for the inner track and the outer track are different and denoted as PBR1 for the outer track and PBR2 for the inner track. The case for detecting a recording start point at the outer track is discussed.

If PBR2 for the inner track is applied to the outer track, the recording start point Pbt2=P5. On the other hand, when PBR1 which is the more suitable for the outer track is used, the recording start point is Pbt1=P3. It is obvious that if PBR2 for the inner track is applied to the outer track, detected recording start point largely departs from the real recording start point Pbt1.

How to obtain the most appropriate PBR is illustrated in FIG. 25. The most appropriate PBR is the ratio of recording power versus erasing power where the recording margin is the widest. In other words, the PBR at which recording margin is widest is the PBR at which the recording start point is minimum. In FIG. 25, the abscissa indicates PBR and the ordinate indicates the product of recording power Pbt at the recording start point and erasing power Bbt at the recording start point. The point where the recording start point is minimum is the point at which both recording power Pbt and erasing power Bbt are minimum. Likewise, recording start point is detected for each PBR, and PBR=2.4 is obtained as the most appropriate value from the point where the product of recording power Pbt at the recording start point and erasing power Bbt at the recording start point are minimum. With a measurement performed for each linear velocity, the most appropriate PBR can be obtained.

With ordinary optical disks, PBR at an outer track, where linear velocity is higher, is smaller. Where linear velocity is high and where recording is given higher priority than erasing, recording sensitivity at an outer track tends to be made better. Therefore, recording power decreases with respect to the same erasing power and PBR thus decreases. Therefore, when PBR is set by linear velocity PBR should be set smaller at the outer track where linear velocity is higher.

Embodiment 12

An optical disk device according to a twelfth embodiment is explained referring to FIG. 26 through FIG. 31. The twelfth embodiment is an optical disk device comprising a memory circuit 72 for storing recording powers previously measured at three zones, a recording start point detection circuit 70 for detecting a recording start point by test recording at two zones other than in a user region, a correction circuit 71 for correcting recording powers at the three zones, and an operational circuit 73 for setting recording power in the remaining zones. The object of this embodiment is to correct recording power in a user region from the result of test recording at the two zones.

As for the components of an optical disk device of the embodiment shown in FIG. 26, only the portions added to or varied from the block diagram of the conventional optical disk device shown in FIG. 44 are explained. Optical disks have a plural number n (n is arbitrary integer) of zones constituted of a specific number of tracks from zone 1 at the inner radius to zone n at the outer radius.

Recording start point detection circuit 70 detects a recording start point at the inner radius zone 1 as recording power Pbt(1) and a recording start point at the outer radius zone n as recording power Pbt(n). Memory circuit 72 stores recording power P1(1), P1(j), P1(n) previously measured at three zones. Correction circuit 71 corrects the recording powers at the three zones from recording start points Pbt(1), Pbt(n) measured at two zones and from the values kept in memory circuit 72 to set P2(1), P2(j), P2(n). Operational circuit 73 sets recording powers at the remaining n−3 zones by interpolation or extrapolation from recording powers P2(1), P2(j), P2(n) corrected and set at the three zones.

Referring to the flow chart in FIG. 27, a method for setting the recording power in a user region from the result of recording start point measured at two zones and the recording powers at three zones previously measured and stored is illustrated. In FIG. 27, when zone recording power setting starts, recording start points are detected at inner radius zone 1 and outer radius zone n. The results of the detection are Pbt(1) at inner radius zone 1and Pbt(n) at the outer radius zone n.

Then, the computing of recording power at inner radius zone 1 and outer radius zone n is performed. The computing is performed according to P2(1)=Pbt(1)*1.3 at inner radius zone 1 and P2(n)=Pbt(n)*1.3 at outer radius zone n. The constant 1.3 can be different at the inner radius and the outer radius. The setting by multiplying by 1.3 can be substituted by adding a predetermined constant. When the recording powers at the inner radius and the outer radius are determined, the amount varied from the stored recording power is computed. Varied amount dP(1)=P2(1)−P1(1) at the inner radius zone 1 and dp(n)=P2(n)−P1(n) at the outer radius zone n are obtained from the difference between the stored value and the measured value. An estimated varied amount dp(j) at an intermediate zone j which is in a user region where test recording cannot be performed is computed and set by averaging the two varied amounts at inner radius zone 1 and outer radius zone n, that is, dP(j)=(dP(1)

+dP(n))/2. The stored recording power P1(j) at the intermediate zone j is corrected as P2(j)=P1(j)+dP(j). The recording powers at the remaining n−3 zones are then set by interpolation or extrapolation using recording power P2(1), P2(j), P2(n) which completes setting of zone recording power.

Next, referring to FIG. 28, actual operation is illustrated. In the figures, the abscissa indicates zones 1 to 9. For a practical illustration, outer radius zone shown as n is denoted as 9, intermediate zone j as 5 and inner radius zone as 1. The ordinate indicates recording power P1(i) stored in memory circuit 72 and recording power P2(i) used for actual recording in a user region.

Recording powers P1(1), P1(5), P1(9) previously stored in memory circuit 72 are indicated by an undarkened circle. Linear plot line between recording power P1(1), P1(j), P1(n) at three points 1, 5, 9 is shown in bold.

As seen from the figure, the intermediate recording power does not change linearly from the inner radius to the outer radius but changes along a convex line directed downward. Therefore, when the intermediate recording power is simply computed by the average of recording powers at the inner radius and the outer radius, setting error increases.

Before recording to a user region, recording start points are detected at the inner radius zone 1 and the outer radius zone n, and computed as P2(1), P2(n). P2(1), P2(n) are plotted by undarkened triangles. Then, varied amount dP(1) =P2(1)−P1(1) at inner radius zone 1 and varied amount dP(n)=P2(n)−P1(n) at outer radius zone n are computed. An estimated varied amount dP(j) at an intermediate zone j which is in the user region, where test recording cannot be performed, is computed and set by averaging the two varied amounts at inner radius zone 1 and outer radius zone n, that is, dP(j)=(dP(1)−dP(n))/2. The recording powers P1(j) at the intermediate radius stored in the memory circuit is corrected using varied amount dP(j) to P2(j)=P1(j)+dP(j). The corrected recording power P2(j) at the intermediate radius is shown with a darkened triangle in the figure.

In the FIG. 28, the dotted line shows the recording power P2(1) between zones 1, 5 and 9 determined by interpolation from the three recording powers P2(1), P2(j), P2(n) at the inner radius zone 1, the intermediate radius zone j, and the outer zone n. As illustrated above, in the twelfth embodiment, recording start points at the two zones at inner radius and the outer radius are detected before recording signals. Then recording powers P2(1), P2(n) are computed, and recording power P1(j) near the intermediate radius zone measured previously and stored is corrected to P2(j), then recording power P2(1) at each zone is set by linear plot to set recording power in the user region at the intermediate radius to improve recording/reproducing characteristics at all zones including the user region.

Next, in the optical disk device of the twelfth embodiment, an optical disk device in which erasing power is added to recording power is explained referring to FIG. 29 and FIG. 30. In FIG. 29, only the portion added to or varied from the block diagram in FIG. 26 is explained. Recording start point detection circuit 80 detects a recording start point at the inner radius zone 1 as recording power Pbt(1) and erasing power Bbt(1) and recording start point at the outer radius zone n as recording power Pbt(n) and erasing power Bbt(n). Memory circuit 82 stores recording power P1(1), P1(j), P1(n) previously measured at three zones. Correction circuit 81 corrects the recording powers at the three zones from recording start points Pbt(1), Pbt(n) measured at two zones and the values kept in memory circuit 82 to set P2(1), P2(j), P2(n). Operational circuit 83 sets recording powers at the remaining n−3 zones by interpolation or extrapolation from recording powers P2(1), P2(j), P2(n) corrected and set at the three zones. Further, using PBR set by power ratio setting circuit 84 for the setting PBR erasing power B2(i) at each zone is computed as B2(i)=P2(i)/PBR and set.

Referring to the flow chart in FIG. 30, a method for setting the recording power and erasing power in a user region from the result of recording start points measured at two zones and the recording powers at three zones previously measured and stored is shown.

In the FIG. 30, when zone recording/erasing power setting starts, PBR is kept constant. Recording start points are detected at inner radius zone 1 and outer radius zone n of test zones. The results of the detection are Pbt(1), Bbt(1) at inner radius zone 1 and Pbt(n), Bbt(n) at outer radius zone n.

Then, the computing of recording powers at inner radius zone 1 and outer radius zone n is preformed. The computing is performed according to P2(1)=Pbt(1)*1.3 at inner radius zone 1 and P2(n)=Pbt(n)*1.3 at outer radius zone n. The constant 1.3 can be different at the inner radius and the outer radius. Also, the setting by multiplying by 1.3 can be substituted by adding a predetermined constant. When the recording powers at the inner radius and the outer radius are determined, the amount varied from the stored recording power is computed. Varied amount dP(1)=P2(1)−P1(1) at the inner radius zone 1 and dP(n)=P2(n)−P1(n) at the outer radius zone n are obtained from the difference between the stored value and the measured value. An estimated varied amount dP(j) at an intermediate zone j which is in the user region where test recording cannot be performed is computed and set by averaging the two varied amounts at inner radius zone 1 and outer radius zone n, that is, dP(j)=(dP(1)+dP(n))/2. Recording power P1(j) at the intermediate radius stored in the memory circuit is corrected using the intermediate varied amount dP(j) and set as P2(j)=P1(j)+dP(j).

The recording powers at the remaining n−3 zones are then set by interpolation or extrapolation using recording power P2(1), P2(j), P2(n) thereby completing the setting of zone recording power.

Next, using PBR, erasing power B2(i) at each zone i is computed as B2(i)=P2(i)/PBR. Setting of each recording power P2(i) and erasing power B2(i) at all zones is thereby finished and recording in user regions can begin.

An optical disk device provided with a renewal circuit for renewing recording powers P1(1), P1(j), P1(n) at the three zones stored in memory circuit B2 using recording powers in the three zones corrected and set by correction circuit 81 is discussed next. Since the optical disk device of this embodiment has a renewal circuit, setting of recording powers is always renewed by current recording powers, so the varied amount of recording power is small, errors due to the computing is decreased, and computing time can be shortened in the correction of the recording power.

FIG. 31 depicts an optical disk device according to this embodiment. The renewal circuit 84 added to the block diagram of the preceding embodiment shown in FIG. 28 is explained. The renewal circuit 84 renews recording powers P1(1), P1(j), P1(n) at three zones stored in memory circuit 82 by recording powers P2(1), P2(j), P2(n) at three zones i=1, j, n computed at operational circuit 83. Thus, newly set recording powers P2(1), P2(j), P2(n) at three zones i=1, j, n are kept in memory circuit 82 at every test recording in the test region. Therefore, when an optical disk to be tested changes characteristics as time passes, the most appropriate recording power having a wide recording margin may depart from P1(i) previously measured and stored in memory circuit 82. In this case, the differences between recording powers P2(1), P2(j), P2(n) at three zones i−1, j, n computed by operational circuit 83 and recording powers P1(1), P1(j), P1(n) stored increases, processing time increases, or computing error increases. By providing renewal circuit 84, setting of recording power is always updated by the newest recording power, thus realizing reduced computing error and shortened processing time. Measuring of recording power to be stored in the memory circuit of the embodiment is preferably performed at shipping time, so that the characteristics of the recording media and the measuring conditions are uniformly controlled and the variation of measurements can be suppressed.

Embodiment 13

An optical disk device according to a thirteenth embodiment is illustrated referring to FIGS. 32 through 34. In FIG. 32 only the portions added to or varied from the block diagram of the conventional optical disk device shown in FIG. 44 are explained. Optical disks have a plural number n (n is arbitrary integer) of zones from zone 1 at the inner radius to zone n at the outer radius constituted of a specific number of tacks.

Referring to FIG. 32, recording start point detection circuit 90 detects a recording start point at the inner radius zone 1 as recording power Pbt(1). The test zone of the embodiment is the inner radius zone 1, though, the outer radius zone can be used as well. Memory circuit 92 stores recording power P1(1), P1(j), P1(n) previously measured at three zones. Correction circuit 91 corrects the recording powers at the three zones from recording start point Pbt(1) measured at the inner radius zone 1 and the values kept in memory circuit 92 to set P2(1), P2(j), P2(n). Operational circuit 93 computes and sets recording powers at the remaining n−3 zones by interpolation or extrapolation using corrected recording power P2(1), P2(j), P2(n) at the three zones.

Referring to the flow chart in FIG. 33, a method for setting the recording power in a user region from the result of a recording start point measured at one zone and the recording powers at three zones measured previously and stored is explained below. In the figure, when zone recording power setting starts, recording start point Pbt(1) is detected at the inner radius zone 1. Then, the computing of recording power at inner radius zone 1 is performed. The computing is performed according to P2(1)=Pbt(1)*1.3 at inner radius zone 1. The setting by multiplying by 1.3 can be substituted by adding a predetermined constant. When the recording power at inner radius zone 1 is determined, the varied rate of the stored recording power is computed. Varied rate RP(1)=P2(1)/P1(1) is obtained from the ratio of the stored value and measured value. Using the varied rate RP(1) of recording power at the inner radius zone 1, stored recording powers P1(j) and P1(n) at the intermediate radius zone j and the outer radius zone n are corrected. The recording power is corrected in accordance with P2(j)=P1(j)*RP(1) at the intermediate radius zone j and P2(n)=P1(n)*RP(1) at the outer radius zone n, assuming that the varied rate at the test region is equal to that of each zone. Likewise, recording power P1(j) at the intermediate radius zone j, where the test cannot be performed since it is a user region, is corrected and set as P2(j). Using the calculated recording powers P2(1), P2(j), P2(n) at the three zones, recording powers at the remaining n−3 zones are set by interpolation or extrapolation and the setting of zone recording power ends.

Next, referring to FIG. 34, actual operation of this embodiment will be illustrated. In the figure, the abscissa indicates zone 1 through 9. For a practical illustration, the outer radius zone generally shown as n is denoted as 9, intermediate zone j as 5 and inner radius zone as 1. The ordinate indicates recording power P1(i) stored in memory circuit 92 and recording power P2(i) used for actual recording in a user region.

Recording powers P1(1), P1(5), P1(9) at three zones 1, 5, 9 previously stored in memory circuit 92 are indicated by undarkened circles. Linear plot line of recording power P1(1), P1(j), P1(n) at three points 1, 5, 9 is shown in bold.

As seen from the FIG. 34, the intermediate radius recording power does not change linearly from the inner radius and the outer radius but changes along a convex line curved downward. Therefore, when the intermediate recording power is simply computed by the average of recording powers at the inner radius and the outer radius, set error increases.

Before recording to a user region, a recording start point is detected at the inner radius zone 1, and the recording power P2(1) is computed from the recording start point. P2(1) is plotted by an undarkened triangle. Then, varied rate RP(1) for inner radius zone 1 is computed as RP(1)=P2(1)/P1(1). Using varied rate RP(1), stored power P1(j) at the intermediate radius zone j, which is in the user region where test recording cannot be performed, is corrected and set as P2(j)=P1(j)*RP(1). The corrected recording power P2(j) at intermediate radius zone is shown by a darkened triangle. The same computing is performed for outer radius zone n, and stored recording power P1(n) at the outer radius zone n is corrected and set to P2(n)=P1(n) *RP(1).

In FIG. 34, the dotted line shows the recording power P2(i) between zones 1, 5, and 9 determined by interpolation from the three recording powers P2(1), P2(j), P2(n) at the inner radius zone 1, the intermediate radius zone j, and the outer radius zone n.

As illustrated above, in the thirteenth embodiment, recording start point at one zone at an inner radius is detected before recording signals to a user region. Using obtained varied rate RP(1) of recording power at the inner radius, recording power P1(j) around the intermediate radius zone j and recording power P1(n) around the intermediate radius zone j and recording power P1(n) at the outer radius zone n are respectively corrected to P2(j), P2(n), thereby setting the recording power for the user region at the intermediate radius to improve the recording/reproducing characteristics at all of the zones including the user region.

In the thirteenth embodiment, only recording power is explained. However, the embodiment is applicable where erasing power is added.

Measuring of recording power to be stored in the memory circuit of the embodiment is preferably performed at shipping time so that the characteristics of the recording media and measuring conditions are uniformly controlled and variations of measurement can be suppressed.

Embodiment 14

An optical disk device according to a fourteenth embodiment is illustrated referring to FIG. 35 through FIG. 41. The object of the embodiment is to correct recording power in a user region where test recording cannot be performed, from the result of the test recording at one zone other than the user region. As the data of recording power of each zone i is stored in the memory, recording power customized to the sensitivity of the recording media can be precisely set.

Referring to FIG. 35, a format of an optical disk having a test region on its intermediate radius is illustrated. For ordinary optical disks, test regions are typically provided at the inner radius zone and the outer radius zone. However, a test region independent from a user region can also be provided at an intermediate radius. In FIG. 35, the optical disk has zones composed of 100 tracks from the inner radius to the outer radius. For example, all tracks around zone 2 are designated as user region with track addresses from 101 to 200. Next, zone 3 starts from track address 201. Zone 5 is a test zone composed of a test region for testing and a user region. The number of tracks at the test region is 5 and addresses independent from the track addresses for the neighboring user region are set for the tracks in the test region. After the test region, the user region starts again from 401 to 500 continuing from the last track address 400. Test recording can be performed at the track formed at zone 5 where test recording, typically, cannot be performed because it is reserved as a user region. As to the accuracy of test recording using only one zone, one zone at the intermediate radius is better than one zone at the inner or the outer radius.

Referring to FIG. 36, only the portions added to or varied from the block diagram of the conventional optical disk device shown in FIG. 44 is explain. Optical disks have a plural number n (n is arbitrary integer) of zones from zone 1 at the inner radius to zone n at the outer radius constituted of a specific number of tracks.

Recording start point detection circuit 110 detects a recording start point at a predetermined test zone j as recording power Pbt(j). The test zone j can be either the inner radius zone 1 or the outer radius zone n. It could also be the intermediate radius zone if the optical disk has the format illustrated above since it has regions for test recording at its intermediate radius zone. Memory circuit 112 stores recording power P1(i) previously measured at each zone i. Correction circuit 111 corrects the recording power at each zone i from recording start point Pbt(j) and the value stored in memory circuit 112 and sets the corrected power as P2(i).

Referring to the flow chart in FIG. 37, a method for setting the recording power in a user region from the result of the recording start point measured at one test zone and the recording power at each zone i measured previously and stored is illustrated.

In FIG. 37, when zone recording power setting starts, recording start point Pbt(j) is detected at test zone j. Then, the computing of recording power at test zone j is performed. The computing is performed according to $P2(j)=Pbt(j)*1.3$ at test zone j. The setting by multiplying by 1.3 can be substituted by adding a predetermined constant. When the recording power at test zone j is determined, the varied rate of the stored recording power is computed. Varied rate is obtained from the ratio of recorded value P1(j) and measured value P2(j), that is, $RP(j)=P2(j)/P1(j)$. Using the varied rate RP(j) of recording power at test zone j, stored recording power P1(i) at each zone i is corrected. The recording power is corrected according to $P2(i)=P1(i)*RP(j)$ at each zone, assuming that varied rate at the test region is equal to that of each zone.

Likewise, stored recording power P1(i) at each zone i is corrected and set as P2(i) by using varied rate RP(j) of the recording power at the test region. The setting of zone recording power then concludes.

Next, referring to FIG. 38, actual operation of this embodiment is illustrated. In the figure, the abscissa indicates zones 1 through 9. For a practical illustration, the outer radius zone generally shown as n is denoted as 9, intermediate zone j=5, and inner radius zone as 1. The ordinate indicates recording power P1(i) stored in memory circuit 112 and recording power P2(i) used for actual recording in a user region. The test zone is provided at zone 1 at the inner radius.

Recording power P1(i) for each zone i previously stored in memory circuit 112 is indicated by an undarkened circle. Since all recording powers for all zones are available, there is no need for approximation by, for example, linear plot, and the setting accuracy of recording power is improved.

As seen from FIG. 38, the intermediate radius recording power does not change linearly from that of the inner radius and the outer radius but changes along a convex line directed downward. In the present embodiment, therefore, storing recording powers for all zones leads to recording powers more closely set to the actual sensitivity, and the recording characteristics can be improved.

Before recording to a user region, a recording start point is detected at the inner radius zone 1, and recording power is computed as P2(1) form the recording start point. P2(1) is plotted as an undarkened triangle. Then, varied rate RP(1) of recording power at inner radius zone 1 is computed as $RP(1)=P1(1)$. Using varied rate RP(1) of recording power at inner radius zone 1, stored power P1(i) at each other zone i is corrected and set as $P2(i)=P1(i)*RP(1)$. Corrected recording power P1(i) at each zone i is shown by a darkened triangle.

These points are close to the recording sensitivity curve of the original recording media as shown by the dotted line. Thus, highly accurate setting is achieved.

Furthermore, referring to FIG. 39, the operation where a test zone is in intermediate radius zone 5 is illustrated. Only that portion different from FIG. 38 is explained.

As seen from FIG. 39, the intermediate radius recording power does not change linearly from the inner radius and the outer radius but changes along a convex line directed downward. This means that the zone sensitivity around the intermediate radius varies. Therefore, test recording in the intermediate radius zone is better in measuring accuracy than that of the inner radius zone or the outer radius zone.

Before recording to a user region, a recording start point is detected at the intermediate radius zone 5 and recording power is computed as P2(5) from the recording start point. Then, varied rate RP(5) of recording power at the intermediate radius zone is computed as $RP(S)=P2(5)$. Varied rate RP(5) of recording power at intermediate radius zone 5 is at approximately the center between that of the inner radius zone and the outer radius zone and averaged. Therefore, error is smaller when recording power P1(i) in each other zone i is corrected by varied rate RP(5).

As illustrated above, in the fourteenth embodiment, before recording signals to a user region, recording power at each zone i is measured and stored, a recording start point at one test zone is detected, varied rate of recording power is computed, and stored recording power in each zone i is corrected and set so that the variation of recording sensitivity around the intermediate radius zone is accounted for, thereby improving the recording/reproducing characteristic at all of the user regions.

Next, according to the fourteenth embodiment, an optical disk device including erasing power is illustrated referring to FIG. 40 and FIG. 41. In FIG. 40, only the portions added to or varied from the block diagram of FIG. 36 are discussed. Recording start point detection circuit 120 detects a recording start point at test zone j as recording power Pbt(j) and erasing power Bbt(j). Memory circuit 122 stores recording power P1(i) previously measured at each zone i. Correction circuit 121 corrects the recording powers at each zone i from recording start point Pbt(j) measured at test zone j and the value stored in memory circuit 122 to set P2(i). Further, power ratio setting circuit 124 sets PBR, and erasing power B2(i) at each zone i is computed and set as B2(i) =P2(i)/PBR.

Referring to the flow chart in FIG. 41, a method for setting the recording power and erasing power in a user region from the result of recording start point measured at one test zone and the recording power at each zone i measured previously and stored is illustrated. In the figure, when setting of zone recording power/erasing power starts, PBR is set. Recording start points Pbt(j), Bbt(j) are detected at test zone j. Then, recording power in test zone j is computed as P2(j)=Pbt(j)*1.3. The setting by multiplying by 1.3 can be substituted by adding a predetermined constant. When the recording powers at test zone j are determined, the varied rate of the stored recording power is computed from the ratio stored value P1(j) and measured value P2(j). Varied rate of recording power at test zone j is obtained as RP(j)=P2(j)/P1(j). Using the varied rate RP(j) of recording power at test zone j, stored recording power P1(i) at each zone i is corrected. The recording power is corrected as P2(i)=P1(i)*RP(j) at each zone i, assuming that varied rate at the test zone is equal to that of each zone i.

By using PBR, erasing power B2(i) at each zone i is computed and set as B2(i)=P2(i)/PBR. Setting of recording power P2(i) and erasing power B2(i) at each zone then ends and recording at a user region can begin.

When recording sensitivity changes between an inner radius zone and an outer radius zone, it is preferable to change PBR to a different value PBR(i) at each zone i according to the linear velocity.

As illustrated above, in the present embodiment, recording start point at one test zone is detected before recording to a user region. Then varied rate of recording power is computed, the recording power in each zone measured and stored previously is corrected, and erasing power in each zone is set by PBR. In this way, recording power and erasing power can be set in a suitable region of recording margin of the recording media and recording/reproducing characteristics can be improved across all the user regions.

As explained earlier, measuring of recording power to be stored in the memory circuit is preferably performed at shipping time.

Embodiment 15

An optical disk inspection apparatus according to a fifteenth embodiment is illustrated referring to FIG. 42 and FIG. 43. The fifteenth embodiment is an optical disk inspection apparatus for accurately measuring a recording sensitivity of a recording media by recording over the same region in a predetermined test region at least two times and displaying the output.

In FIG. 42 only the portions added to or varied from the block diagram of a conventional optical disk device shown in FIG. 44 are explained. Recording start point detection circuit 130 performs recording at least two times in a predetermined test region and detects recording power Pbt and erasing power Bbt of a recording start point. Display output circuit 131 outputs the display of the recording start points of recording power Pbt and erasing power Bbt or the display of the recording power and erasing power for recording in a user region set by multiplying or adding a predetermined constant with the recording start point.

Referring to FIG. 43, the operation of the fifteenth embodiment is illustrated. Recording over the same region in a predetermined test region is performed at least two times and the error rate and allowed value TH are compared. Recording start points Pbt and Bbt are then detected and raised until the error rate falls under allowed value TH. Recording start points Pbt and Bbt are then multiplied by or added with a predetermined constant to obtain recording power Pst and erasing power Bst for recording at a user region. A recording power Pbt and an erasing power Bbt for the associated recording start point and/or recording power Pst and erasing power Bst are displayed.

As illustrated above, an optical disk inspection apparatus of the fifteenth embodiment detects the recording start point by repeating recording two times, whereby stable measurement with little variation of recording start point can be realized.

In this embodiment, the recording start point is detected and displayed. However, error rate when recording in the same region is performed two times by using fixed recording power and/or erasing power may also be displayed. Furthermore, the result of the comparison with allowed value TH may be displayed instead of the error rate.

Embodiment 16

A method for measuring error rate according to a sixteenth embodiment is illustrated referring to FIG. 50 and 51A–B. The sixteenth embodiment is a method for measuring error rate by recording at least two times over the same region in a predetermined first region of an optical disk. The object is to measure accurately a recording sensitivity of recording media or to measure the error rate.

Referring to FIG. 50, an error rate measurement starts by seeking a test region. First, recording power is set as the recording power for inspection and the first recording is performed. Then, the second recording is performed at the same region and at the same recording power as in the first recording step. The error rate is then measured at the region where the second test is performed.

Referring to FIG. 51A–B, the principle of the sixteenth embodiment is illustrated. FIG. 51A shows the characteristics of an error rate of the recording media measured by applying the present embodiment. In FIG. 51A, the abscissa indicates recording power and the ordinate indicates error rate. The two curves show the variation of recording sensitivity when the recording media is measured several times. When inspection power is Ptest, the variation is only from BER 1 to BER 2.

FIG. 51B shows the characteristics of error rate of the recording media measured by one recording without applying the present embodiment. In FIG. 51-B the abscissa indicates recording power and the ordinate indicates error rate. The two curves show the variation of recording sensitivity when the recording media is measured several times. When inspection power is Ptest, the variation is from BER 3 to BER 4. As shown, the variation is extremely large when compared with the case of two cycle recording.

The variation of recording sensitivity sharply appears around recording start point where recording is unstable. According to this embodiment, the variation of error rate around the recording start point can be suppressed compared with one cycle recording in the prior art. Accordingly, when a recording start point is detected and recording power is set in an optical disk device, the variation of recording power is suppressed resulting in stable recording characteristics.

In this embodiment, the recording media is an optical disk, though needless to say, the present invention can be applied to a video tape, or other medium which is a re-writable recording medium.

In this embodiment, only the case of recording power is illustrated. However, the present invention is equally applicable to the case where erasing power is added to recording power. Furthermore, while only the case of 2 cycle recording is illustrated, the number of cycles can be increased beyond 2 cycles. Further still, recording signals at the first recording and second recording can be the same or different.

In the illustration of embodiments 1 through 16, detection of recording start points and setting of recording power and erasing power are performed by the disclosed circuits. However, these operations can also be performed by either a CPU or software.

Furthermore, in all the embodiments, land or groove portions on the optical disk are not designated, as the invention is applicable to recording of either type.

Further still, in all the embodiments, it is unnecessary to use the same recording power for the first recording and the second recording. In the present invention, at least two cycle recording is performed for the purpose of overcoming the effect of previous recording that affects single cycle recording. However, it is generally easier to use the same recording power to detect the recording start point.

Finally, in all the embodiments, the recording start point is detected by using the change of BER for the recording power. However, characteristics other than BER to show recording quality can be used. For example, jitter, amplitude or symmetry of the reproduced signal from the optical disk can be used.

Also, the measurement of BER can be accomplished by comparing the recording signal with the reproduced signal, bit by bit, without using the error detection circuit.

What is claimed is:

1. An optical disk device for recording and reproducing a signal using an optical disk, comprising:
    an optical output control circuit for switching an optical output among a reproducing power, an erasing power, and a recording power; and
    a recording start point detection circuit for detecting a recording power and an erasing power at a recording start point obtained by effecting a first cycle recording and thereafter at least a second cycle recording over the same area as said first cycle recording.

2. The optical disk device of claim 1, further comprising:
    an error detection circuit for detecting an error rate from a reproduced signal; and
    an error judging circuit for judging if said error rate of said reproduced signal is within a predetermined allowed value by comparing said predetermined allowed value with said error rate of said reproduced signal
    wherein said optical output control circuit modulates a recording signal between said erasing power and recording power and wherein said recording start point detection circuit effects at least two cycle recording in a predetermined first region of said optical disk and changes said recording power and said erasing power until said error judging circuit judges that said error rate is within said predetermined allowed value.

3. The optical disk device of claim 2, further comprising:
    a power setting circuit for setting a final recording power and final erasing power by multiplying said detected recording power and erasing power of said recording start point by a predetermined first value and second value, respectively, when recording is performed at a predetermined second region other than said predetermined first region.

4. The optical disk device of claim 3, wherein said predetermined first value and second value range from 1.1 to 1.5.

5. The optical disk device of claim 3, wherein said predetermined second region of said optical disk is a user region.

6. The optical disk device of claim 2, further comprising:
    a power setting circuit for setting a final recording power and final erasing power by adding said detected recording power and erasing power of said recording start point to predetermined third value and fourth value, respectively, when recording is performed at a predetermined second region other than said predetermined first region.

7. The optical disk device of claim 2, wherein said predetermined first region on said disk is a test region at one of an inner radius and an outer radius other than one of a user region.

8. The optical disk device of claim 2, wherein said recording start point detection circuit detects a recording start point at said predetermined first region by sequentially increasing said recording power and said erasing power when said error rate is higher than said predetermined allowed value or sequentially decreasing said recording power and said erasing power when said error rate is lower than said predetermined allowed value until said error rate of a signal corresponding to said recording power and said erasing power is within said predetermined allowed value.

9. The optical disk device of claim 2, further comprising:
    an initializing circuit for initializing an area in said predetermined first region prior to subjecting said first region to at least two cycle recording by said recording start point detection circuit.

10. The optical disk device of claim 9, wherein said initializing circuit performs initializing using recording power equal to a first erasing power.

11. The optical disk device of claim 10, wherein said initializing circuit repeats erasing at a second erasing power set at a predetermined range lower than said first erasing power after erasing said predetermined first region by said first erasing power.

12. The optical disk device of claim 11, wherein said predetermined range is determined by setting said first erasing power at 1 to 2 times said second erasing power.

13. The optical disk device of claim 1 comprising:
    an error detection circuit for detecting an error rate from a reproduced signal;
    an error judging circuit for judging if said error rate of said reproduced signal is within a predetermined allowed value by comparing said predetermined allowed value and said error rate;
    a power setting circuit for setting a final recording power and final erasing power by multiplying said detected recording power and erasing power of said recording start point by a predetermined first value and second value, respectively;
    a first confirmation power setting circuit for setting a first confirmation recording power and erasing power set at a predetermined range lower than said final recording power and final erasing power set by said power setting circuit;
    a second confirmation power setting circuit for setting a second confirmation recording power and erasing power higher than said detected recording start point and lower than said first confirmation recording power and erasing power; and a power confirmation circuit for over-writing, one time, an area in said predetermined first region recorded by said first confirmation recording power and erasing power, and by said second confirmation recording power and erasing power, and detecting if said error rate is higher than said predetermined allowed value, wherein when said power confirmation circuit detects an error rate higher than said predetermined value, recording is performed in a predetermined second region using said final recording power and final erasing power set by said power setting circuit.

14. The optical disk device of claim 13, wherein said power confirmation circuit over-writes, one time, an area in said predetermined first region recorded by said first confirmation recording power and erasing power and by said second confirmation recording power and erasing power; and wherein when said error judging circuit detects an error rate within said predetermined value, reduces the final recording power and final erasing power set by said power setting circuit until said error rate reproduced from and over-written by said second confirmation recording power and erasing power after said recording by said first confirmation recording power and erasing power exceeds said predetermined allowed value.

15. The optical disk device of claim 13, wherein said first confirmation power setting circuit sets said first confirmation recording power and erasing power at about 5% to 20% lower than said final recording power and final erasing power set by said power setting circuit.

16. The optical disk device of claim 13, wherein said second confirmation power setting circuit sets said second confirmation recorder and erasing power about 10% to 30% lower than said first confirmation recording power and erasing power.

17. The optical disk device of claim 1, operable as an inspection apparatus for inspecting a recording sensitivity of an optical disk, further comprising:

an error detection circuit for detecting an error rate from a reproduced signal; and a display output circuit for displaying said error rate of said error detection circuit.

18. The optical disk device of claim 17 further comprising:

an optical output control circuit for switching an optical output between a reproducing power, erasing power, and recording power, and modulating a recording signal between said erasing power and recording power;

an error judging circuit for judging if said error rate of said reproduced signal is within a predetermined allowed value by comparing said predetermined allowed value and said error rate of said reproduced signal;

said recording start point detection circuit changing said recording power and said erasing power until said error judging circuit judges that said error rate is within said predetermined allowed value;

a power ratio setting circuit for setting a ratio of said recording power to said erasing power at a predetermined value; and a display output circuit for displaying at least one of said recording power and erasing power of said recording start point.

19. The optical disk device of claim 1, wherein the optical output control circuit switches the optical output among at least one of a reproducing power, a plurality of recording powers and a plurality of erasing powers.

20. A method for setting a recording power and an erasing power in an optical disk device comprising the steps of:

performing at least two cycle recording over a same area in a predetermined first region of an optical disk to detect, by changing said recording power and erasing power, a recording power and an erasing power of a recording start point at which an error rate falls within a predetermined allowed value; and setting said recording power and erasing power for recording in a user region by multiplying said recording power and erasing power of said recording start point by a predetermined first value and second value respectively.

21. The method of claim 20, wherein said predetermined first value and said predetermined second value are in a range from 1.1 to 1.5.

22. The method of claim 20, wherein prior to said at least two cycle recording in said predetermined first region, said first region is initialized.

23. The method of claim 22, wherein said initializing, comprises the steps of:

initializing said region by a first erasing power; and then erasing by a second erasing power set at a predetermined range lower than said first erasing power.

24. An optical disk device for recording and reproducing a signal using an optical disk, comprising:

an optical output control circuit for switching an optical output among a reproducing power, an erasing power, and a recording power; and a recording start point detection circuit for detecting one of a recording power and an erasing power at a recording start point obtained by effecting a first cycle recording and thereafter at least a second cycle recording over the same area as said first cycle recording.

* * * * *